(12) United States Patent (10) Patent No.: US 8,713,434 B2
Ford et al. (45) Date of Patent: Apr. 29, 2014

(54) INDEXING, RELATING AND MANAGING INFORMATION ABOUT ENTITIES

(75) Inventors: Aaron Dea Ford, Spicewood, TX (US); Richard Gray Grashel, II, Round Rock, TX (US); Scott Schumacher, Northridge, CA (US); David Wilkinson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/904,750

(22) Filed: Sep. 28, 2007

(65) Prior Publication Data

US 2009/0089317 A1 Apr. 2, 2009

(51) Int. Cl.
*G06F 3/00* (2006.01)

(52) U.S. Cl.
USPC .............................. 715/700; 707/748; 707/758

(58) Field of Classification Search
USPC .................. 707/100, 102, 802, 803, E17.048, 707/999.1, 748, 758; 715/700
See application file for complete search history.

(56) References Cited

U.S. PATENT DOCUMENTS

| | | |
|---|---|---|
| 4,531,186 A | 7/1985 | Knapman |
| 5,020,019 A | 5/1991 | Ogawa |
| 5,134,564 A | 7/1992 | Dunn et al. |
| 5,247,437 A * | 9/1993 | Vale et al. .......................... 707/1 |
| 5,321,833 A | 6/1994 | Chang et al. |
| 5,323,311 A | 6/1994 | Fukao et al. |
| 5,333,317 A | 7/1994 | Dann |
| 5,381,332 A | 1/1995 | Wood |
| 5,442,782 A | 8/1995 | Malatesta et al. |
| 5,497,486 A | 3/1996 | Stolfo et al. |
| 5,535,322 A | 7/1996 | Hecht |
| 5,535,382 A | 7/1996 | Ogawa |
| 5,537,590 A | 7/1996 | Amado |
| 5,555,409 A * | 9/1996 | Leenstra et al. .............. 707/101 |
| 5,561,794 A * | 10/1996 | Fortier .............................. 707/8 |

(Continued)

FOREIGN PATENT DOCUMENTS

| | | |
|---|---|---|
| JP | 2000348042 | 12/2000 |
| JP | 2001236538 | 8/2001 |

(Continued)

OTHER PUBLICATIONS

Gu, Lifang, et al., "Record Linkage: Current Practice and Future Directions", CSIRO Mathematical and Informational Sciences, © 2003, pp. 1-32.*

(Continued)

*Primary Examiner* — Omar Abdul-Ali
(74) *Attorney, Agent, or Firm* — Terry Carroll; Edell, Shapiro & Finnan, LLC

(57) ABSTRACT

Systems and methods for use in association with a master entity index system may allow data records to be grouped together into various entities, where each of the entities may represent a logical or physical item. These entities may also be associated with one another in a manner such that relationships between entities may likewise be represented. In one embodiment, an interface may be provided for use in conjunction with the master entity index system such that these various entities and relationships may be better managed, manipulated or visualized. This interface may allow a user to search for or otherwise obtain an entity, where a representation of this entity and one or more associated entities may be presented to the user along with representations of the relationships between these entities.

18 Claims, 44 Drawing Sheets

(56) References Cited

U.S. PATENT DOCUMENTS

| | | | |
|---|---|---|---|
| 5,583,763 A | 12/1996 | Atcheson et al. | |
| 5,600,835 A | 2/1997 | Garland et al. | |
| 5,606,690 A | 2/1997 | Hunter et al. | |
| 5,615,367 A | 3/1997 | Bennett et al. | |
| 5,640,553 A | 6/1997 | Schultz | |
| 5,651,108 A | 7/1997 | Cain et al. | |
| 5,675,752 A | 10/1997 | Scott et al. | |
| 5,675,753 A | 10/1997 | Hansen et al. | |
| 5,694,593 A | 12/1997 | Baclawski | |
| 5,694,594 A | 12/1997 | Chang | |
| 5,710,916 A | 1/1998 | Barbara et al. | |
| 5,734,907 A | 3/1998 | Jarossay et al. | |
| 5,765,150 A | 6/1998 | Burrows | |
| 5,774,661 A | 6/1998 | Chatterjee | |
| 5,774,883 A | 6/1998 | Anderson | |
| 5,774,887 A | 6/1998 | Wolff et al. | |
| 5,778,370 A * | 7/1998 | Emerson | 707/100 |
| 5,787,431 A | 7/1998 | Shaughnessy | |
| 5,787,470 A | 7/1998 | DeSimone et al. | |
| 5,790,173 A | 8/1998 | Strauss | |
| 5,796,393 A | 8/1998 | MacNaughton et al. | |
| 5,805,702 A | 9/1998 | Curry | |
| 5,809,499 A | 9/1998 | Wong et al. | |
| 5,819,264 A * | 10/1998 | Palmon et al. | 707/4 |
| 5,835,712 A | 11/1998 | DuFresne | |
| 5,835,912 A * | 11/1998 | Pet | 1/1 |
| 5,848,271 A | 12/1998 | Caruso et al. | |
| 5,859,972 A | 1/1999 | Subramaniam et al. | |
| 5,862,322 A | 1/1999 | Anglin et al. | |
| 5,862,325 A | 1/1999 | Reed et al. | |
| 5,878,043 A | 3/1999 | Casey | |
| 5,893,074 A | 4/1999 | Hughes et al. | |
| 5,893,110 A | 4/1999 | Weber et al. | |
| 5,905,496 A | 5/1999 | Lau et al. | |
| 5,930,768 A | 7/1999 | Hooban | |
| 5,960,411 A | 9/1999 | Hartman et al. | |
| 5,963,915 A | 10/1999 | Kirsch | |
| 5,987,422 A | 11/1999 | Buzsaki | |
| 5,991,758 A | 11/1999 | Ellard | |
| 5,999,937 A | 12/1999 | Ellard | |
| 6,014,664 A | 1/2000 | Fagin et al. | |
| 6,016,489 A | 1/2000 | Cavanaugh et al. | |
| 6,018,733 A * | 1/2000 | Kirsch et al. | 707/3 |
| 6,018,742 A | 1/2000 | Herbert, III | |
| 6,026,433 A | 2/2000 | D'Arlach et al. | |
| 6,049,847 A | 4/2000 | Vogt et al. | |
| 6,067,549 A | 5/2000 | Smalley et al. | |
| 6,069,628 A | 5/2000 | Farry et al. | |
| 6,078,325 A | 6/2000 | Jolissaint et al. | |
| 6,108,004 A * | 8/2000 | Medl | 715/804 |
| 6,134,581 A | 10/2000 | Ismael et al. | |
| 6,185,608 B1 * | 2/2001 | Hon et al. | 709/216 |
| 6,223,145 B1 * | 4/2001 | Hearst | 703/22 |
| 6,269,373 B1 | 7/2001 | Apte et al. | |
| 6,297,824 B1 * | 10/2001 | Hearst et al. | 715/848 |
| 6,298,478 B1 | 10/2001 | Nally et al. | |
| 6,311,190 B1 | 10/2001 | Bayer et al. | |
| 6,327,611 B1 | 12/2001 | Everingham | |
| 6,330,569 B1 | 12/2001 | Baisley et al. | |
| 6,349,325 B1 | 2/2002 | Newcombe et al. | |
| 6,356,931 B2 | 3/2002 | Ismael et al. | |
| 6,374,241 B1 | 4/2002 | Lamburt et al. | |
| 6,385,600 B1 * | 5/2002 | McGuinness et al. | 1/1 |
| 6,389,429 B1 | 5/2002 | Kane et al. | |
| 6,446,188 B1 | 9/2002 | Henderson et al. | |
| 6,449,620 B1 | 9/2002 | Draper et al. | |
| 6,457,065 B1 | 9/2002 | Rich et al. | |
| 6,460,045 B1 | 10/2002 | Aboulnaga et al. | |
| 6,496,793 B1 | 12/2002 | Veditz et al. | |
| 6,502,099 B1 | 12/2002 | Rampy et al. | |
| 6,510,505 B1 | 1/2003 | Burns et al. | |
| 6,523,019 B1 | 2/2003 | Borthwick | |
| 6,529,888 B1 | 3/2003 | Heckerman et al. | |
| 6,556,983 B1 * | 4/2003 | Altschuler et al. | 706/55 |
| 6,557,100 B1 | 4/2003 | Knutson | |
| 6,621,505 B1 | 9/2003 | Beauchamp et al. | |
| 6,633,878 B1 | 10/2003 | Underwood | |
| 6,633,882 B1 | 10/2003 | Fayyad et al. | |
| 6,633,992 B1 | 10/2003 | Fayyad et al. | |
| 6,647,383 B1 * | 11/2003 | August et al. | 1/1 |
| 6,662,180 B1 | 12/2003 | Aref et al. | |
| 6,687,702 B2 | 2/2004 | Vaitheeswaran et al. | |
| 6,704,805 B1 | 3/2004 | Acker et al. | |
| 6,718,535 B1 | 4/2004 | Underwood | |
| 6,742,003 B2 | 5/2004 | Heckerman et al. | |
| 6,757,708 B1 | 6/2004 | Craig et al. | |
| 6,795,793 B2 | 9/2004 | Shayegan et al. | |
| 6,807,537 B1 | 10/2004 | Thiesson et al. | |
| 6,842,761 B2 | 1/2005 | Diamond et al. | |
| 6,842,906 B1 | 1/2005 | Bowman-Amuah | |
| 6,879,944 B1 | 4/2005 | Tipping et al. | |
| 6,907,422 B1 | 6/2005 | Predovic | |
| 6,912,549 B2 | 6/2005 | Rotter et al. | |
| 6,922,695 B2 | 7/2005 | Skufca et al. | |
| 6,957,186 B1 | 10/2005 | Guheen et al. | |
| 6,990,636 B2 | 1/2006 | Beauchamp et al. | |
| 6,996,565 B2 | 2/2006 | Skufca et al. | |
| 7,035,809 B2 | 4/2006 | Miller et al. | |
| 7,043,476 B2 | 5/2006 | Robson | |
| 7,099,857 B2 | 8/2006 | Lambert | |
| 7,143,091 B2 | 11/2006 | Charnock et al. | |
| 7,155,427 B1 | 12/2006 | Prothia et al. | |
| 7,181,459 B2 * | 2/2007 | Grant et al. | 1/1 |
| 7,249,131 B2 | 7/2007 | Skufca et al. | |
| 7,330,845 B2 * | 2/2008 | Lee et al. | 1/1 |
| 7,487,173 B2 | 2/2009 | Medicke et al. | |
| 7,526,486 B2 | 4/2009 | Cushman, II et al. | |
| 7,567,962 B2 * | 7/2009 | Chakrabarti et al. | 1/1 |
| 7,620,647 B2 | 11/2009 | Stephens et al. | |
| 7,627,550 B1 | 12/2009 | Adams et al. | |
| 7,685,093 B1 | 3/2010 | Adams et al. | |
| 7,698,268 B1 | 4/2010 | Adams et al. | |
| 7,788,274 B1 * | 8/2010 | Ionescu | 707/763 |
| 8,321,383 B2 | 11/2012 | Schumacher et al. | |
| 8,321,393 B2 | 11/2012 | Adams et al. | |
| 8,332,366 B2 | 12/2012 | Schumacher et al. | |
| 8,356,009 B2 | 1/2013 | Ellard et al. | |
| 8,359,339 B2 | 1/2013 | Adams et al. | |
| 8,370,355 B2 | 2/2013 | Harger et al. | |
| 8,370,366 B2 | 2/2013 | Adams et al. | |
| 8,417,702 B2 | 4/2013 | Harger et al. | |
| 8,423,514 B2 | 4/2013 | Goldenberg et al. | |
| 8,429,220 B2 | 4/2013 | Wilkinson et al. | |
| 8,510,338 B2 | 8/2013 | Cushman, II et al. | |
| 8,515,926 B2 | 8/2013 | Goldenberg et al. | |
| 8,589,415 B2 | 11/2013 | Adams et al. | |
| 2002/0007284 A1 | 1/2002 | Schurenberg et al. | |
| 2002/0073099 A1 | 6/2002 | Gilbert et al. | |
| 2002/0080187 A1 * | 6/2002 | Lawton | 345/810 |
| 2002/0087599 A1 * | 7/2002 | Grant et al. | 707/513 |
| 2002/0095421 A1 | 7/2002 | Koskas | |
| 2002/0099694 A1 | 7/2002 | Diamond et al. | |
| 2002/0152422 A1 | 10/2002 | Sharma et al. | |
| 2002/0156917 A1 | 10/2002 | Nye | |
| 2002/0178360 A1 | 11/2002 | Wenocur et al. | |
| 2003/0004770 A1 | 1/2003 | Miller et al. | |
| 2003/0004771 A1 | 1/2003 | Yaung | |
| 2003/0018652 A1 | 1/2003 | Heckerman et al. | |
| 2003/0023773 A1 | 1/2003 | Lee et al. | |
| 2003/0051063 A1 | 3/2003 | Skufca et al. | |
| 2003/0065826 A1 | 4/2003 | Skufca et al. | |
| 2003/0065827 A1 | 4/2003 | Skufca et al. | |
| 2003/0105825 A1 | 6/2003 | Kring et al. | |
| 2003/0120630 A1 | 6/2003 | Tunkelang | |
| 2003/0145002 A1 | 7/2003 | Kleinberger et al. | |
| 2003/0158850 A1 | 8/2003 | Lawrence et al. | |
| 2003/0174179 A1 * | 9/2003 | Suermondt et al. | 345/853 |
| 2003/0182101 A1 | 9/2003 | Lambert | |
| 2003/0195836 A1 | 10/2003 | Hayes et al. | |
| 2003/0195889 A1 | 10/2003 | Yao et al. | |
| 2003/0195890 A1 | 10/2003 | Oommen | |
| 2003/0220858 A1 | 11/2003 | Lam et al. | |
| 2003/0227487 A1 * | 12/2003 | Hugh | 345/777 |
| 2004/0107189 A1 | 6/2004 | Burdick et al. | |

(56) References Cited

U.S. PATENT DOCUMENTS

| | | |
|---|---|---|
| 2004/0107205 A1 | 6/2004 | Burdick et al. |
| 2004/0122790 A1 | 6/2004 | Walker et al. |
| 2004/0143477 A1 | 7/2004 | Wolff |
| 2004/0143508 A1 | 7/2004 | Bohn et al. |
| 2004/0181526 A1 | 9/2004 | Burdick et al. |
| 2004/0181554 A1* | 9/2004 | Heckerman et al. ....... 707/104.1 |
| 2004/0220926 A1 | 11/2004 | Lamkin et al. |
| 2004/0260694 A1 | 12/2004 | Chaudhuri et al. |
| 2005/0004895 A1 | 1/2005 | Schurenberg et al. |
| 2005/0015381 A1 | 1/2005 | Clifford et al. |
| 2005/0015675 A1 | 1/2005 | Kolawa et al. |
| 2005/0050068 A1 | 3/2005 | Vaschillo et al. |
| 2005/0055345 A1 | 3/2005 | Ripley |
| 2005/0060286 A1 | 3/2005 | Hansen et al. |
| 2005/0071194 A1 | 3/2005 | Bormann et al. |
| 2005/0075917 A1* | 4/2005 | Flores et al. ....................... 705/8 |
| 2005/0114369 A1 | 5/2005 | Gould et al. |
| 2005/0149522 A1 | 7/2005 | Cookson et al. |
| 2005/0154615 A1 | 7/2005 | Rotter et al. |
| 2005/0210007 A1 | 9/2005 | Beres et al. |
| 2005/0228808 A1 | 10/2005 | Mamou et al. |
| 2005/0240392 A1 | 10/2005 | Munro et al. |
| 2005/0256740 A1 | 11/2005 | Kohan et al. |
| 2005/0256882 A1 | 11/2005 | Able et al. |
| 2005/0273452 A1 | 12/2005 | Molloy et al. |
| 2006/0053151 A1 | 3/2006 | Gardner et al. |
| 2006/0053172 A1 | 3/2006 | Gardner et al. |
| 2006/0053173 A1 | 3/2006 | Gardner et al. |
| 2006/0053382 A1 | 3/2006 | Gardner et al. |
| 2006/0064429 A1 | 3/2006 | Yao |
| 2006/0074832 A1 | 4/2006 | Gardner et al. |
| 2006/0074836 A1 | 4/2006 | Gardner et al. |
| 2006/0080312 A1 | 4/2006 | Friedlander et al. |
| 2006/0116983 A1 | 6/2006 | Dettinger et al. |
| 2006/0117032 A1 | 6/2006 | Dettinger et al. |
| 2006/0129605 A1 | 6/2006 | Doshi |
| 2006/0129971 A1 | 6/2006 | Rojer |
| 2006/0136205 A1 | 6/2006 | Song |
| 2006/0161522 A1 | 7/2006 | Dettinger et al. |
| 2006/0167896 A1* | 7/2006 | Kapur et al. ..................... 707/10 |
| 2006/0179050 A1 | 8/2006 | Giang et al. |
| 2006/0190445 A1 | 8/2006 | Risberg et al. |
| 2006/0195460 A1 | 8/2006 | Nori et al. |
| 2006/0195560 A1 | 8/2006 | Newport |
| 2006/0265400 A1* | 11/2006 | Fain et al. ........................ 707/10 |
| 2006/0271401 A1 | 11/2006 | Lassetter et al. |
| 2006/0271549 A1 | 11/2006 | Rayback et al. |
| 2006/0287890 A1 | 12/2006 | Stead et al. |
| 2007/0005567 A1 | 1/2007 | Hermansen et al. |
| 2007/0016450 A1 | 1/2007 | Bhora et al. |
| 2007/0055647 A1 | 3/2007 | Mullins et al. |
| 2007/0067285 A1 | 3/2007 | Blume et al. |
| 2007/0073678 A1 | 3/2007 | Scott et al. |
| 2007/0073745 A1 | 3/2007 | Scott et al. |
| 2007/0094060 A1 | 4/2007 | Apps et al. |
| 2007/0150279 A1 | 6/2007 | Gandhi et al. |
| 2007/0192715 A1 | 8/2007 | Kataria et al. |
| 2007/0198481 A1 | 8/2007 | Hogue et al. |
| 2007/0198600 A1 | 8/2007 | Betz |
| 2007/0214129 A1 | 9/2007 | Ture et al. |
| 2007/0214179 A1 | 9/2007 | Hoang |
| 2007/0217676 A1 | 9/2007 | Grauman et al. |
| 2007/0250487 A1* | 10/2007 | Reuther ............................ 707/3 |
| 2007/0260492 A1 | 11/2007 | Feied et al. |
| 2007/0276844 A1 | 11/2007 | Segal et al. |
| 2007/0276858 A1 | 11/2007 | Cushman et al. |
| 2007/0299697 A1 | 12/2007 | Friedlander et al. |
| 2007/0299842 A1 | 12/2007 | Morris et al. |
| 2008/0005106 A1 | 1/2008 | Schumacher et al. |
| 2008/0016218 A1* | 1/2008 | Jones et al. ................... 709/226 |
| 2008/0069132 A1 | 3/2008 | Ellard et al. |
| 2008/0120432 A1 | 5/2008 | Lamoureux et al. |
| 2008/0126160 A1 | 5/2008 | Takuechi et al. |
| 2008/0243832 A1 | 10/2008 | Adams et al. |
| 2008/0243885 A1 | 10/2008 | Harger et al. |
| 2008/0244008 A1 | 10/2008 | Wilkinson et al. |
| 2008/0276221 A1 | 11/2008 | Lev et al. |
| 2009/0089332 A1 | 4/2009 | Harger et al. |
| 2009/0089630 A1 | 4/2009 | Goldenberg et al. |
| 2009/0198686 A1 | 8/2009 | Cushman, II et al. |
| 2010/0114877 A1 | 5/2010 | Adams et al. |
| 2010/0174725 A1 | 7/2010 | Adams et al. |
| 2010/0175024 A1 | 7/2010 | Schumacher et al. |
| 2011/0010214 A1 | 1/2011 | Carruth |
| 2011/0010346 A1 | 1/2011 | Goldenberg et al. |
| 2011/0010401 A1 | 1/2011 | Adams et al. |
| 2011/0010728 A1 | 1/2011 | Goldenberg et al. |
| 2011/0047044 A1 | 2/2011 | Wright et al. |
| 2011/0191349 A1 | 8/2011 | Ford et al. |

FOREIGN PATENT DOCUMENTS

| | | |
|---|---|---|
| JP | 2005063332 | 3/2005 |
| JP | 2006163941 | 6/2006 |
| JP | 2006277413 | 10/2006 |
| WO | 9855947 A1 | 12/1998 |
| WO | 0159586 | 8/2001 |
| WO | 0159586 A2 | 8/2001 |
| WO | 0175679 A1 | 10/2001 |
| WO | 03021485 | 3/2003 |
| WO | 2004023297 A1 | 3/2004 |
| WO | 2004023311 A1 | 3/2004 |
| WO | 2004023345 A1 | 3/2004 |
| WO | 2009042931 A1 | 4/2009 |
| WO | 2009042941 A1 | 4/2009 |

OTHER PUBLICATIONS

O'Hara-Schettino, et al., "Dynamic Navigation in Multiple View software Specifications and designs", Journal of Systems and Software, vol. 41, Issue 2, May 1998, pp. 93-103.*

Adami, Giordano, et al., "Clustering Documents in a Web Directory", WIDM '03, New Orleans, LA, Nov. 7-8, 2003, pp. 66-73.*

Chen, Hao, et al., "Bringing Order to the Web: Automatically Categorizing Search Results", CHI 2000, CHI Letters, vol. 2, Issue 1, Apr. 1-6, 2000, pp. 145-152.*

Xue, Gui-Rong, et al., "Implicit Link Analysis for Small Web Search", SIGIR '03, Toronto, Canada, Jul. 28-Aug. 1, 2003, pp. 56-63.*

Liu, Fang, et al., "Personalized Web Search for Improving Retrieval Effectiveness", IEEE Transactions on Knowledge and Data Engineering, vol. 16, No. 1, Jan. 2004, pp. 28-40.*

Ohgaya, Ryosuke, et al., "Conceptual Fuzzy Sets-Based Navigation System for Yahoo!", NAFIPS 2002, Jun. 27-29, 2002, pp. 274-279.*

Xue, Gui-Rong, et al., "Reinforcing Web-object Categorization Through Interrelationships", Data mining and Knowledge Discovery, vol. 12, Apr. 4, 2006, pp. 229-248.*

Anyanwu, Kemafor, et al., "SemRank: Ranking Complex Relationship Search Results on the Semantic Web", WWW 2005, Chiba, Japan, May 10-14, 2005, pp. 117-127.*

International Search Report and Written Opinion Mailed on Oct. 11, 2008 for PCT Application No. PCT/US08/68979, 7 pages.

FAIR, "Record Linkage in the National Dose Registry of Canada", European Journal of Cancer, vol. 3, Supp. 3, pp. S37-S43, XP005058648 ISSN: 0959-8049, Apr. 1997.

International Search Report and Written Opinion, for PCT/US2007/012073, Mailed Jul. 23, 2008, 12 pages.

Office Action Issued in U.S. Appl. No. 11/809,792, mailed Aug. 21, 2009, 14 pages.

Oracle Data Hubs: "The Emperor Has No Clothes?", Feb. 21, 2005, Google.com, pp. 1-9.

IEEE, no matched results, Jun. 30, 2009, p. 1.

IEEE No matched Results, 1 Page, Sep. 11, 2009.

Office Action issued in U.S. Appl. No. 11/522,223 dated Aug. 20, 2008, 16 pgs.

Office Action issued in U.S. Appl. No. 11/522,223 dated Feb. 5, 2009, Adams, 17 pages.

Notice of Allowance issued for U.S. Appl. No. 11/522,223, dated Sep. 17, 2009, 20 pages.

(56) References Cited

OTHER PUBLICATIONS

De Rose, et al. "Building Structured Web Community Portals: A Top-Down, Compositional, and Incremental Approach", VDLB, ACM, pp. 399-410, Sep. 2007.

Microsoft Dictionary, "normalize", at p. 20, Fifth Edition, Microsoft Corp., downloaded from http://proquest.safaribooksonline.com/0735614954 on Sep. 8, 2008.

Office Action issued in U.S. Appl. No. 11/521,928 dated Apr. 1, 2009, 22 pages.

Office Action issued in U.S. Appl. No. 11/521,928 dated Sep. 16, 2008, 14 pages.

Notice of Allowance issued for U.S. Appl. No. 11/521,928, dated Sep. 18, 2009, 20 pages.

Gopalan Suresh Raj, Modeling Using Session and Entity Beans, Dec. 1998, Web Cornucopia, pp. 1-15.

Scott W. Ambler, Overcoming Data Design Challenges, Aug. 2001, p. 1-3.

XML, Java, and the future of the Web, Bosak, J., Sun Microsystems, Mar. 10, 1997, pp. 1-9.

Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115, 1995.

International Search Report mailed on Jul. 19, 2006, for PCT/IL2005/000784 (6 pages).

Office Action Issued in U.S. Appl. No. 11/521,946 mailed May 14, 2008, 10 pgs.

Office Action issued in U.S. Appl. No. 11/521,946 mailed Dec. 9, 2008, 10 pgs.

Office Action issued in U.S. Appl. No. 11/521,946 mailed May 13, 2009, 12 pgs.

Freund et al., Statistical Methods, 1993, Academic Press Inc., United Kingdom Edition, pp. 112-117.

Waddington, D., "Does it signal convergence of operational and analytic MDM?" retrieved from the internet:<URL:http://www.intelligententerprise.com>, 2 pages, Aug. 2006.

International Search Report mailed on Oct. 10, 2008, for PCT Application No. PCT/US07/20311 (10 pp).

International Preliminary Report on Patentability Under Chapter 1 for PCT Application No. PCT/US2008/058665, issued Sep. 29, 2009, mailed Oct. 8, 2009, 6 pgs.

Martha E. Fair, et al., "Tutorial on Record Linkage Slides Presentation", Chapter 12, pp. 457-479, Apr. 1997.

International Search Report and Written Opinion mailed on Aug. 28, 2008 for Application No. PCT/US2008/58665, 7 pgs.

C.C. Gotlieb, Oral Interviews with C.C. Gotlieb, Apr. 1992, May 1992, ACM, pp. 1-72.

Google.com, no match results, Jun. 30, 2009, p. 1.

Supplementary European Search Report for EP 07 79 5659 dated May 18, 2010, 5 pages.

Newcombe et al., "The Use of Names for Linking Personal Records", Journal of the American Statistical Association, vol. 87, Dec. 1, 1992, pp. 335-349.

International Preliminary Report on Patentability, PCT/US2008/58404, Mar. 21, 2011, 4 pages.

European Search Report/EP07795659.7, Apr. 15, 2011, 7 pages.

International Preliminary Report on Patentability Issued in PCT/US2007/013049, Mailed Dec. 17, 2008, 3 pages.

International Search Report and Written Opinion issued in PCT/US2007/013049, mailed Jun. 13, 2008, 10 pages.

Hamming Distance, HTML. Wikipedia.org, Available: http://en.wikipedia.org/wiki/Hamming_distance (as of May 8, 2008), 1 page.

Merriam-Webster dictionary defines "member" as "individuals", 2008, 2 pages.

International Search Report and Written Opinion issued in PCT/US07/89211, mailing date of Jun. 20, 2008, 8 pages.

International Search Report and Written Opinion for PCT/US08/58404, dated Aug. 15, 2008, 7 pages.

International Search Report and Written Opinion mailed on Dec. 3, 2008 for International Patent Application No. PCT/US2008/077985, 8 pages.

International Search Report and Written Opinion mailed on Dec. 2, 2008 for PCT/US2008/077970, 7 pages.

European Communication for EP 98928878 (PCT/US9811438) dated Feb. 16, 2006, 5 pages.

European Communication for EP 98928878 (PCT/US9811438) dated Mar. 10, 2008, 4 pages.

European Communication for EP 98928878 (PCT/US9811438) dated Jun. 26, 2006, 4 pages.

Gill, "OX-LINK: The Oxford Medical Record Linkage System", Internet Citation, 1997, pp. 15-33.

European Communication for EP 07795659 (PCT/US2007013049) dated May 27, 2010, 6 pages.

Jason Woods, et al., "Baja Identity Hub Configuration Process", Publicly available on Apr. 2, 2009, Version 1.3., 12 pages.

Initiate Systems, Inc. "Refining the Auto-Link Threshold Based Upon Scored Sample", Publicly available on Apr. 2, 2009; memorandum, 18 pages.

Initiate Systems, Inc. "Introduction", "False-Positive Rate (Auto-Link Threshold)", Publicly available on Apr. 2, 2009; memorandum, 3 pages.

Jason Woods, "Workbench 8.0 Bucket Analysis Tools", Publicly available on Apr. 2, 2009, 42 pages.

"Parsing" Publicly available on Oct. 2, 2008, 6 pages.

Initiate, "Business Scenario: Multi-Lingual Algorithm and Hub," Publicly available on Apr. 2, 2009, 2 pages.

Initiate, "Business Scenario: Multi-Lingual & Many-To-Many Entity Solutions", Publicly available on Apr. 2, 2009, 16 pages.

Initiate, "Relationships-MLH", presentation; Publicly available on Sep. 28, 2007, 9 pages.

Initiate, "Multi-Lingual Hub Support via Memtype Expansion", Publicly available on Apr. 2, 2009, 4 pages.

Initiate Systems, Inc. "Multi-Language Hubs", memorandum; Publicly available on Apr. 2, 2009, 2 pages.

Initiate, "Business Scenario: Support for Members in Multiple Entities", Publicly available on Oct. 2, 2008, 2 pages.

Initiate, "Group Entities", Publicly available on Mar. 30, 2007, 20 pages.

Jim Cushman, MIO 0.5: MIO As a Source; Initiate; Publicly available on Oct. 2, 2008, 14 pages.

Initiate, "Provider Registry Functionality", Publicly available on Oct. 2, 2008, 4 pages.

Edward Seabolt, "Requirement Specification Feature #NNNN Multiple Entity Relationship", Version 0.1—Draft; Publicly available on Oct. 2, 2008, 4 pages.

Initiate, "Arriba Training Engine Callouts", presentation; Publicly available on Mar. 30, 2007, 16 pages.

Initiate, "Business Scenario: Callout to Third Party System", Publicly available on Oct. 2, 2008, 4 pages.

John Dorney, "Requirement Specification Feature #NNNN Conditional Governance", Version 1.0—Draft; Publicly available on Oct. 2, 2008, 15 pages.

Initiate, Release Content Specification, Identity Hub Release 6.1, RCS Version 1.0; Publicly available on Sep. 16, 2005, 38 pages.

Initiate, "Initiate Identity Hub™ Manager User Manual", Release 6.1; Publicly available on Sep. 16, 2005, 159 pages.

End User Training CMT; CIO Maintenance Tool (CMT) Training Doc; Publicly available on Sep. 29, 2006, 17 pages.

"Hierarchy Viewer—OGT 3.0t", Publicly available on Sep. 25, 2008, 4 pages.

"Building and Searching the OGT", Publicly available on Sep. 29, 2006, 22 pages.

Sean Stephens, "Requirement Specification B2B Web Client Architecture", Version 0.1—Draft; Publicly available on Sep. 25, 2008, 16 pages.

"As of: OGT 2.0", Publicly available on Sep. 29, 2006, 23 pages.

Initiate, "Java SDK Self-Training Guide", Release 7.0; Publicly available on Mar. 24, 2006, 141 pages.

Initiate, "Memtype Expansion Detailed Design", Publicly available on Apr. 2, 2009, 3 pages.

(56) References Cited

OTHER PUBLICATIONS

"Implementation Defined Segments—Exhibit A", Publicly available on Mar. 20, 2008, 13 pages.

Initiate, "Implementation Defined Segments—Gap Analysis", Publicly available on Mar. 20, 2008, 2 pages.

"Supporting Hierarchies", Publicly available on Nov. 29, 2007, 6 pages.

International Preliminary Report on Patentability, PCT/US2007/89211, Apr. 30, 2012, 6 pages.

European Search Report/EP07795108.5, May 29, 2012, 6 pages.

Emdad Ahmed, "A Survey on Bioinformatics Data and Service Integration Using Ontology and Declaration Workflow Query Language", Department of Computer Science, Wayne State University, USA, Mar. 15, 2007, pp. 1-67.

Chinese Office Action and Translation, App. No. 200880117086.9, Jul. 3, 2013, 10 pages.

European Search Report/EP08833215.0, Jul. 25, 2013, 7 pages.

Elfeky et al., "TAILOR: A Record Linkage Toolbox", IEEE Comp. Soc., vol. Conf. 18, Feb. 26, 2002, pp. 17-28.

Baxter et al., "A Comparison of Fast Blocking Methods for Record Linkage", 2003, pp. 1-6.

Bilenko et al., "Adaptive Blocking: Learning to Scale Up Record Linkage", ICDM '06, Dec. 1, 2006, pp. 87-96.

* cited by examiner

FIG. 34

InSpector

Inspector Home | Search and Inspect

Search and Inspect | Resolve Tasks | Add a Member | Logout | Help

Search and Inspect
Complete the following steps to locate the item you wish to view

- Step 1 of 3: Search for the following: [Identity ▼]
- Step 2 of 3: Enter Search Parameters: Modify search parameters [Continue...]
- Step 3 of 3: Select Item to View:

Search Results
|K < Displaying Items 1 to 3 of 3 > >|

| | Score | Name | Home Address | Home Phone | Sex | SSN | Birthday |
|---|---|---|---|---|---|---|---|
| Select an Action ▼ [Go] | 6.2 | Countryman, Patricia Mary | P.O. Box 2219, Concord, CA 94520 | 925-686-9876 | F | 263199066 | 11/20/1956 |
| Select an Action ▼ [Go] | 5.8 | Contryman, Patricia | P.O. Box 2919, Concord, CA 94520 | 925-686-9876 | F | 263199065 | 11/20/1956 |
| Select an Action ▼ [Go] | 5.8 | Contryman, Patricia | P.O. Box 2919, Concord, CA 94520 | 925-686-9876 | F | 263199065 | 11/20/1956 |

*FIG. 35*

INDEXING, RELATING AND MANAGING INFORMATION ABOUT ENTITIES

TECHNICAL FIELD

This invention relates generally to a system and method for associating data records within one or more databases, and in particular to a system and method for identifying data records in one or more databases that may contain information about the same entity, associating those data records together for easier access to information about the entity, associating related entities for easier access to information about relationships between entities and interfaces for the management, manipulation and viewing of such data records, entities and relationships.

BACKGROUND

Data about almost anything, such as people, products, or parts may be stored in digital format in a data source such as a computer database. These computer databases permit this data to be accessed rapidly and may permit the data to be cross-referenced to other relevant pieces of data within the database. The databases also permit a person to query the database to find data records pertaining to a particular search criteria. A database, however, has several limitations which may limit the ability of a person to find the correct data within the database. The actual data within the database is only as accurate as the person who entered the data. Thus, a mistake in the entry of the data into the database may cause a person looking for data in the database to miss some relevant data because, for example, a last name of a person was misspelled. Another kind of mistake involves creating a new separate record for something that already has a record within the database (e.g. duplicative records, where the data records may have one or more different attributes). Furthermore, several data records may contain information about the same thing, but, for example, the names or identification numbers contained in the two data records may be different so that the database may not be able to associate the two data records with one another.

For a business that operates one or more databases containing a large number of data records, the ability to locate relevant information about a particular thing within and among the respective databases is very important, but not easily obtained. Once again, any mistake in the entry of data (including without limitation the creation of more than one data record for the same thing) at any information source may cause relevant data to be missed when the data for a particular thing is searched for in the database. In addition, in cases involving multiple information sources, each of the information sources may have slightly different data syntax or formats which may further complicate the process of finding data among the databases. An example of the need to properly identify something referred to in a data record and to locate all relevant data records in the health care field is one in which a number of different hospitals associated with a particular health care organization may have one or more information sources containing information about their patient, and a health care organization collects the information from each of the hospitals into a master database. It may be desired to link data records from all of the information sources pertaining to the same patient to enable searching for information for a particular patient in all of the hospital records.

There are several problems which limit the ability to find relevant data in such a database. Multiple data records may exist for a particular thing as a result of separate data records received from one or more information sources, which leads to a problem that can be called data fragmentation. In the case of data fragmentation, a query of the master database may not retrieve all of the relevant information about a particular thing. In addition, as described above, the query may miss some relevant information due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the wrong data records being retrieved even when the correct data records are available. These problems limit the ability to locate desired information for about a particular thing within the database.

For a variety of reasons it may also be desirable to associate various data records within these various information sources. For example, to reduce the amount of data that must be reviewed and prevent the user from picking the wrong data record, it is also desirable to identify and associate data records from the various information sources that may contain information about the same thing. There are conventional systems that locate duplicate data records within a database and delete those duplicate data records, but these systems only locate data records which are identical to each other. Thus, these conventional systems cannot determine if two data records, with for example slightly different last names, nevertheless contain information about the same entity. In addition, these conventional systems do not attempt to index data records from a plurality of different information sources, locate data records within the one or more information sources containing information about the same entity, and link those data records together.

Additionally, it may be desired to associate or group data records within various information sources where the various data records pertain to a particular logical or physical thing. For example, different family members may each have distinct data records yet it may still be desirable to associate these various distinct data records with one another such that the grouping of data records represents a household. Another example may be the association of various distinct data records together to represent a division within a business, etc. In other words, it may be desired to group distinct data records together according to almost any logical pr physical group or thing.

Similarly, data records in an information source may relate to one another in a variety of manners and it may be desired to associate data records within multiple information sources in a manner which expresses relationships between those things on which the data records contain information. For example, one data record may comprise information on an employer while another data record may comprise information on an employee, it may thus be desired to associate the two data records in a manner which expresses this employer/employee relationship. Similarly, one data record may comprise information on a parent corporation and another data record may comprise information on a subsidiary corporation. Here as well it may be desired to associate the two data records in a manner which expresses this parent/subsidiary relationship between the corporations on which the data records comprise information.

Thus, as can be seen from the above discussion, in many cases it may be desired to associate data records for a variety of reasons and purposes to allow a user to better manipulate, organize, filter or otherwise process data in a variety of data sources. As may also be discerned the manipulation, organization or processing or viewing of such a large amount of data may be somewhat problematic, especially once data records have been grouped to represent various things and the relationships between these various things have also been represented. Thus, not only is it desired to be able to associate these data records in an arbitrarily complex manner to represent various things and the relationships amongst these things, but it is also desired to have an interface which allows the management, manipulation or visualization of such data records and associations.

BRIEF SUMMARY

Systems and methods for use in association with a master entity index system which allows data records to be process, updated, stored or managed are presented herein. More specifically, embodiments of such a master entity index system may allow data records to be grouped together into various entities, where each of the entities may represent a logical or physical item. These entities may also be associated with one another in a manner such that relationships between entities may likewise be represented.

Particularly, in one embodiment, a set of entity types representing logical or physical items may be defined and data records algorithmically associated with one or more entities corresponding to an entity type. One or more relationship types may also be defined such that data records may be related to one or more entities and entities themselves related to one or more other entities using these relationships. In this manner, data records from a variety of data sources may be associated with entities representing a variety of real world (or application specific, etc.) phenomena and relationships between these entities established and tracked.

Additionally, in one embodiment an interface may be provided for use in conjunction with such a master entity index system to facilitate management, manipulation or visualization of these various entities and relationships. This interface may allow a user to search for or otherwise obtain an entity, where a representation of this entity and one or more associated entities may be presented to the user along with representations of the relationships between these entities. Such an interface may allow a user to obtain a wide variety of information or accomplish a whole host of tasks with respect to the entities and relationships maintained by the master entity index system, as will be explained in more detail below.

Embodiments of the present invention may provide the technical advantages that data record from various data sources may be associated with a variety of types entities, resulting in the representation of many different types of logical or physical phenomena, the relationships between these phenomena and the disambiguation of various data records which may be received from the variety of different sources with respect to these various entities. Furthermore, a current state (e.g. of the entities and relationships) of the master entity index system (or a portion thereof) may be loaded and represented graphically for a user, such that a user can manipulate the graphical representation to change the underlying state of the master entity index system.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein. Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE SEVERAL VIEWS OF THE DRAWINGS

FIGS. 34-48 depict one embodiment of a graphical interface for interacting with a master entity index system or its associated databases.

DETAILED DESCRIPTION

Figure 1:
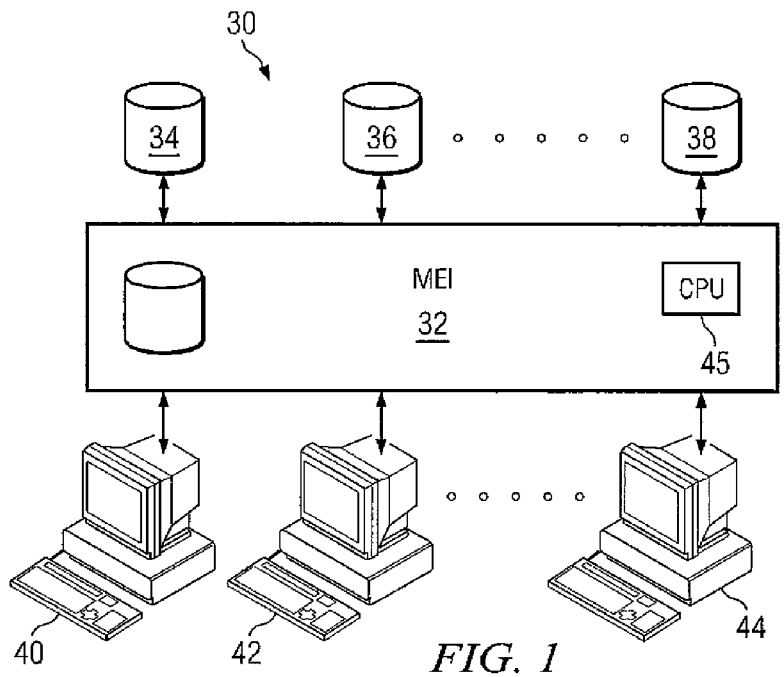
FIG. 1 is a block diagram illustrating one embodiment of a system including a master entity index system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements). In one embodiment, the system and method of the invention is particularly applicable to a system and method for indexing information from multiple information sources pertaining to organizations. It is in this context that certain embodiments will be described. It will be appreciated, however, that the systems and methods in accordance with embodiments of the invention have utility in a large number of applications that involve identifying, associating, manipulating or otherwise managing data records in a variety of contexts.

In reviewing embodiments of the systems and methods of the present invention, it may first be helpful to go over examples of embodiments of systems and methods for associating and indexing data records which may be utilized in conjunction with embodiments of the present invention, such as those described in U.S. Pat. No. 5,991,758, entitled "System and Method for Indexing Information about Entities from Different Information Sources", issued Nov. 23, 1999 by inventor Scott Ellard and U.S. patent application Ser. No. 11/656,111 entitled "Method and System for Indexing Information about Entities with Respect to Hierarchies", filed Jan. 22, 2007, and issued on Apr. 28, 2009 as U.S. Pat. No. 7,526,486, by inventors Scott Ellard et al both of which are hereby incorporated by reference in their entirety.

After reviewing the discussions presented herein and the above reference patent it will be apparent that there may be a variety reasons why it is desired to associate, index or otherwise manage data records from a variety of sources. To that end, attention is now directed to systems and methods for use in association with a master entity index system which allows data records to be process, updated, stored or managed. More specifically, embodiments of such a master entity index system may allow data records to be grouped together into various entities, where each of the entities may represent a logical or physical item. These entities may also be associated with one another in a manner such that relationships between entities may likewise be represented.

Particularly, in one embodiment, a set of entity types representing logical or physical items may be defined and data records algorithmically associated with one or more entities corresponding to an entity type. One or more relationship types may also be defined such that data records may be related to one or more entities and entities themselves related to one or more other entities using these relationships. In this manner, data records from a variety of data sources may be associated with entities representing a variety of real world (or application specific, etc.) phenomena and relationships between these entities established and tracked.

Additionally, an interface may be provided for use in conjunction with an embodiment of a master entity index system such that these various entities and relationships may be better managed, manipulated or visualized. In one embodiment, this interface may allow a user to search for or otherwise obtain an entity, where a representation of this entity and one or more associated entities may be presented to the user along with representations of the relationships between these entities. Such an interface may allow a user to obtain a wide variety of information or accomplish a whole host of tasks with respect to the entities and relationships maintained by the master entity index system, as will be explained in more detail below.

Turing now to FIG. 1 a block diagram illustrating one embodiment of a master entity index system 30 is presented. The master entity index system may include a master entity index (MEI) 32 that processes, updates and stores data records about one or more entities from one or more information sources 34, 36, 38 and responds to commands or queries from a plurality of operators 40, 42, 44, where the operators may be either users or information systems. The MEI may operate with data records from a single information source or, as shown, data records from one or more information sources. It may be useful here to briefly illustrate the examples of such data records. The MEI may be a computer system with a central processing unit 45 executing a software application (e.g. computer executable instructions) that performs at least a portion of the functionality of the MEI.

Reading thus far it will be apparent to those of ordinary skill in the art, that both the data sources 34, 36, 38 and the operators 40, 42, 44 may be affiliated with similar or different organizations or owners. For example, data source 34 may be affiliated with a hospital in Los Angeles run by one health care network, while data source 36 may be affiliated with a hospital in New York run by another health care network. Consequently, the data records of each of data sources may be of a different format or may pertain to different types of items.

Figure 2A:
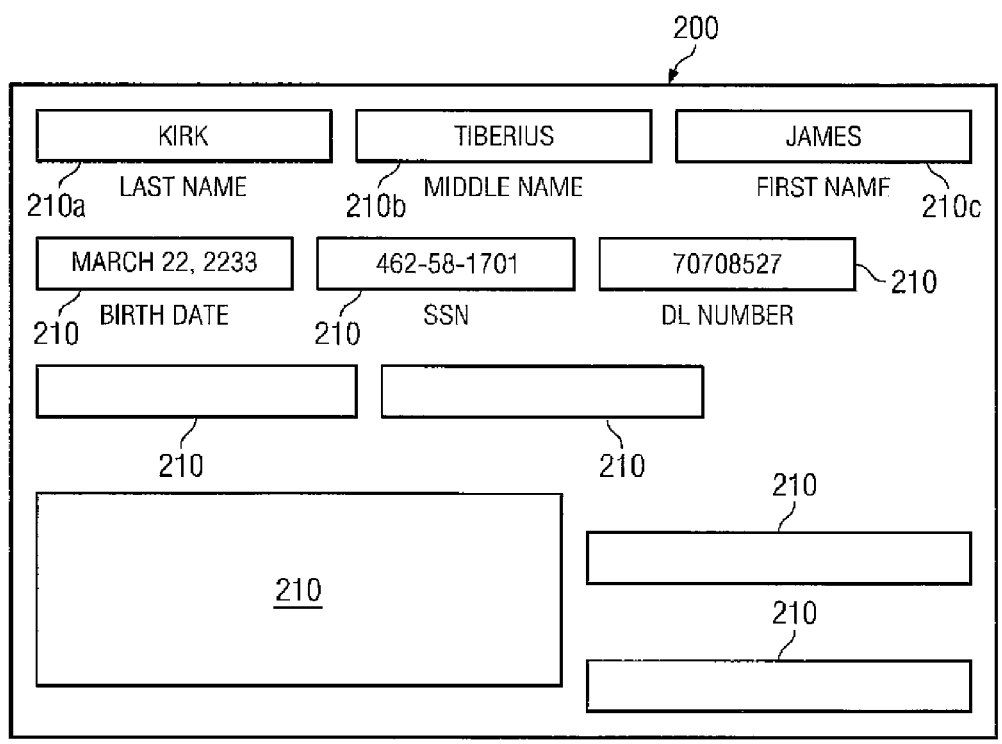
FIGS. 2A and 2B are block diagrams illustrating representations of embodiments of data records.
Figure 2B:
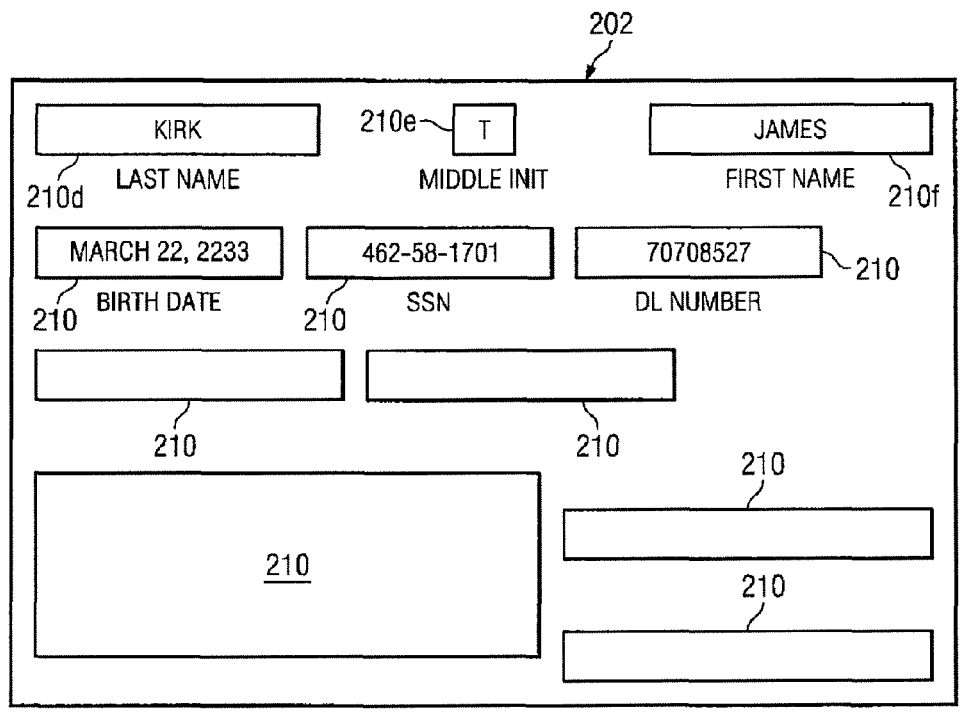

This may be illustrated more clearly with reference to FIGS. 2A and 2B, depicting two embodiments of example data records. Each of these data records 200, 202 has a set of fields 210 corresponding to a set of attributes of each of the data records. For example, one of the attributes of each of the records 200, 202 may be a name, another attribute may be a social security number, etc. It will be apparent that an attribute may comprise multiple fields 210 of a data record 200, 202, for example, the name attribute of data record 200 may comprise fields 210a, 210b and 210c, the last, middle and first name fields, respectively.

Notice, however, that each of the records may have a different format, for example data record 202 may have a field for an attribute, while data record 200 may have no such field. Similarly, like attributes may have different formats as well. For example, name fields 210a, 210b, 210c in record 200 may accept the entry of a full first, last and middle name, while name fields 210d, 210e, 210f in record 202 may be designed for full first and last names, but only allow the entry of a middle initial.

As may be imagined, discrepancies such as this may be problematic when comparing two or more data records (e.g. attributes of data records) to identify data records which should be linked. The name "James T. Kirk" is not the same as "James Tiberius Kirk". Similarly, a typo or mistake in entering data for a data record may also affect the comparison of data records (e.g. comparing the name "James T. Kirk" with "Kames T. Kirk" where "Kames" resulted from a typo in entering the name "James"). Exacerbating the data management issues which may arise with respect to data sources 34, 36, 38, in many cases data sources 34, 36, 38 may comprise data records on different items altogether. For example, data sources 34 and 36 may comprise data records pertaining to patients in a health care organization while data source 38 may comprise data records pertaining to medical supply inventories.

It may be desired therefore, not only to associate, index and manage data records which pertain to the same physical or logical entity, but also to manage data records that pertain to distinct logical or physical entities in conjunction with one another under the rubric of another type of entity. For example, data sources 34, 36, 38 may comprise data records which pertain to different people. Some of these people may, however, belong to the same family or household. Therefore, even though data sources 34, 36 38 comprise data records corresponding to a particular type of entity (e.g. a "person" entity) it may be desirable to associate, or manage, distinct records within the data sources 34, 36, 38 in conjunction with one another under another type of entity (e.g. a "household" entity).

From the above description it will be apparent therefore, that the entities with which MEI 32 associates data records in data sources 34, 36, 38 may correspond exactly to the entities on which data records in data sources 34, 36, 38 comprise data or may be an arbitrarily complex representation of any other real world, logical or physical phenomena or item with which it is desired to associate or group these data records. Consequently, the entities tracked using the MEI may include almost any desired entity, the definition of which will be explained in more detail below.

Returning to FIG. 1, as shown, the MEI 32 may receive data records from the information sources as well as write corrected data back into the information sources. The corrected data communicated to the information sources may include information that was correct, but has changed, information about fixing information in a data record or information about links between data records. In addition, one of the users 40-44 may transmit a query or other information to the MEI 32 and receive a response back from the MEI. The one or more information sources may be, for example, different databases that possibly have data records about the same entities. For example, in the health care field, each information source may be associated with a particular hospital in the health care organization and the health care organization may use the master entity index system to relate the data records within the plurality of hospitals so that a data record for a patient in Los Angeles may be located when that same patient is on vacation and enters a hospital in New York. The MEI 32 of the master entity index system 30 may be located at a central location and the information sources and users may be located remotely from the MEI and may be connected to the MEI by, for example, a communications link, such as the Internet. The MEI, the one or more information sources and the plurality of users may also be connected together by another type of communications link, such as a wide area network.

In particular the MEI may provide an application programming interface (API) such that various functionality of the MEI may be accessed or utilized through this API. In one embodiment, one or more interfaces may be implemented in conjunction with the computers of one or more users 40, 42, 44 such that these interfaces may be used by a user to query, configure or otherwise interact or perform operations associated with the MEI through the API provided by the MEI. These interfaces may, for example, include a graphical user interface (GUI), a command line interface, or one or more web pages which may be accessed through a web browser. These web pages may for example be in HTML or XHTML format, and may provide navigation to other web pages via hypertext links. These web pages may be retrieved by a user (e.g. using Hypertext Transfer Protocol or HTTP) from a local computer or from a remote web server where the server may restrict access only to a private network (e.g. a corporate intranet) or it may publish pages on the World Wide Web. Embodiments of interfaces such as these will be discussed in more detail subsequently, while embodiments of such an API for use with such interfaces may be better understood with reference to U.S. patent application Ser. No. 11/900,769 entitled "Implementation Defined Segments for Relational Database Systems, by Scott Ellard et al, filed on Sep. 13, 2007, fully incorporated herein by reference.

The MEI may, in addition, have its own database that stores the complete data records in the MEI, but the MEI may also only contain sufficient data to identify a data record (e.g., an address in a particular information source) or any portion of the data fields that comprise a complete data record so that the MEI retrieves the entire data record from an information source when needed. The MEI may link data records together containing information about an entity utilizing an entity identifier or associative database, as described below, separate from the actual data record. Thus, the MEI may maintain links between data records in one or more information sources, but does not necessarily maintain a single uniform data record for an entity. The MEI may, however, maintain one or more attribute values to be utilized in association with an entity. These values may be referred to as the entity most current attributes (EMCA) and may be values for one or more attributes which may, for example, be attribute values corresponding to one or more data records associated with the entity, where attribute values may be selected based upon a priority associated with the data records based upon the information source 34, 36, 38 comprising the data record.

Figure 3:
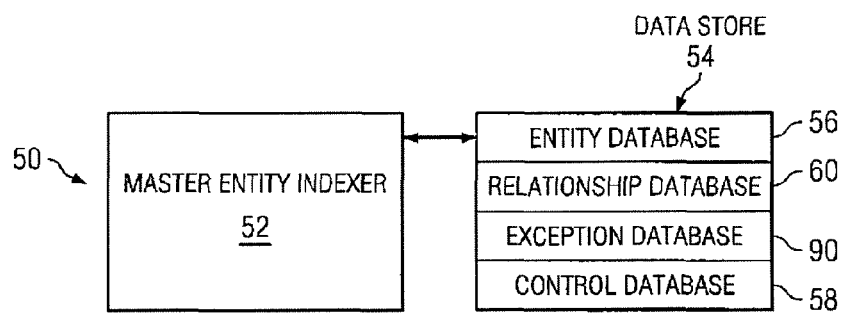
FIG. 3 is a block diagram illustrating one embodiment of a master entity index system and its associated databases.

Moving now to FIG. 3, a block diagram illustrating one particular embodiment of a master entity index system 50 is depicted. In this example, the master entity index system may include a master entity index 52 and a data store 54. For clarity, the one or more information sources and the multiple users are not shown, but are connected to the master entity index 52 as previously described in conjunction with FIG. 1. The data store 54 may include an entity database 56, one or more control databases 58 and an exception occurrence database 90. The entity database may store the data from the data records as specified above from the one or more information sources and may separately store links between one or more data records when those data records contain information about the same entity and links. The relationship database 60 may store associations established between one or more entities in the entity database, where these entities have been associated based upon a corresponding relationship (e.g. as will be discussed in more detail later). The MEI 52 may process the data records from the one or more information sources and associate records that contain information about the same entity, and generate the links between the separate data records when the data records contain information about the same entity. Furthermore, the MEI 52 may allow users to establish relationships between theses entities based upon a set of defined relationship types.

As data records from the information sources are fed into the MEI, the MEI may attempt to match the incoming data record to one or more data records already located in the MEI database according to a matching algorithm configured in association with each entity type (these matching methods are set forth in more detail in U.S. Pat. No. 5,991,758). If an incoming data record matches an existing data record according to a matching algorithm corresponding to a particular entity type, a link between the incoming data record and the matching data record may be generated such that both the incoming data record and the existing data record are associated with the same entity of that entity type. If the incoming data record does not match any of the existing data records in the MEI according to a particular matching algorithm corresponding to a particular entity type, a new entity identifier corresponding to that entity type may be generated and associated with the incoming data record. In both cases, the incoming data record may be stored in the MEI. As additional data records are received from the information sources, these data records are matched to existing data records (e.g. and thus entities) and the MEI database of data records is increased.

Figure 4:
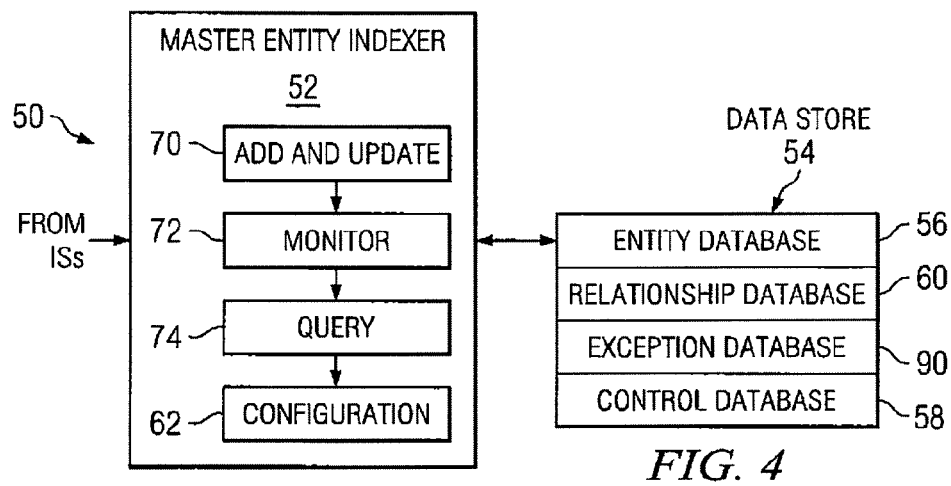
FIG. 4 is a block diagram illustrating one embodiment of a database which may be associated with a master entity indexer.

FIG. 4 is a block diagram illustrating more details of the master entity index system 50, and in particular the MEI 52 and the data store 54. The MEI 52 may include an addition and updating unit 70, a monitor unit 72, a query unit 74 and a configuration unit 62. The addition and updating unit may perform functionality associated with adding data records about a new entity into the data store, update data records in the data store. The monitor unit may permit a user of the master entity index system to view special conditions, known as exceptions, generated by the MEI. For example, a data record that requires a person to view the data record due to an error may be tagged and a message to the operator may be generated.

The query unit permits a user of the master entity index system to query the MEI about information in the data records or information in the control databases of the MEI and the MEI will return a response to the query including any relevant data records or information. The configuration unit may allow a user or administrator to configure various portions of MEI, including without limitations the types of entities, relationships, algorithms or threshold values utilized by MEI. While the various functionality of each of these units will be explained in more detail below it should be noted that the functionality described with respect to each of the units is exemplary only and more or less functionality may be implemented in conjunction with certain embodiments. Furthermore, this functionality need not be separated into multiple units and any desired functionality may be incorporated into a single unit or multiple units according to the embodiment desired. Similarly, as discussed above one or more interfaces may be utilized in conjunction with the MEI, these interfaces may allow access to all or a portion of the functionality of these units, where one interface may be used for all units, each unit may have its own interface or some combination, depending on the embodiment desired.

Now the data store 54 of the master entity index system will be described in more detail. The data store 54 may include an entity database 56, a relationship database 60 and one or more control databases 58 or exception occurrence databases 90 as described in more detail in U.S. Pat. No. 5,991,758. The entity database 56 may comprise entity identifiers, each entity identifier associated with one or more associated data records and corresponding to a particular entity type. Thus, entity identifiers may associate or "link" those data records which reference the same entity. In this example, the data records are represented as an alphabetic identifier and the entity identifier is shown as the base part followed by a period followed by a version number followed by a period and an entity type. For example, "100.1.person" indicates an entity identifier with 100 as the base part and 1 as the version number corresponds to the "person" entity type.

The relationship database 60 may similarly comprise relationship identifiers, each relationship identifier associated with one or more associated entities and corresponding to a particular relationship type. Thus, relationship identifiers may denote a relationship of the corresponding relationship type between the associated entities. In this example, the entities are represented with their entity identifiers and the relationship identifier is shown as a base number followed by a period followed by a relationship type. For example, "200.owns: 100.1, 101.1" indicates a relationship identifier of 200 corresponds to the relationship type "owns" and designates a relationship of this type between the entities represented by entity identifiers 100.1 and 101.1.

Figure 5:
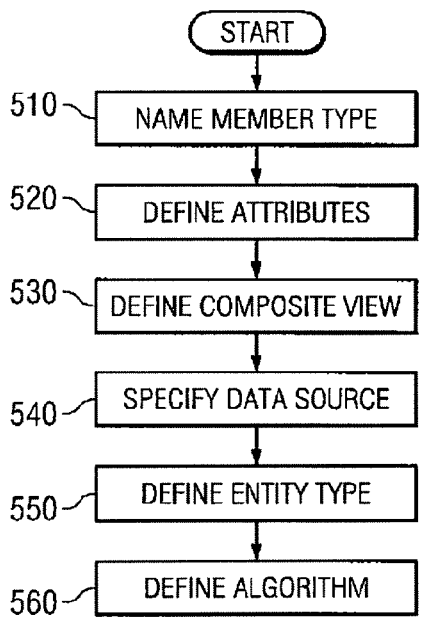
FIG. 5 is a flowchart illustrating one embodiment of the definition of an entity type.
Figure 6:
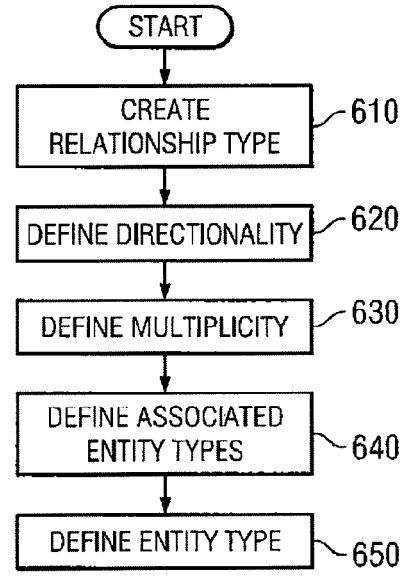
FIG. 6 is a flowchart illustrating one embodiment of the definition of a relationship type.

These entity types and relationship types may better understood with respect to FIGS. 5 and 6 which depict, respectively embodiments of methodologies for defining a entity type and a relationship type in conjunction with the configuration of the MEI. Turning first to FIG. 5, an embodiment of a method for the definition of an entity type is depicted. When a user wishes to create an entity type in conjunction with MEI, the user may first define a member type. This member type definition may delineate the attributes of a type of data record which may be found in one or more of data sources 34, 36, 38 and which it may be desired to store or otherwise reference in the data record database of the MEI. The definition of a member type may comprise therefore comprise assigning the member type a name at step 510 and defining the attributes of the member type at step 520. Each of these attributes is, in turn, given a name, a code which may be used to refer to the attribute in conjunction with other functionality of MEI and a type of the attribute. A composite view defining how (and which) attributes of the member type are to be viewed when a member data record of this type is accessed may then be defined at step 530.

At step 540 a data source 34, 36, 38 may be specified for data records of the member type. More specifically, it may be the case that attributes associated with a particular member type may be stored in multiple data sources 34, 36, 38 thus, in one embodiment, it may be possible to associate a particular data source with each attribute of the member type. After the member type is defined then, at step 550 an entity type may be defined based upon the defined member type. The definition of the entity type may denote that a user wishes to define an entity type based upon the member type. In other words, the entity type may represent a particular type of association of those member data records and it may thus be desired by a user to match, index, link or otherwise associate data records of that member type as entities according to that entity type. In association with this entity type then, a corresponding algorithm may be defined at step 560. The algorithm corresponding to the entity type may be utilized for a match operation between data records of the member type associated with the that entity type such that member data records of that member type may be associated with one another as an entity of that entity type through a match operation performed according to the algorithm corresponding to that entity type. The configuration of such an algorithm may be better understood with reference to U.S. patent application Ser. No. 11/702,410, entitled "Method and System for a Graphical User Interface for the Configuration of an Algorithm for the Matching of Data Records" by Schumacher et al filed on Feb. 5, 2007 and fully incorporated herein by reference.

Moving now to FIG. 6, an embodiment of a method for the definition of a relationship type is depicted. At step 610 a user may create a new relationship type and assign it a type descriptor. This new relationship may, in one embodiment, be started by cloning an existing relationship type. At step 620 then the user may define directionality associated with the relationship. This directionality may denote whether the relationship is bidirectional, or whether there it only applies in one direction. In other words, if a relationship applies to entities A and B, it is bidirectional (or nondirectional) if it applies to A with respect to B and B with respect to A while the relationship is unidirectional if it applies only to A with respect to B and not B with respect to A (or vice versa). For example, a relationship of type "lives with" may be bidirectional (e.g. A may live with B and B may also live with A) while a relationship of type "owns" may be unidirectional (e.g. A owns B but B does not own A).

After selecting the directionality of the relationship type, then, the user may define the multiplicity of the relationship at step 630. The multiplicity of a relationship may designate the number of entities which may correspond to the relationship. This multiplicity may designate, for example, a one to one, a many to one, a one to many or a many to many relationship type, indicating, respectively, that one entity may be related to one entity according to the relationship type, many entities may be related to one entity according to the relationship type, etc.

At step 640, the type(s) of entities which may be associated with the relationship type are defined. Here, the entity types to which the relationship type being defined may apply are specified. In other words, the relationship type may pertain, or have semantic meaning only with respect to certain entity types. These entity types may specified such that a relationship of the relationship type being defined may only designate a relationship between entities of the entity types specified. For example, a "employs" relationship type may be designated to apply to an "organization" entity type and a "person" entity type (e.g. an organization "employs" a person).

Figure 7:
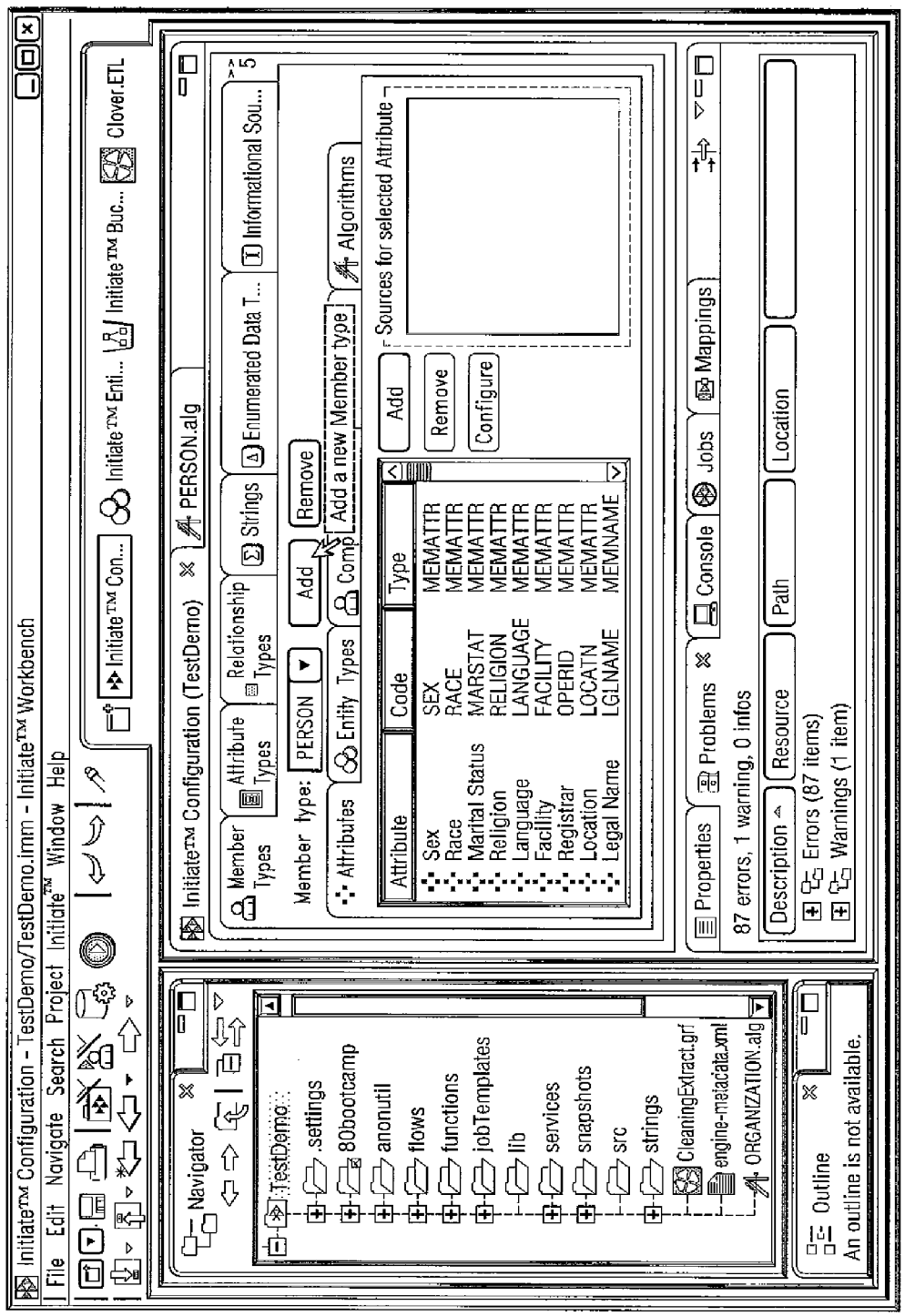
FIGS. 7-31 depict one embodiment of a graphical interface for use in the configuration of a master entity index system or its associated databases.
Figure 8:
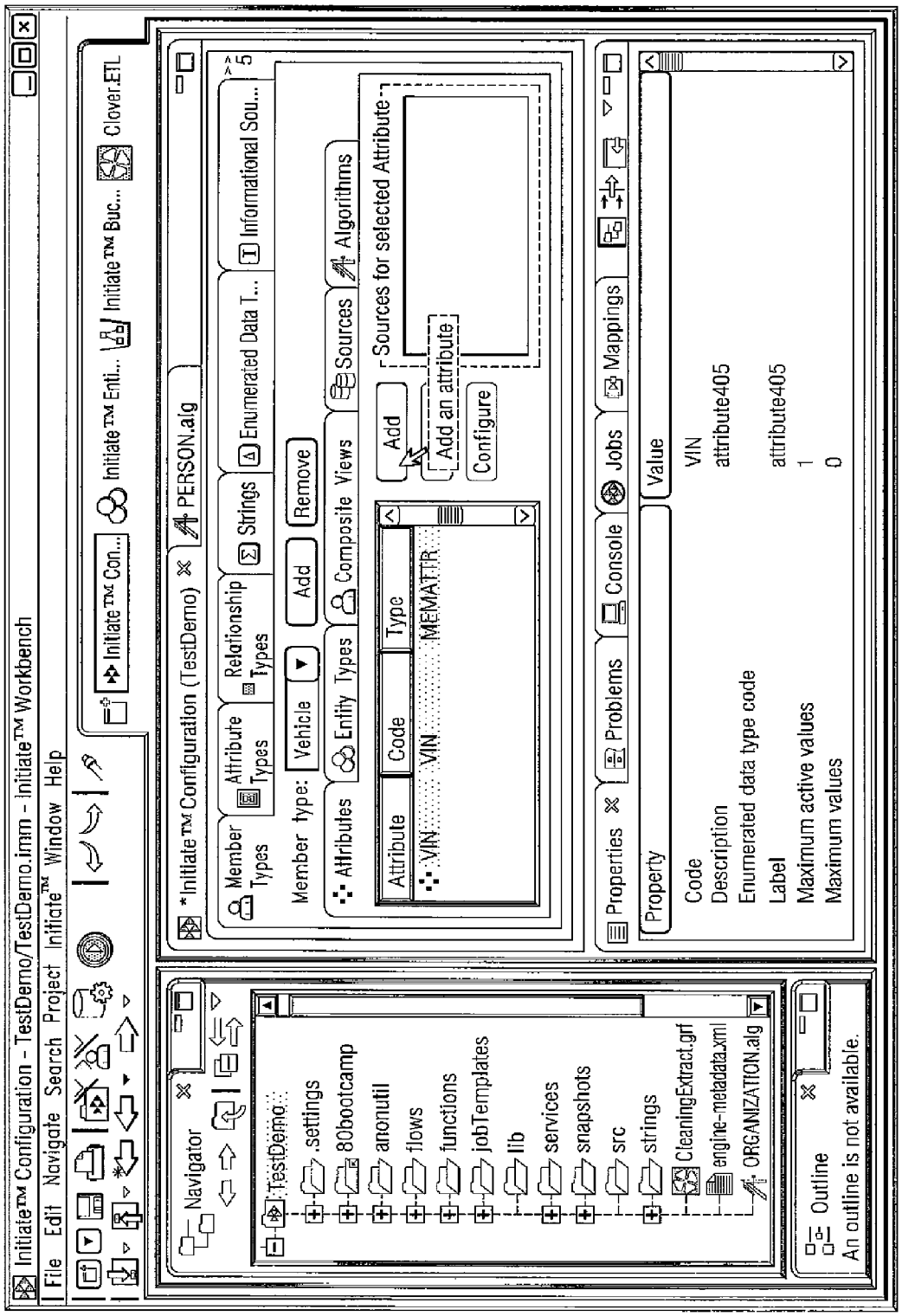
Figure 9:
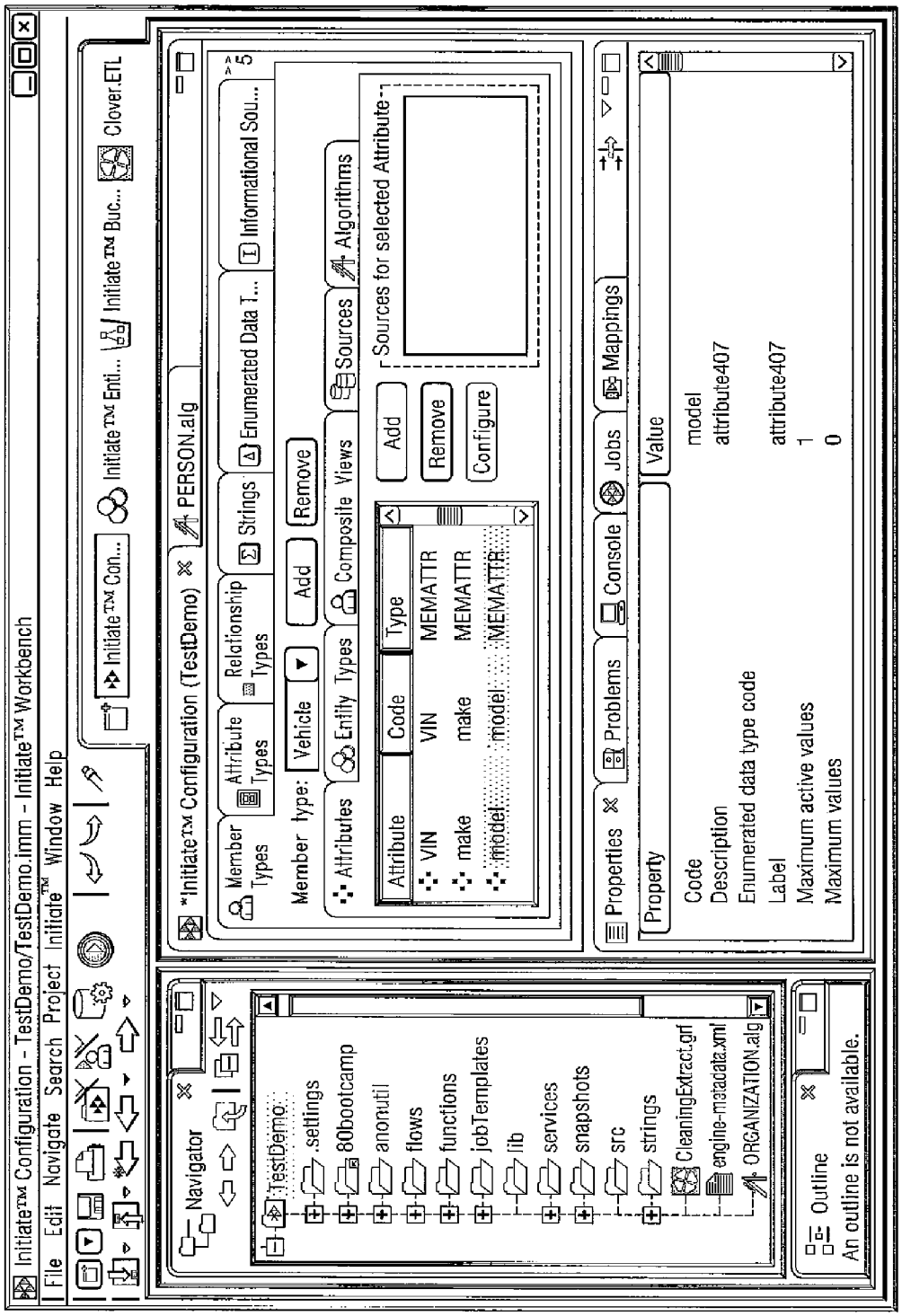

It may be useful here to illustrate the definition of an example entity type (e.g., step 650) and relationship type in conjunction with the configuration of the MEI utilizing one embodiment of an interface which may be provided for such a purpose, as discussed above. Therefore attention is first directed to FIGS. 7-26 which depict one embodiment of the definition of an entity type with respect to the MEI utilizing a graphical user interface, which may be for example a web or network based graphical interface utilizing an API provided by the MEI. Referring now to FIG. 7, a user first selects the "Add" button to add a new member type which presents the user with the screen depicted in FIG. 8 allowing a user to assign a name to the member type and associate attributes with that member type. Here the user has defined the member type "Vehicle" and associated an attribute named "VIN" with the "Vehicle" member type. In FIG. 9 the user has associated two more attributes "make" and "model" with the "Vehicle" member type.

Figure 10:
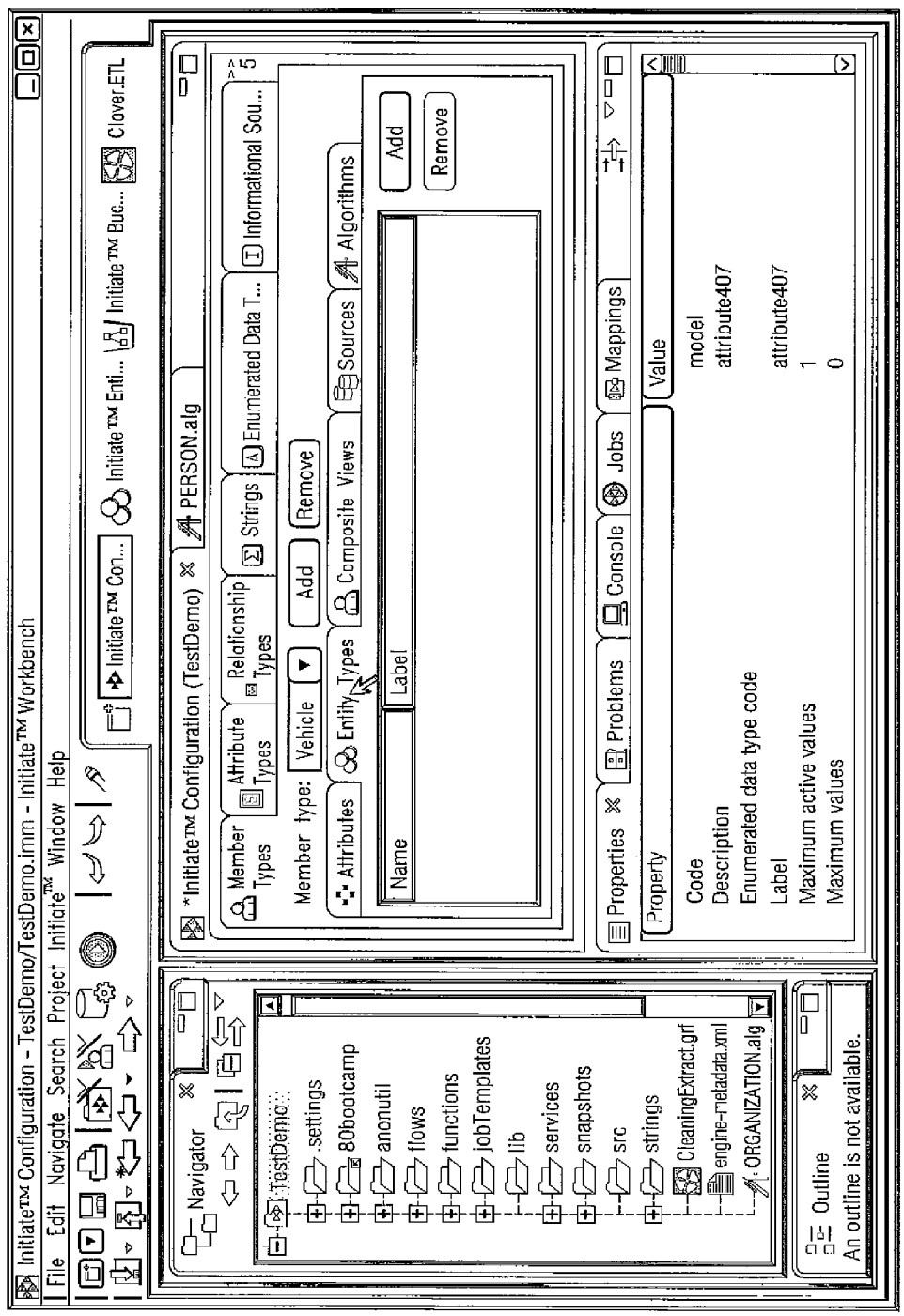
Figure 11:
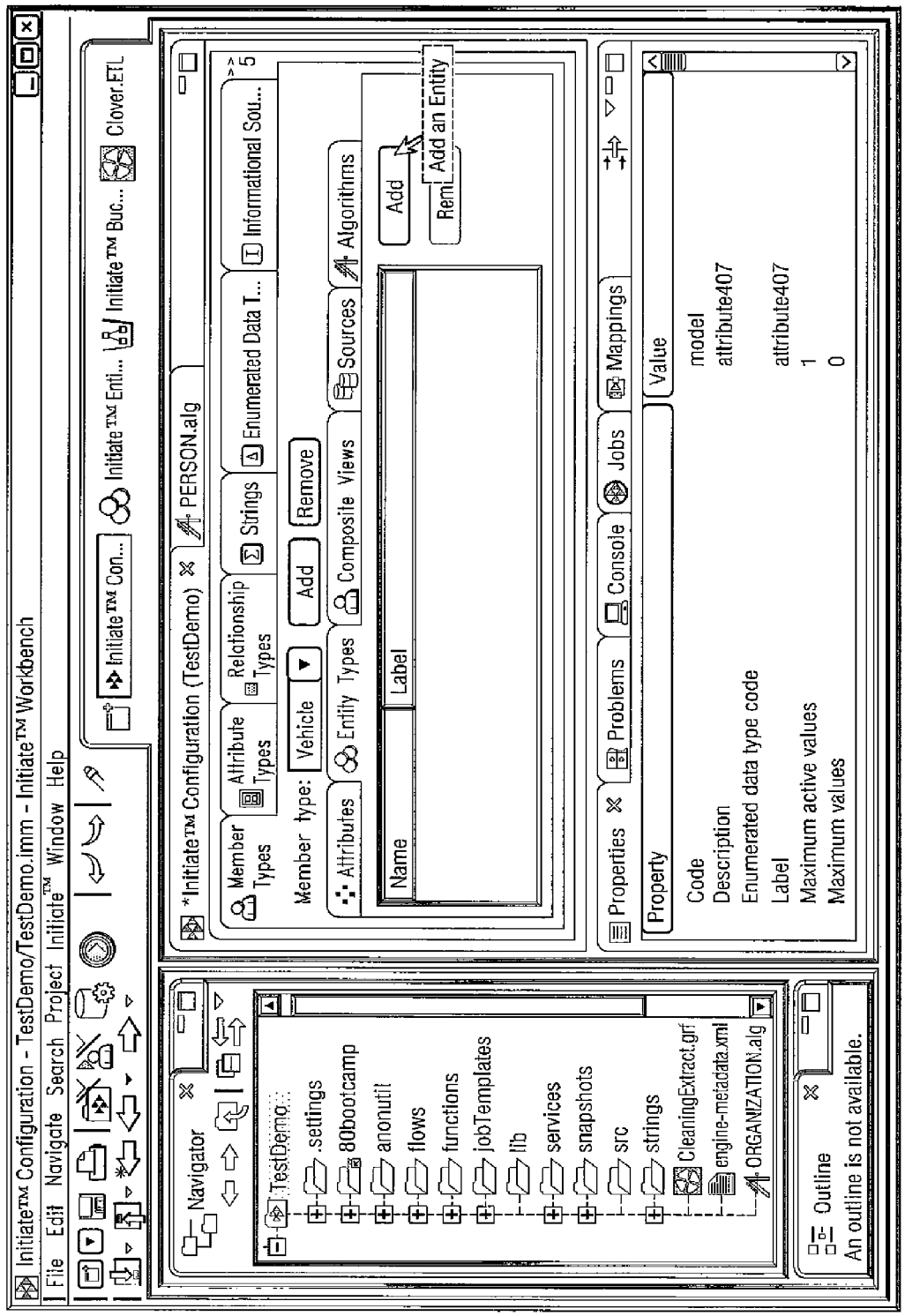
Figure 12:
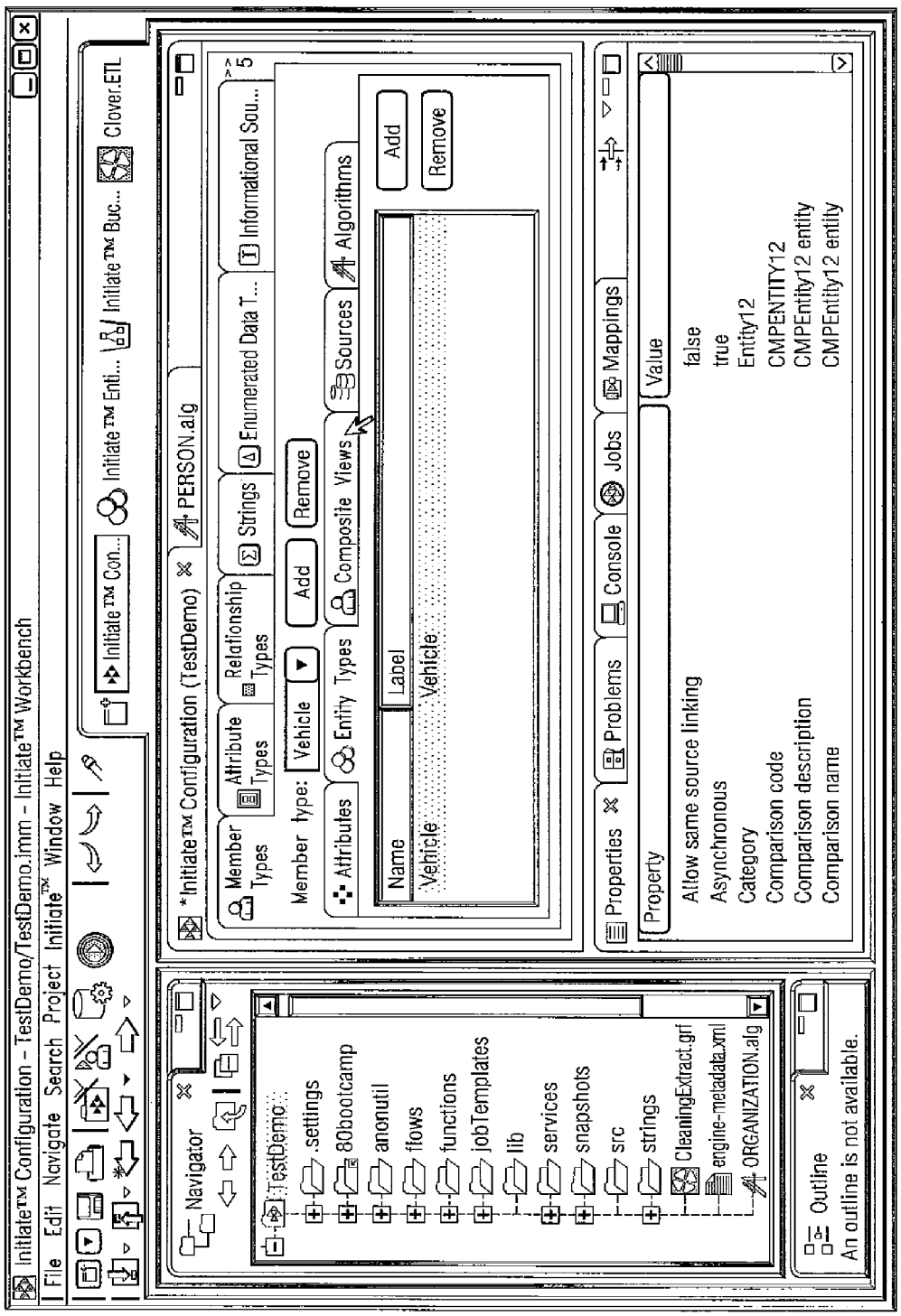
Figure 13:
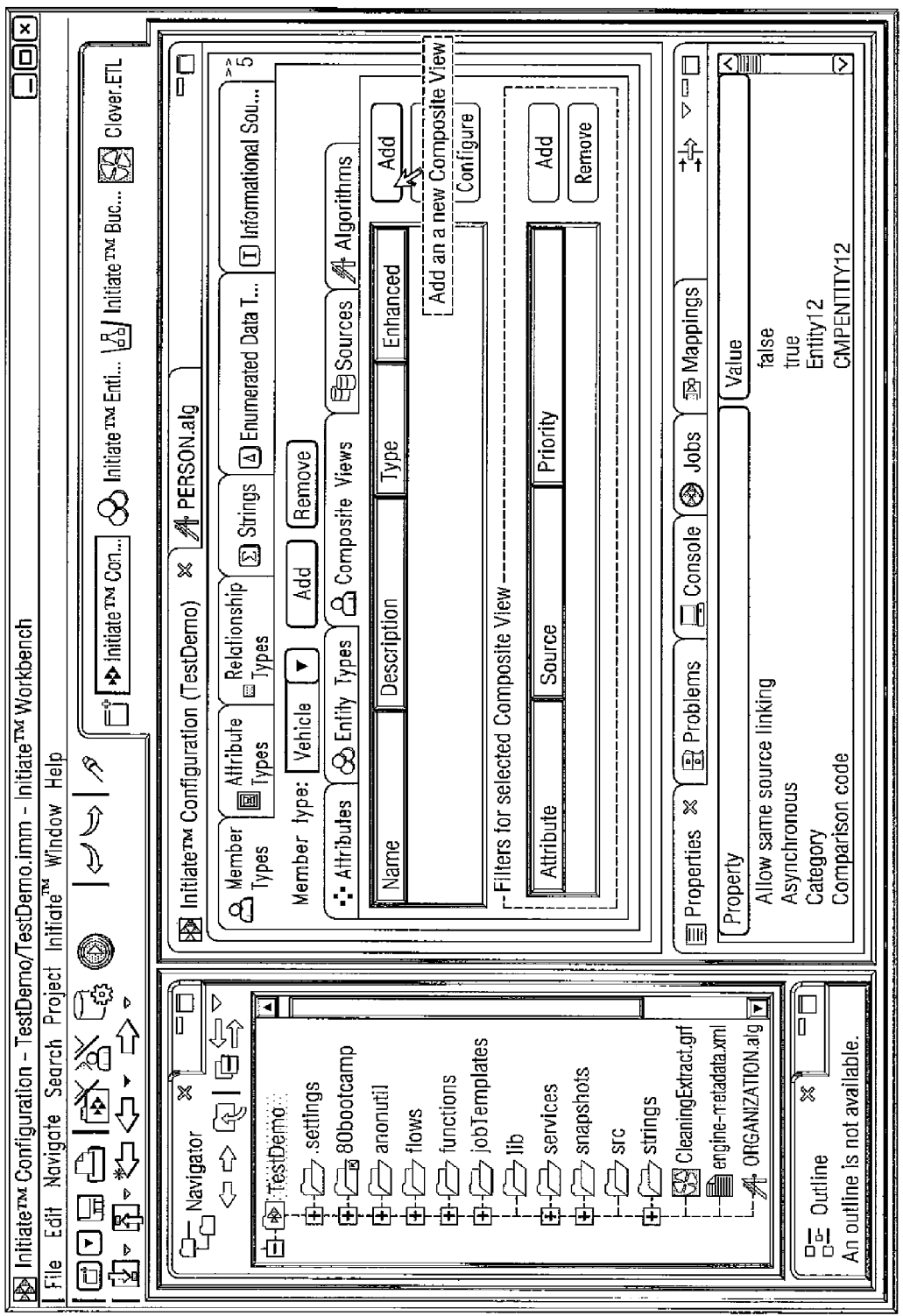
Figure 14:
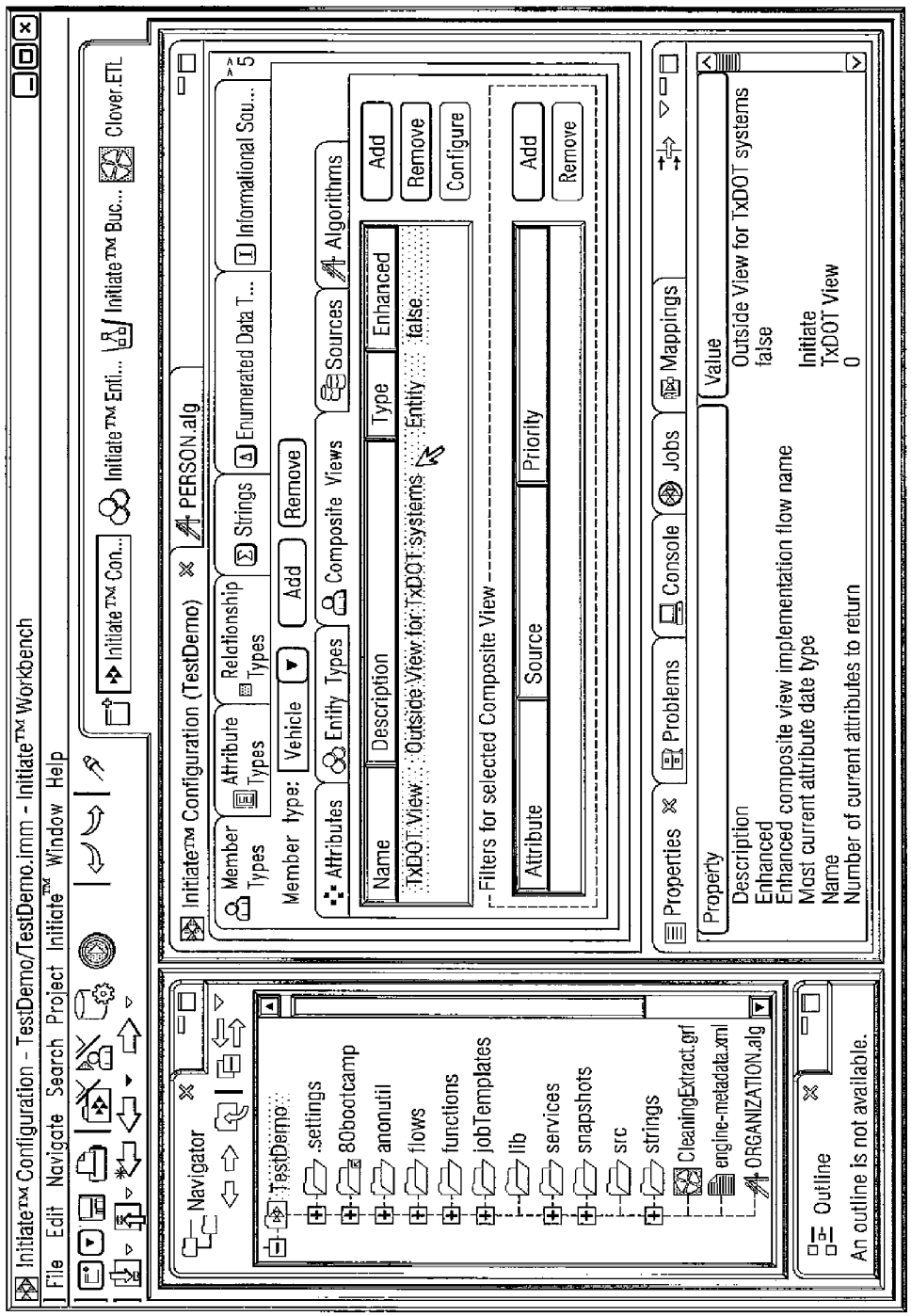

Utilizing the interface as shown in FIG. 10 then, the user selects the "Entity Types" tab to add an entity type to the configuration of the MEI by selecting the "Add" button in FIG. 11 and adding the member type "Vehicle" as an entity type in FIG. 12. The user then selects the "Composite Views" tab and the "Add" button in FIG. 13 to associate a composite view with the member type (and thus the entity type as well) and in FIG. 14 adds the "TxDot View" to the list of composite views to be used with the member type and entity type "Vehicle".

Figure 15:
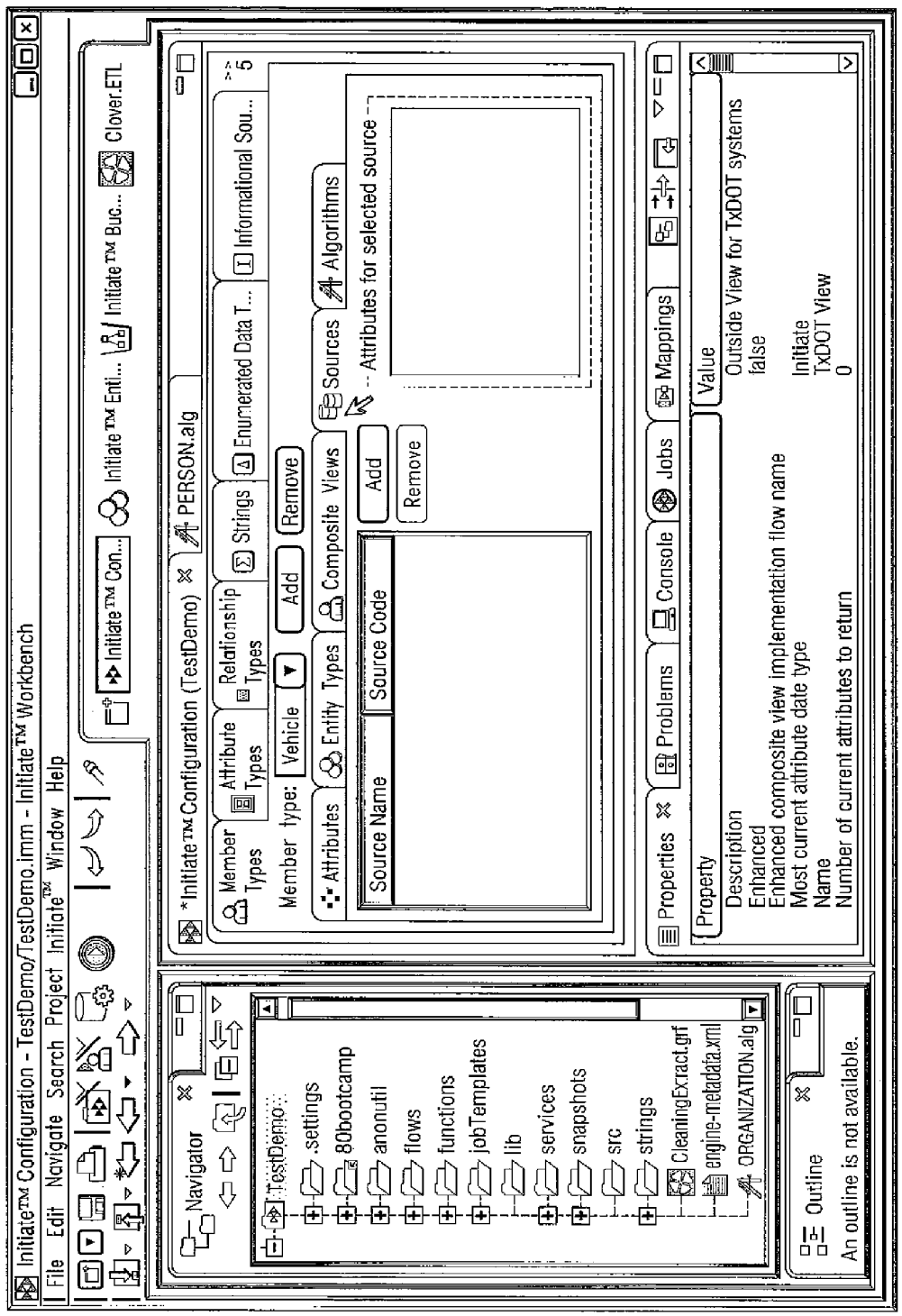
Figure 16:
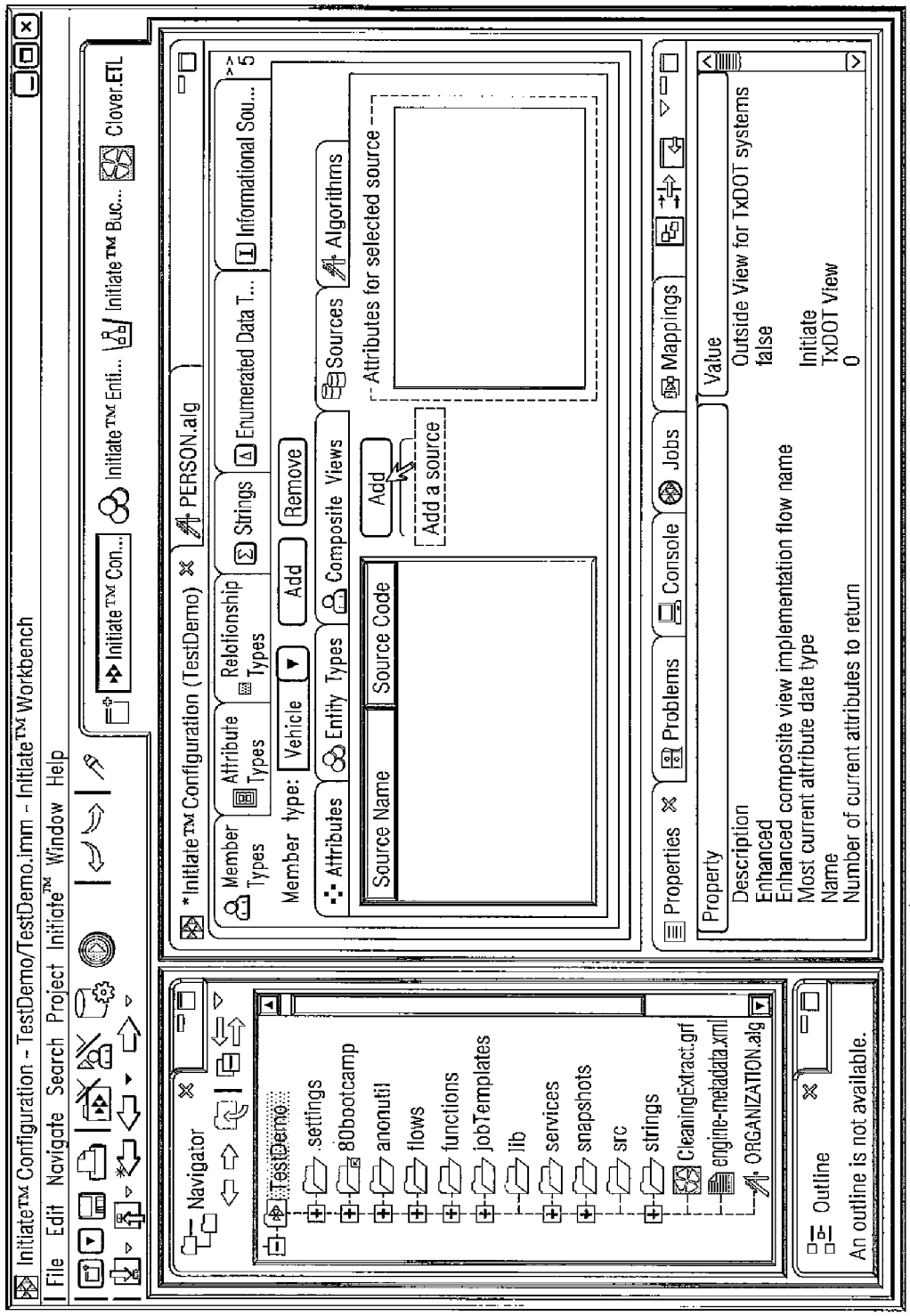
Figure 17:
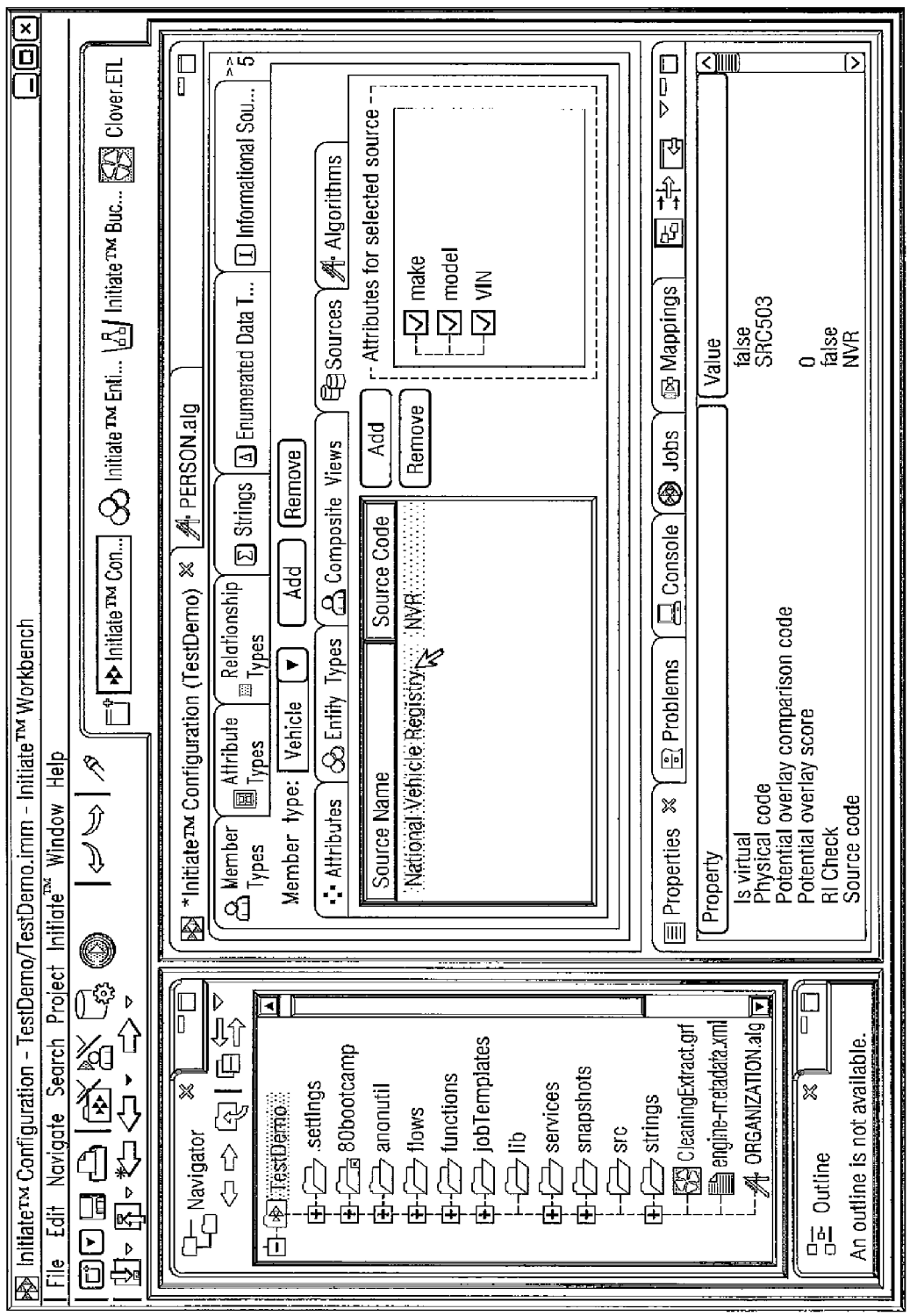

The user then selects the "Sources" tab in FIG. 15 to add a data source for data records of the member type "Vehicle" by selecting the "Add" button in FIG. 16 and adding the data source "National Vehicle Registry" in FIG. 17. Notice as well in FIG. 17 that the user is presented with the attributes "make", "model" and "VIN" associated with the member type "Vehicle" and the user has designated that these attributes are comprised by data records in the data source "National Vehicle Registry".

Figure 18:
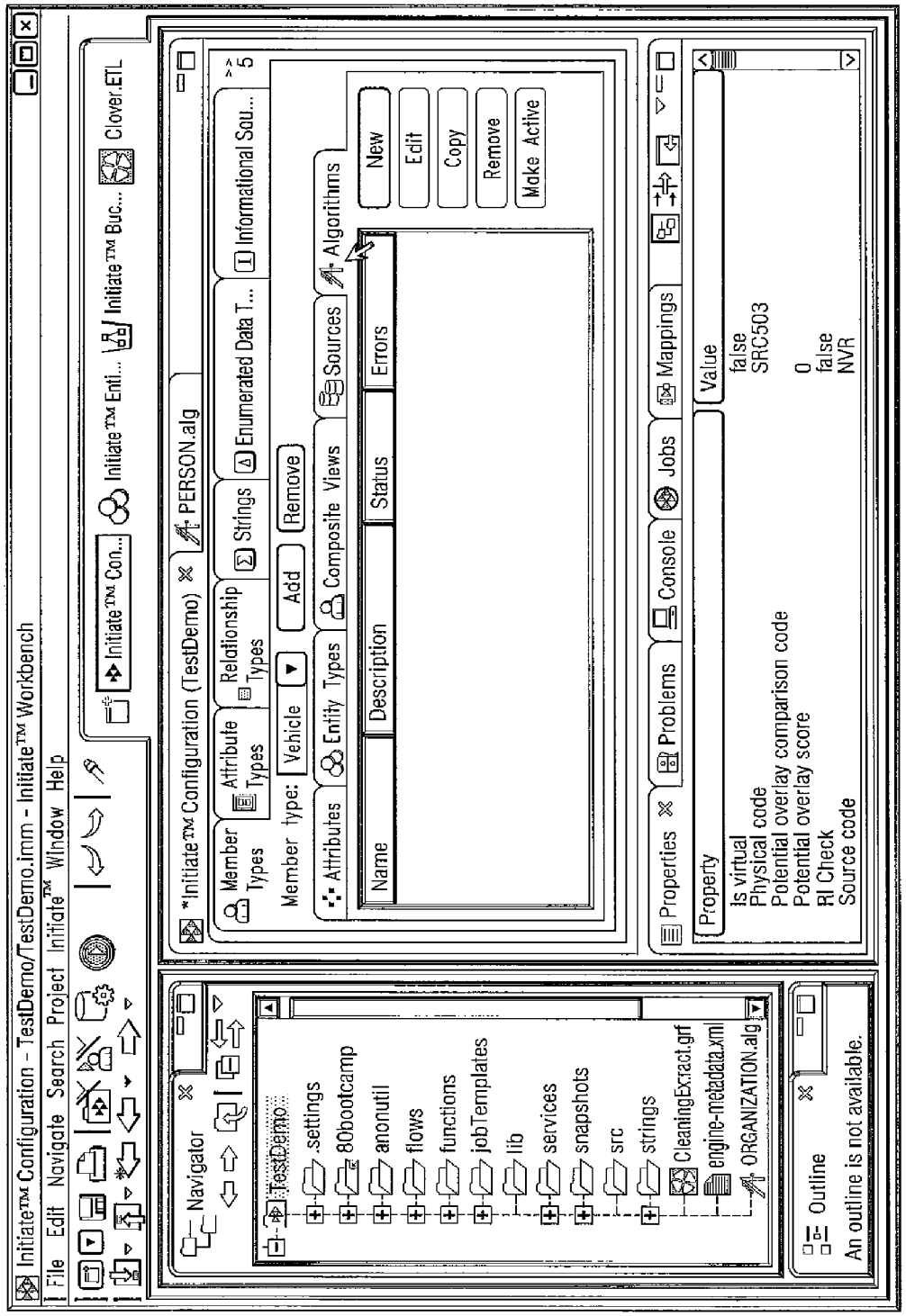
Figure 19:
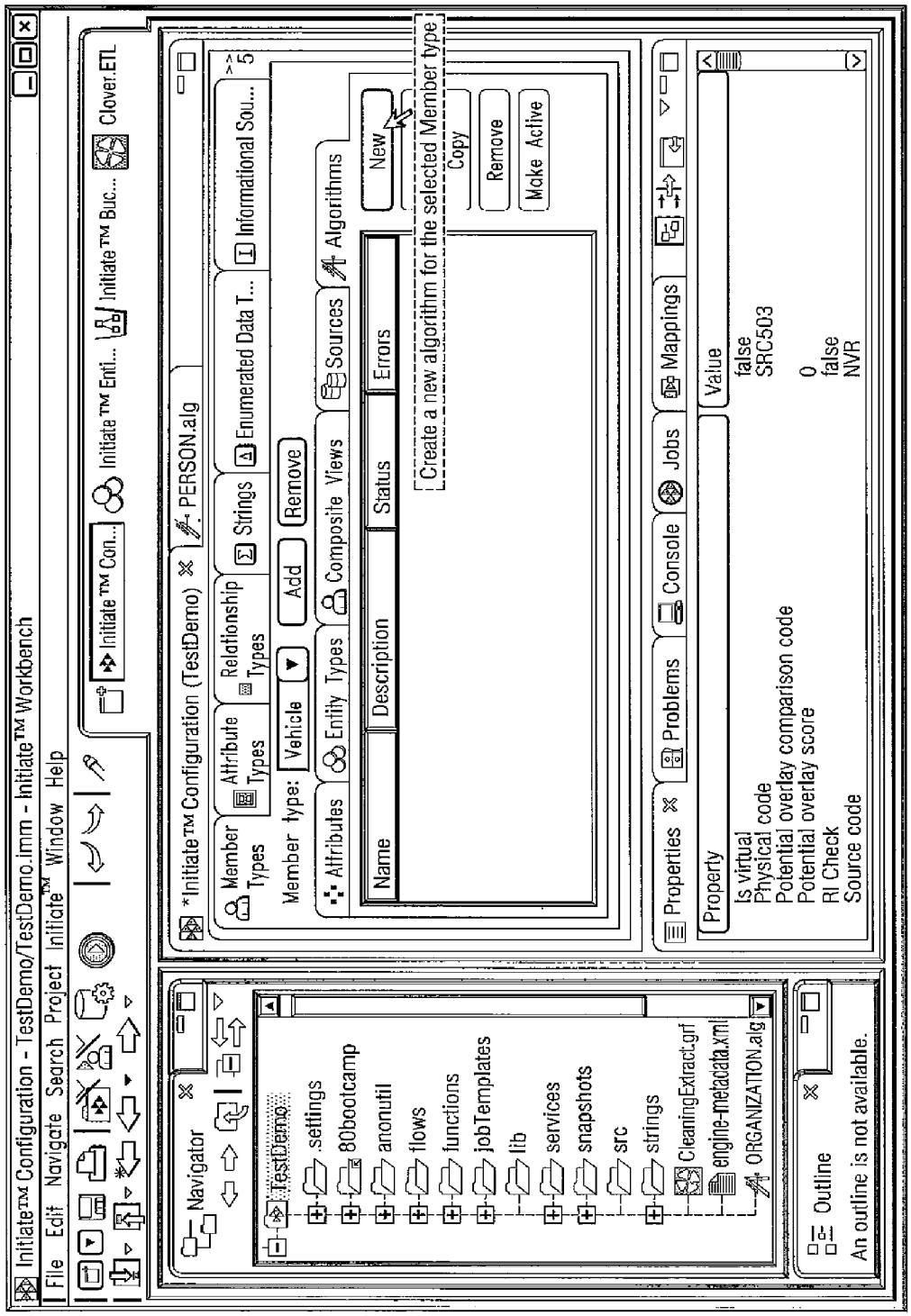
Figure 20:
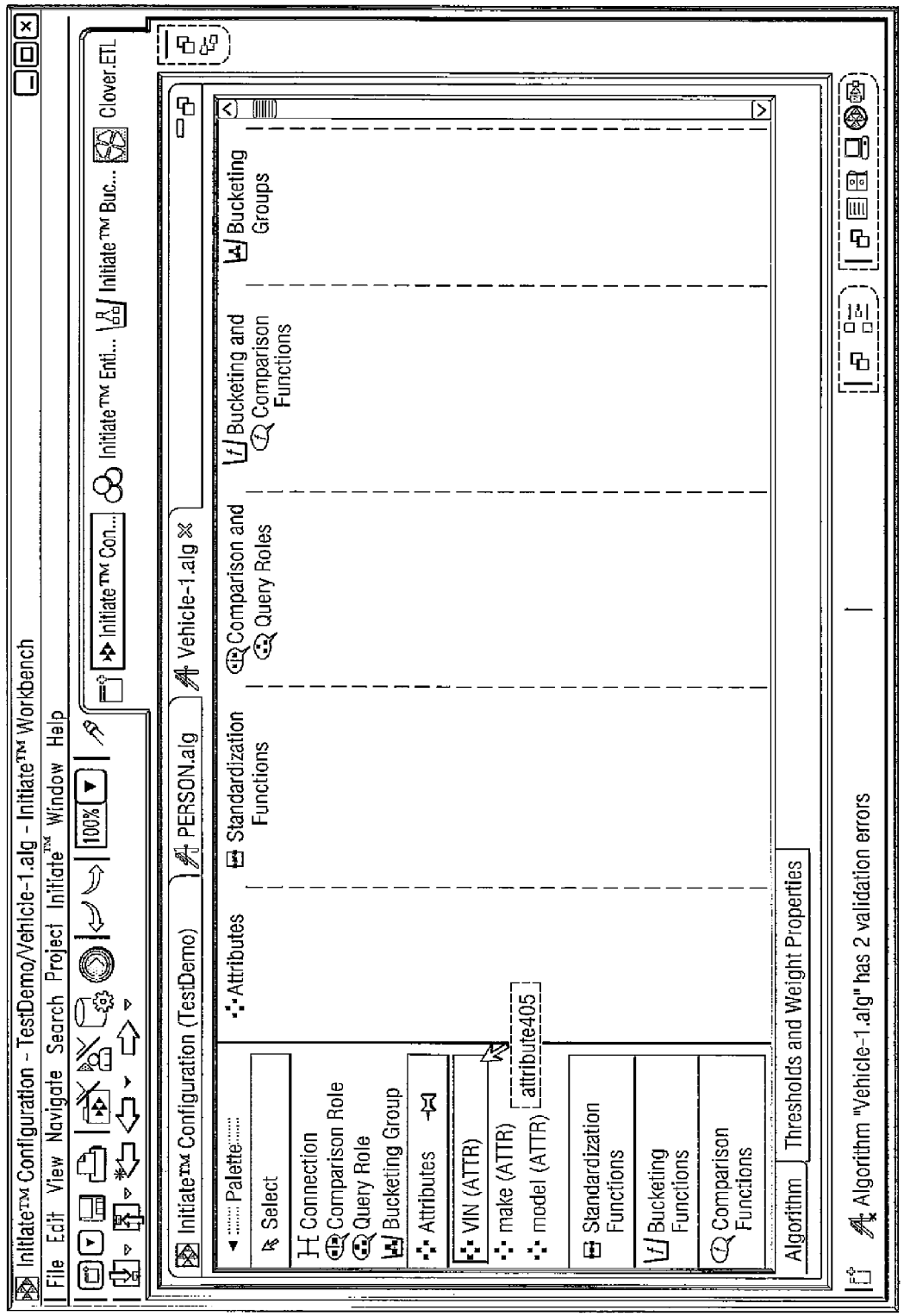
Figure 21:
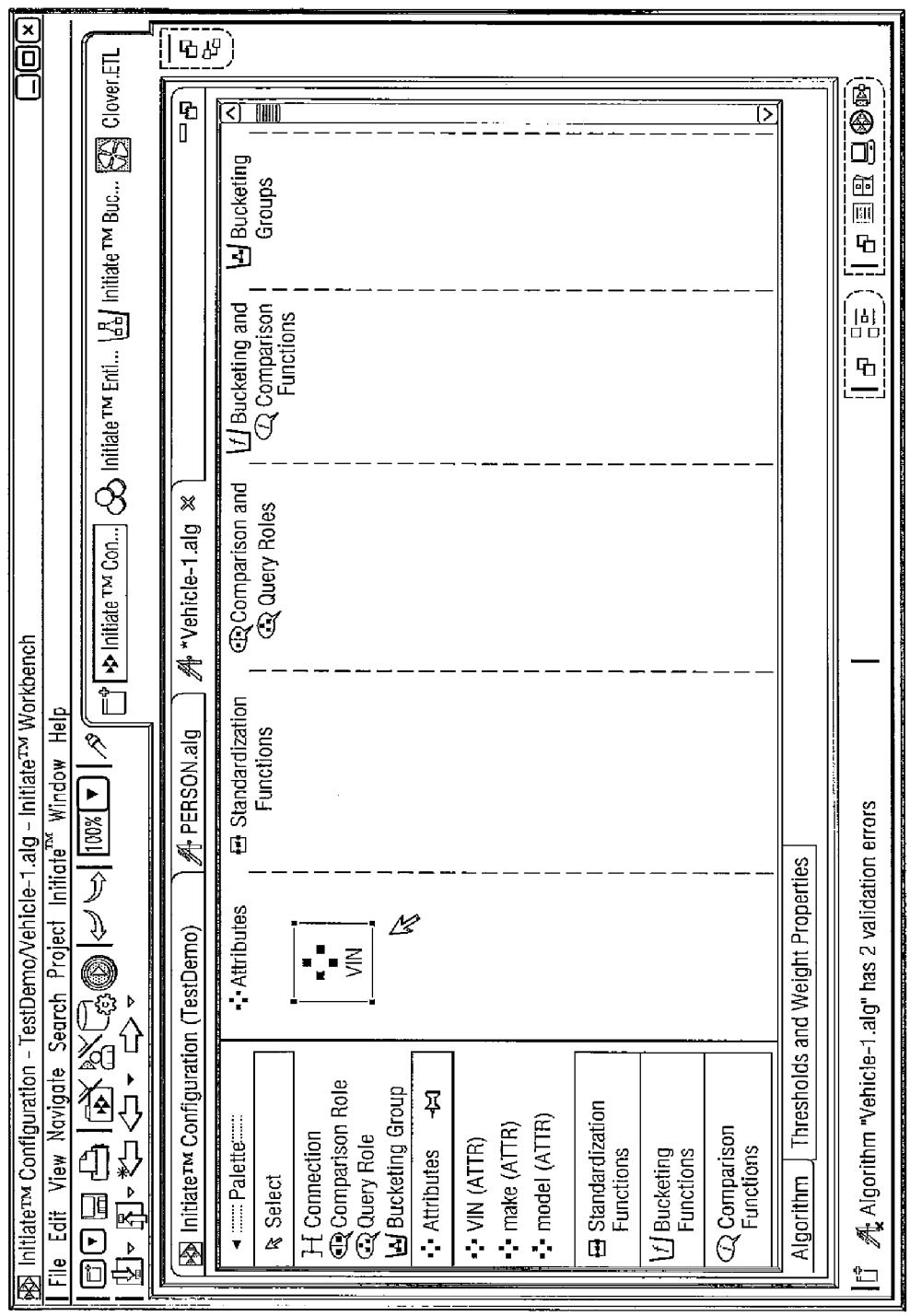
Figure 22:
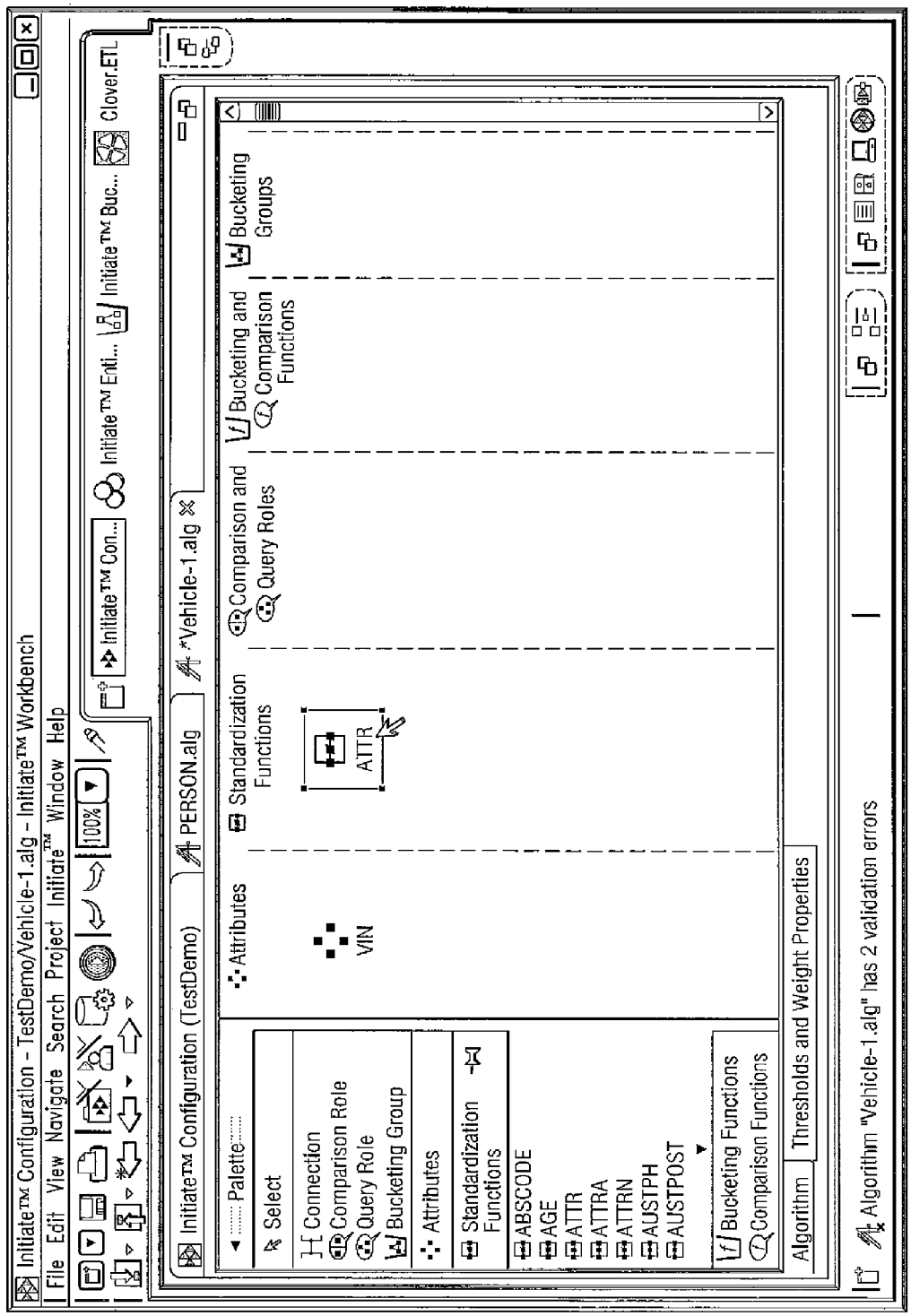
Figure 23:
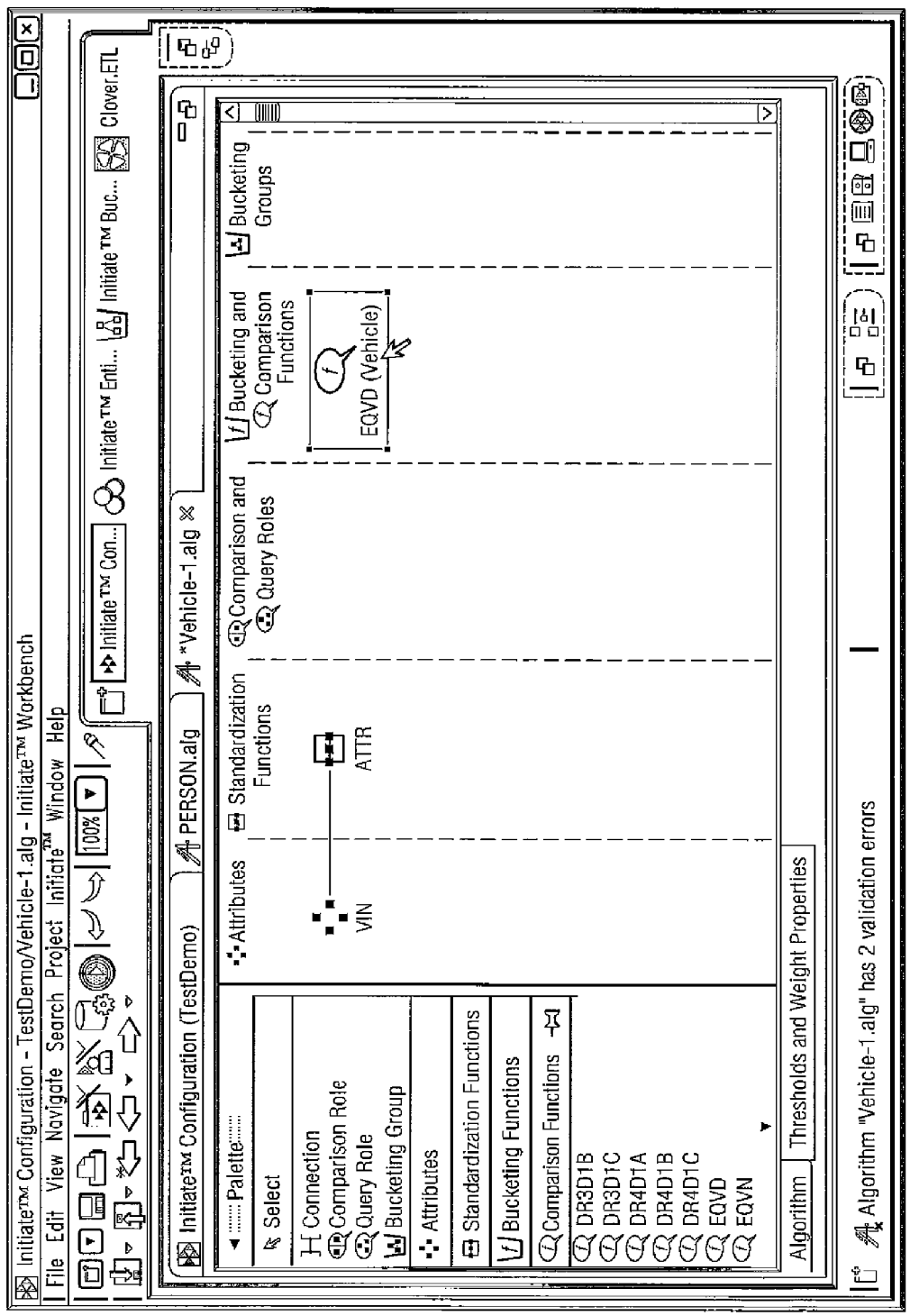
Figure 24:
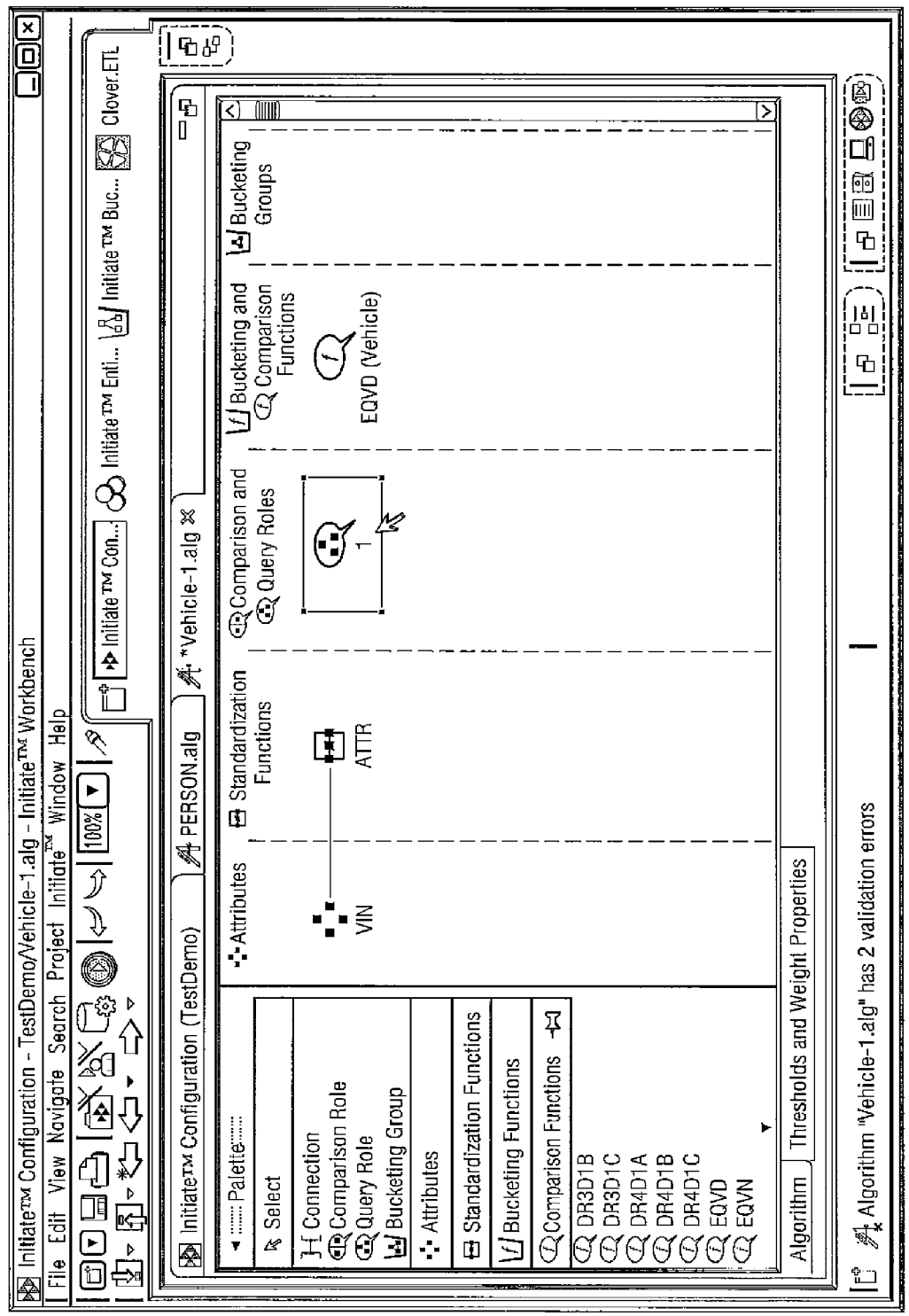
Figure 25:
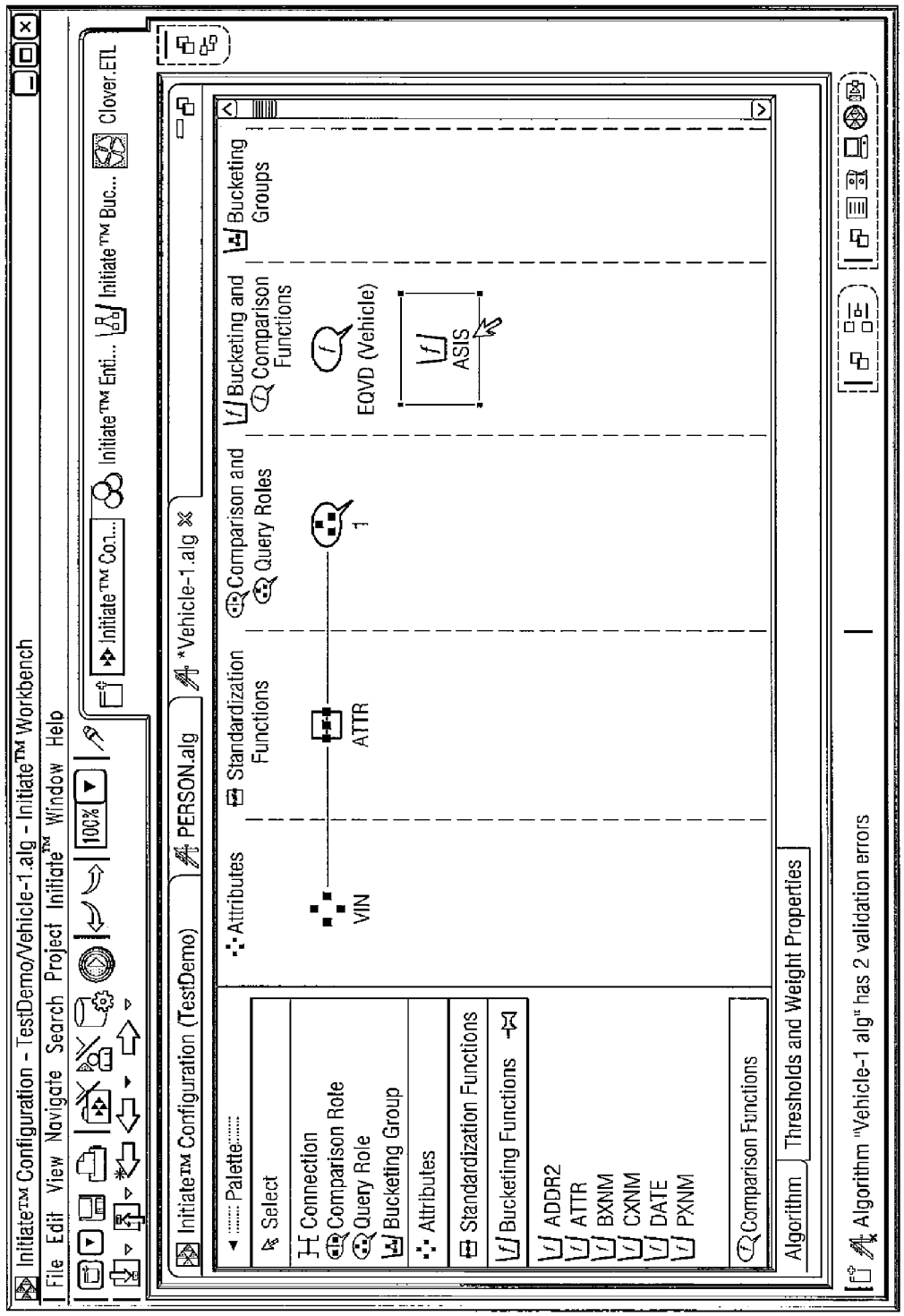
Figure 26:
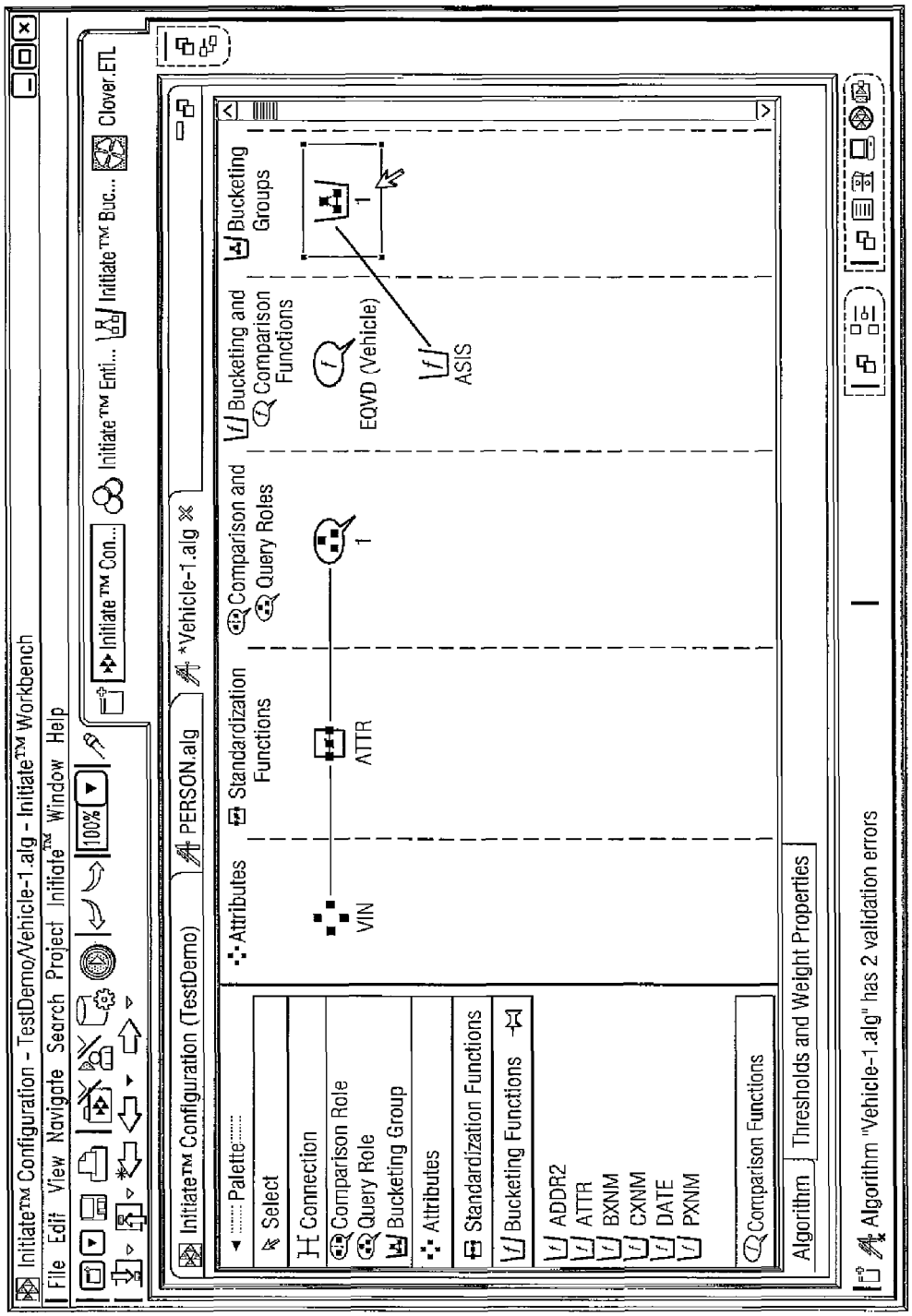

The user next selects the "Algorithms" tab in FIG. 18 and the "New" button in FIG. 19 to define an algorithm corresponding to the "Vehicle" entity type. The user is then presented with an interface which allows a user to define an algorithm for the matching, comparison, linking, etc. of data records in association with that entity type (e.g. that data records will be linked as an entity of that entity type if they match according to the algorithm). FIGS. 20-26 depict an example of the configuration of an algorithm for the "Vehicle" entity type using such an interface.

Figure 27:
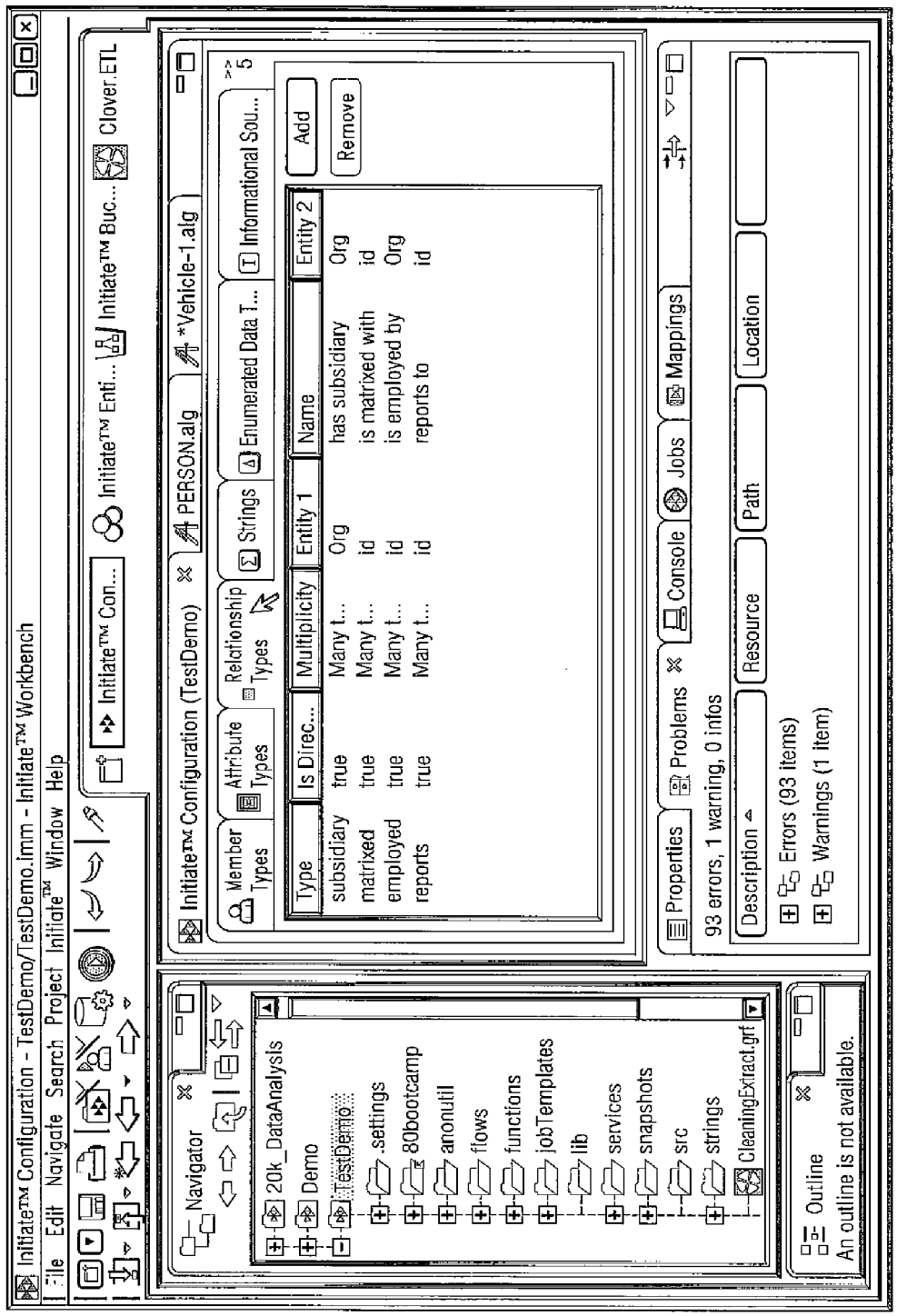
Figure 28:
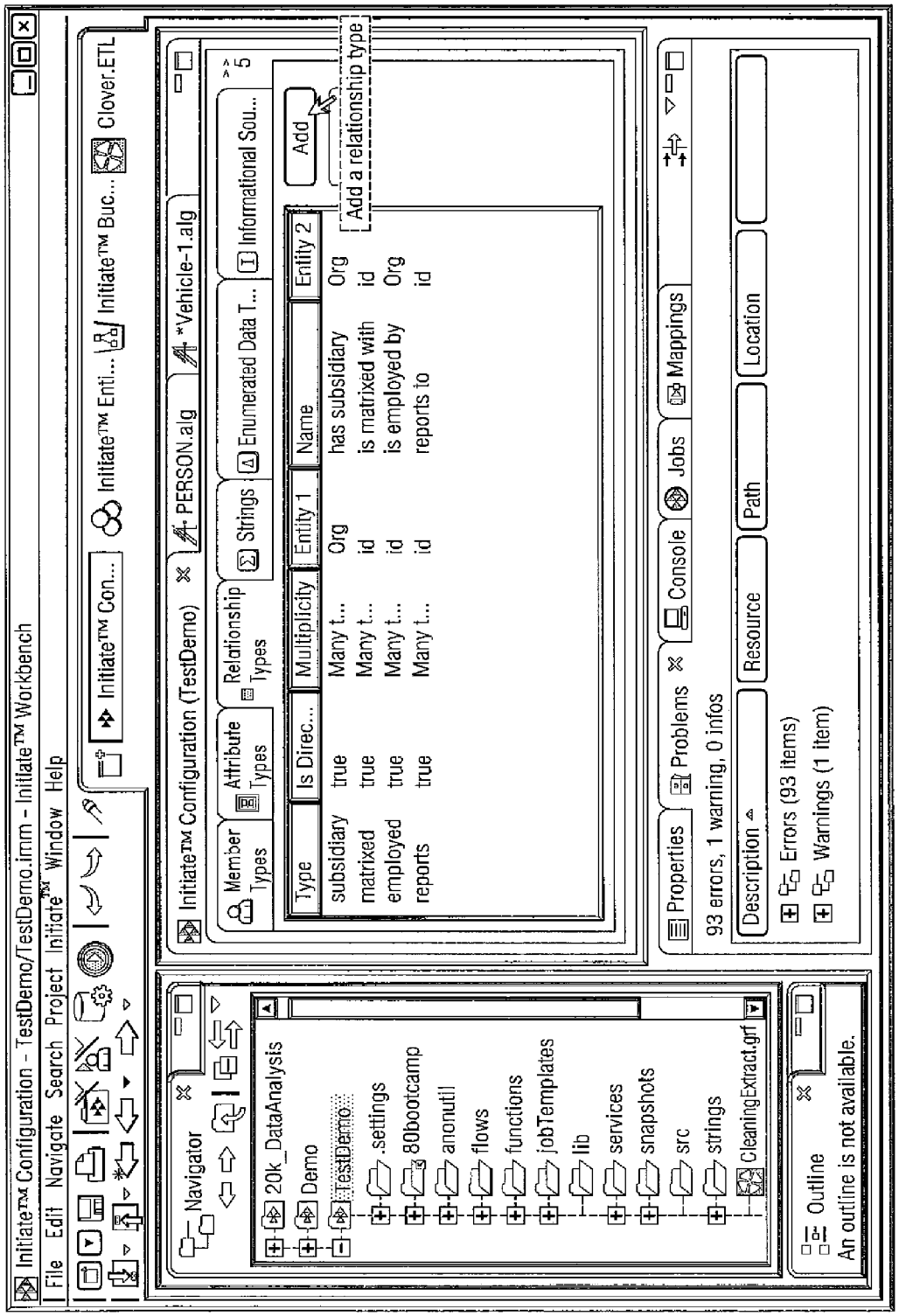
Figure 29:
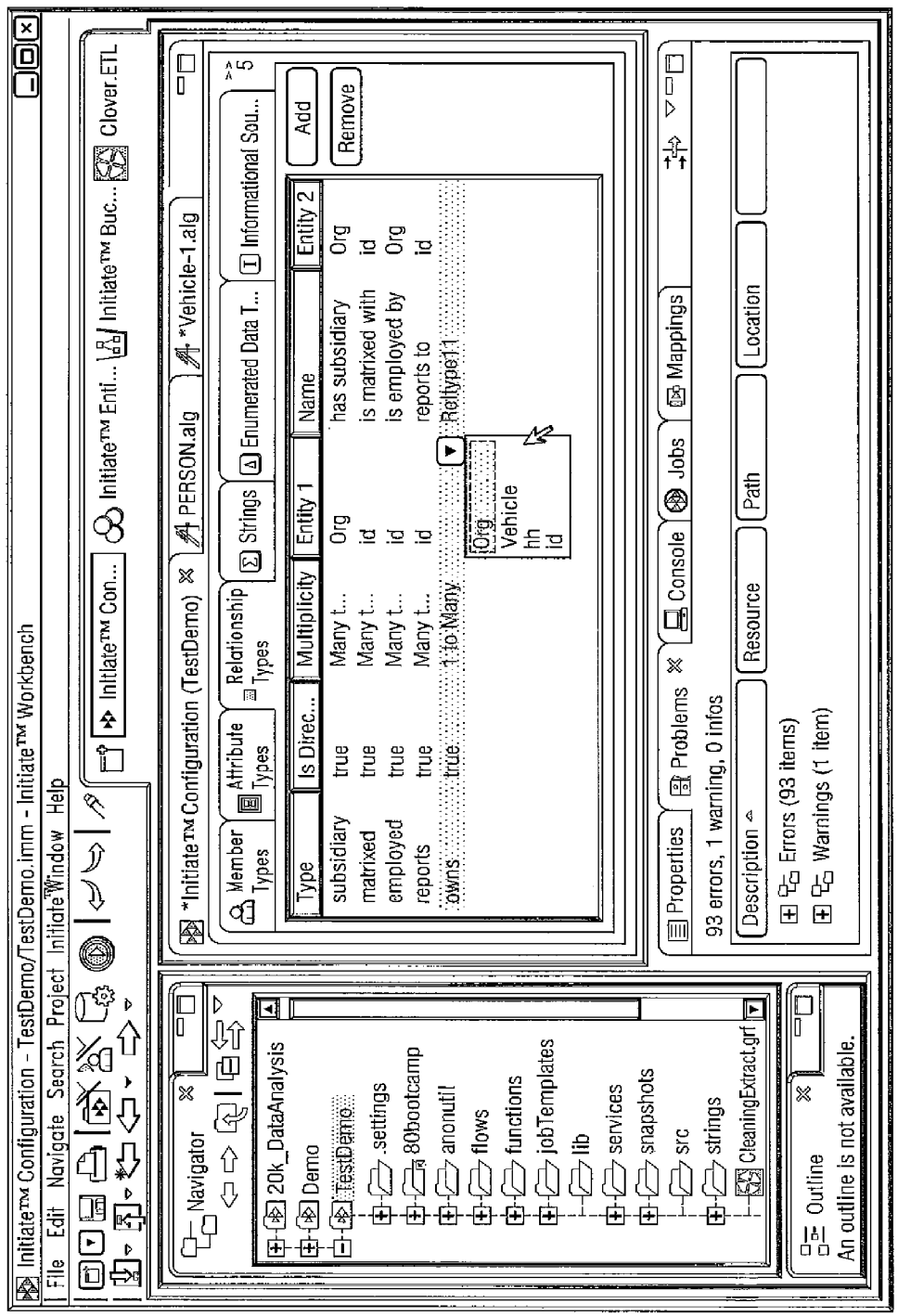
Figure 30:
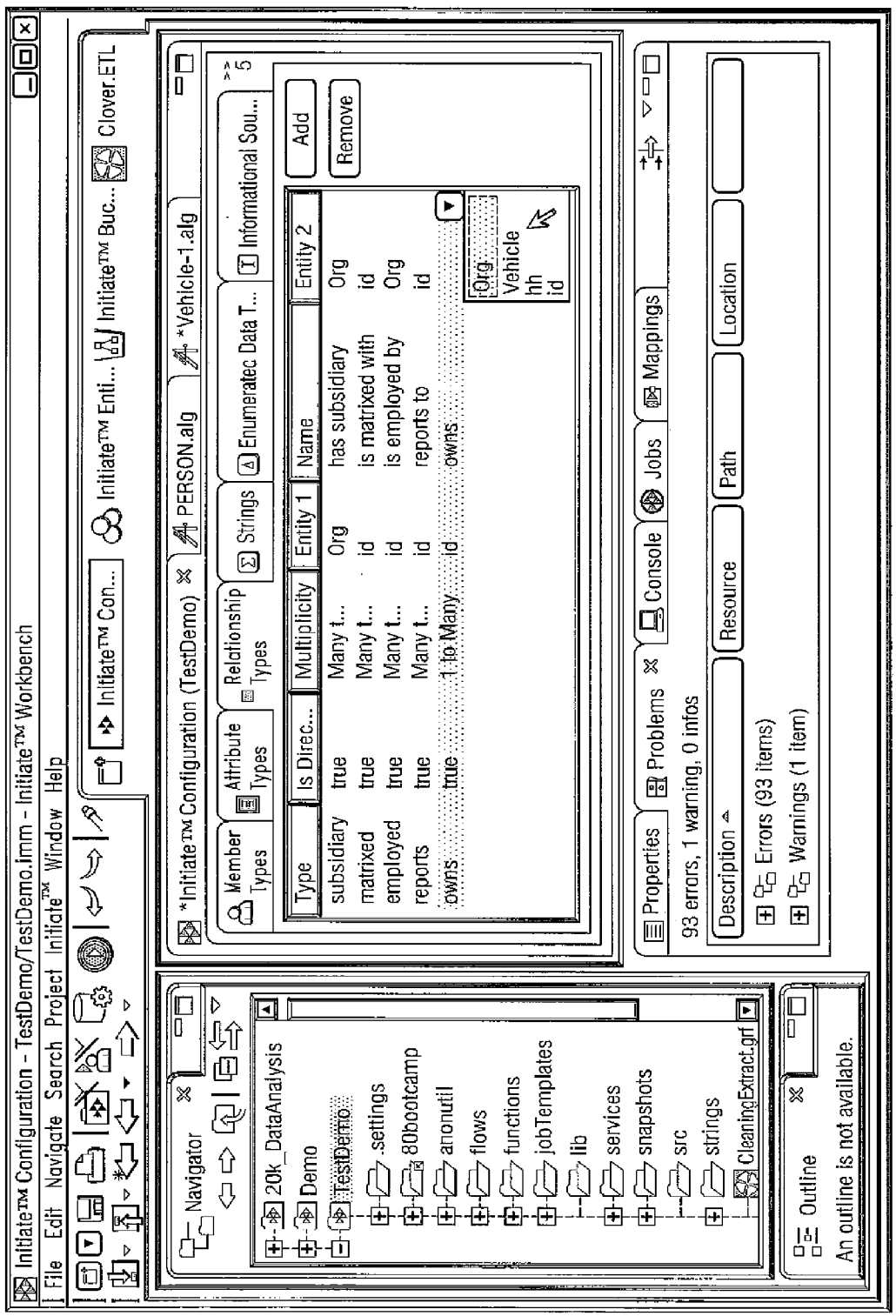
Figure 31:
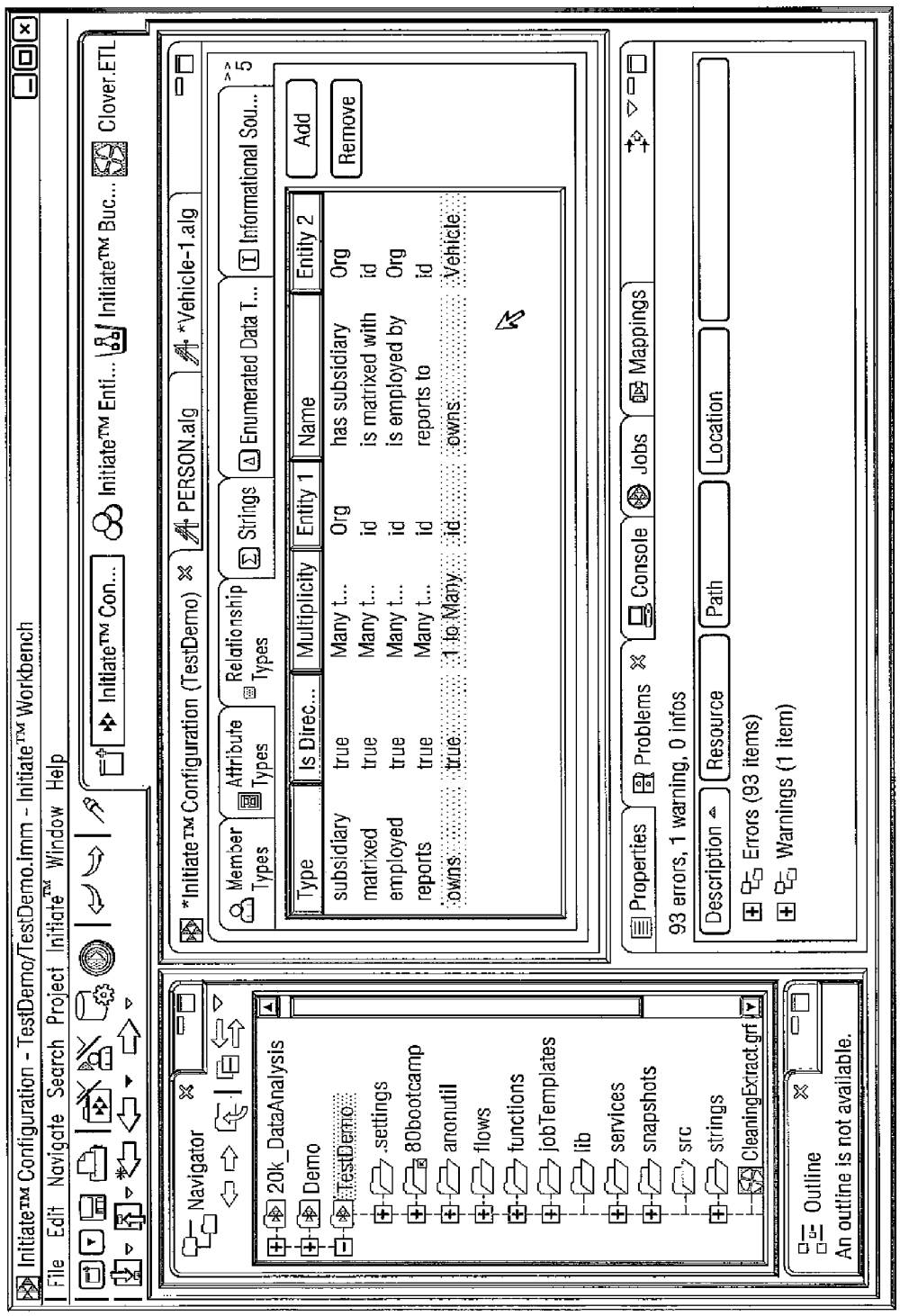

Moving now to FIGS. 27-31 one embodiment of the definition of a relationship type with respect to the MEI utilizing a graphical user interface is depicted. In FIG. 27 the user has selected the "Relationship Types" tabs which display a list of the currently defined relationship types, while in FIG. 28 the user has selected the "Add" button to add new relationship type. As shown in FIG. 29 the user has added relationship type of "Owns" which is a directional relationship with a one to many multiplicity (e.g. meaning the one entity can "own" many other entities but the many entities do not "own" the one entity) and the user is in the process of defining a type of entity with which the relationship type of "owns" may be utilized. Between FIG. 29 and FIG. 30 the use has selected the entity type of "id" to be a first type of entity utilized with the "owns" relationship type, that the relationship type "owns" is to be referred to as "owns" and is in the process of defining the second type of entity which may be utilized with this relationship type, which as shown in FIG. 31 is a "Vehicle" entity type. Thus, as defined the "owns" entity type may represent that a person "represent by an entity of type "id' may own multiple vehicles represented by entities of the "Vehicle" entity type)

After a thorough review of the above description of the functioning of the MEI and the configuration of entity relationship type with respect to the MEI it will be understood that during operation the MEI may be configured with an arbitrary number of entity types or relationship types representing almost any manner of logical or physical phenomena and logical or physical relationships between these phenomena. The establishment of entities or relationships in conjunction with these entity types may better understood with respect to FIGS. 32 and 33.

Figure 32:
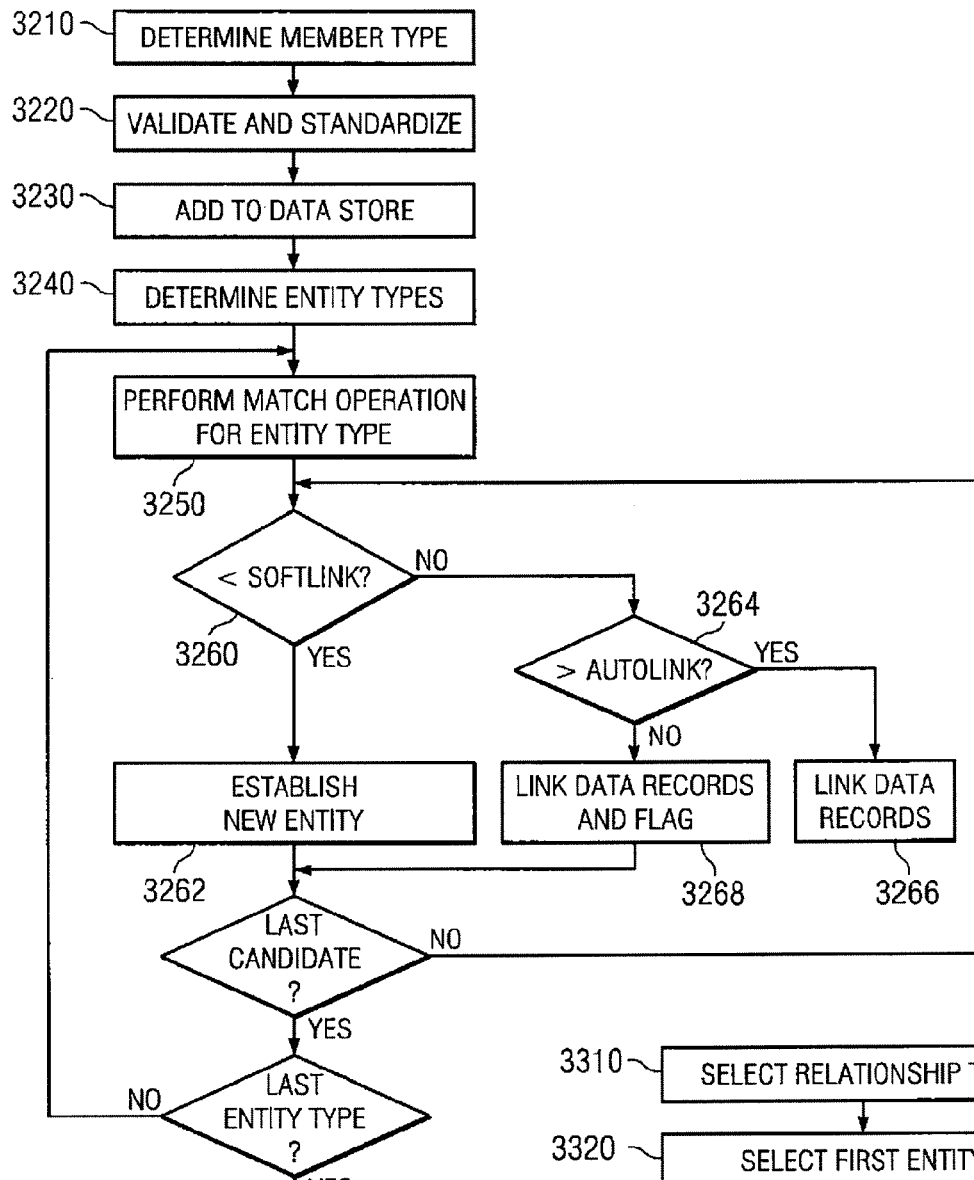
FIG. 32 is a flowchart illustrating one embodiment of a method for adding a new data record in conjunction with a master entity index system.

FIG. 32 is a flowchart illustrating one embodiment of a method for adding a data record into the MEI. In adding a new data record into the MEI, a record containing the new data is received by the MEI from the user or a data source. The MEI may then attempt at step 3210 to determine the member type corresponding to the received data record. In one embodiment, each data source 34, 36, 38 may be associated with a particular member type. Thus, determining a member type for the incoming data record may entail determining the data source from which the data record was received and the member type corresponding to the data source. Alternatively, the member type may be determined based upon the format of values associated with API used to access the MEI.

Once the member type corresponding to the incoming data record is determined the data record may be validated and standardized at step 3220. Validation may include examining the lengths of the fields or the syntax or character format of the fields, for example, as numeric fields may be required to contain digits in specified formats. Validation may also involve validating codes in the new data record, for example, valid state abbreviations or diagnostic codes. Standardization of the data record may involve processing the incoming data record to compute standard representations of the values of attributes associated with the incoming data record, such as standard representation of names, street addresses or other geographic locations, social security numbers, etc.

The MEI may then, in step 3230, add the standardized data record to the data store as a data record of the member type determined at step 3210. Each entity type corresponding to the member type of the data record may then be determined at step 3240. As discussed above, when defining an entity type the type of member data records which may be associated with entities of that entity type may be defined. Thus, here it may be the case that each entity type which defines an association of data records of the member type determined at step 3210 may be identified. For each of the entity types identified then, a match operation may be performed at step 3250 between the new data record and other data records of that member type in the MEI based upon a comparison of attribute values according to the algorithm corresponding to that entity type (e.g. configured in conjunction with that entity type). This match operation may involve the generation of a set of candidate data records based upon a comparison of the new data record and the other data records of that member type. A confidence level may then be generated for each of the candidate data record with respect to the new data record.

If, at step 3260 the confidence level for all of the candidate data records is below a certain threshold (called a clerical review or softlink threshold) a new entity of the entity type may be established for the new data record at step 3262 (e.g. a new entity identifier generated and associated with the entity type and the new data record in the entity database). If, however, the score associated with a candidate data record is above another threshold (referred to as an autolink or hardlink threshold) at step 3264 the new data record may be associated or linked with the candidate data record at step 3266. This association may involve associating the two records with a single entity identifier corresponding to the entity type in the entity database. If the confidence level associated with a candidate data record is above the clerical review threshold but below the autolink threshold at step 3268 the new data record may be associated or linked with the candidate data record and the association or link of the new data record to the candidate data record may be flagged or otherwise marked for review by a user of MEI such that a determination may be made whether this association or link should be maintained. Thus, when a new data record of a certain member type is added to MEI, for each of the entity types which correspond to that member type a new entity may be established and associated with the new data record or the new data record is associated with an existing entity of that type.

Figure 33:
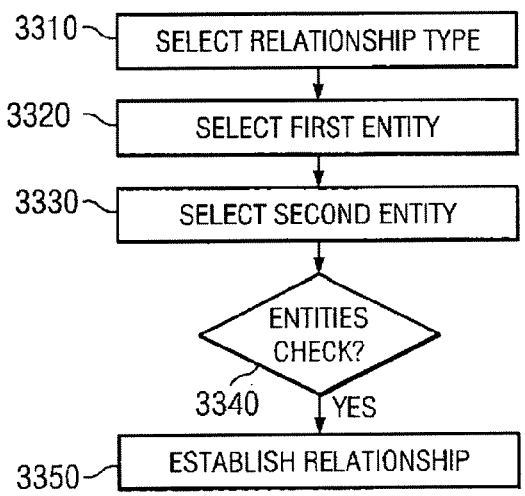
FIG. 33 is a flowchart illustrating one embodiment of a method for establishing a relationship in conjunction with a master entity index system.

Moving on to FIG. 33, one method for establishing a relationship between two entities is depicted. At step 3310 a user of MEI may select a relationship type from a set of defined relationship types (as discussed above). The user may then select a first entity for which this relationship is to be established at step 3320 and a second entity to which it is desired to establish a relationship of the relationship type between the first entity and the second entity at step 3330. The types of the selected entities may then be checked against the entity types defined in conjunction with the relationship type to confirm that the selected entities are of the defined entity types at step 3340. If the entities conform to the defined entity types associated with the relationship, a relationship of the relationship type may established between the two selected entities at step 3350 (e.g. a relationship identifier established in relationship database and associated with the relationship type and the two selected entities). Otherwise some sort of exception or fault may be flagged to a user.

This embodiment for establishing a relationship between entities may be better illustrated with a specific example. Suppose that a user wishes to establish a relationship of type "owns" (as defined above) with respect to two entities. The user may be presented with a set of relationship types from which a user may select the "owns" relationship type. The user may then be presented with, or search for a first entity and select this entity. For purposes of this example suppose that this entity is an entity type of "id" representing a person named "Patty Countryman". The user may then select a second entity, which for purposes of this example is supposed to be of entity type of "Vehicle" and corresponds to one or more data records representing a particular 1974 Ferrari Dino. In this case, as the relationship type of "owns" has been defined in conjunction with an entity type of "id" and an entity type of "Vehicle" the two selected entities are of the defined entity type a relationship of the type "owns" may be established between the first entity representing "Patty Countryman" and the second entity representing that particular 1974 Ferrari Dino where the established relationship may represent that Patty Countryman owns that 1974 Ferrari Dino.

From the above description it will also be noted that with respect to certain relationship types, such as one to many, many to many, or many to one relationships multiple entities may be selected with respect to certain relationships and these entities selected and associated with the relationship as well, where all the entities may be selected at once or at differing time periods. For example, suppose that in the future Patty Countryman purchases a 2007 Lotus Elise and an entity corresponding to the Lotus Elise is subsequently added to the MEI as discussed above. Here it may be possible to select the "owns" relationship established between Patty Countryman and the 1974 Ferrari Dino and add the 2007 Lotus Elise to that relationship as the relationship type "owns" is a one to many relationship. Thus, the same relationship may now represent that Patty Countryman owns both a 1974 Ferrari Dino and a 2007 Lotus Elise.

After reading this far it may occur to the reader that the combination of multiple data sources, multiple entity types and multiple relationship types may create a complex network of entities and relationships which may be managed or indexed with respect to an MEI. Consequently, in one embodiment, an interface may be provided for use in conjunction with an embodiment of a master entity index system such that the various entities and relationships utilized in conjunction with the MEI may be better established manipulated, visualized or otherwise managed. In particular the MEI may provide an application programming interface (API) such that various functionality of the MEI may be accessed or utilized through this API. In one embodiment, one or more interfaces may be implemented in conjunction with the computers of one or more users 40, 42, 44 such that these interfaces may be used by a user to query, configure or otherwise interact or perform operations associated with the MEI through the API provided by the MEI. These interfaces may, for example, include a graphical user interface (GUI) comprising one or more web pages which may be accessed through a web browser by a user. These web pages may be provided from an application executing on a local computer or from a remote web server where the server may restrict access only to a private network (e.g. a corporate intranet) or it may publish pages on the World Wide Web. Such an interface may allow a user to obtain a wide variety of information or accomplish a whole host of tasks with respect to the entities and relationships maintained by the MEI. Embodiments of such interfaces will be described in more detail below, but are also discussed in U.S. patent application Ser. No. 11/901,040 entitled "Hierarchy Global Management System and User Interface", by Sean Stephens et al., filed on Sep. 14, 2007, and issued as U.S. Pat. No. 7,620,647 on Nov. 17, 2009 and fully incorporated herein by reference.

The various functionalities of such an interface may be better described with reference to FIGS. 34-48 which depict one embodiment of just such an interface. With reference to FIG. 34, in one embodiment, this interface may allow a user to search for or otherwise obtain a desired entity or relationship based upon one or more search criteria. The user may be presented with a way to select an entity type or relationship type to be searched for and may also be presented with one or more corresponding types of search criteria with which the search may be effectuated. These search criteria may correspond to attributes of various member types associated with the selected entity type, or some other identification for a data record such as an identification corresponding with the data record in a particular data source. Here notice that the user has selected the entity type "Identity" which may correspond to a person. The user as then been presented with a dialogue box corresponding to the "Identity" entity type where the user can select to search using search criteria or by source ID using radio buttons. Boxes for entering search criteria corresponding to the attribute of "Name" and "Social Security" are presented to the user along with the option to return member data records individually instead of entities. The user has entered "patty countryman" as a selected search criteria for "Name" and selected the search button.

Thus, MEI will now perform a search for member data records which correspond to the name "patty countryman" (e.g. which score above a certain threshold). As can be seen with reference to FIG. 35 representations of these data records may be graphically presented to the user. In one embodiment, certain attribute values of the matching data records may be presented along with the score generated with respect to the search criteria. In addition, a pull down menu may be presented, where the pull down menu comprises a set of actions which may be taken with respect to each of the data records whose corresponding values are presented to a user. Here representations of three data records which correspond to the search criteria "patty countryman" are presented to the user, where one of the data records matches the search criteria "patty countryman" with a score of 6.2 and two other of the data records match with a score of 5.8.

Figure 36:

The user may then select one the data records to view. In particular, a user may utilize the drop down menu to select a type of view to be presented in conjunction with a selected data record. These actions may include such actions as inspect relationships in association with the data record, or to view other information or associations corresponding to the data record. In FIG. 36 the user has utilized the drop down menu associated with representation of a data record which matches with a score of 5.8 to select the option of inspecting relationships associated with the identity type entity with which that data record is associated.

A selection of this sort may result in a graphical representation of the selected entity being presented to a user. More specifically, in one embodiment a new tab with the an identification of the data record selected may be created where the tab corresponds to a visual representation of the selected entity along with visual representations of all entities related to the selected entity and visual representations of the relationships between the selected entity and each corresponding related entity. The selected entity may be highlighted in some manner such that it is clear that the entity is currently the focus of the visual representation (referred to as the navigational focus point) while each of the graphical representations of a relationship may comprise a descriptor of the type of relationship represented (e.g. corresponding to a relationship name defined during definition of relationship type) and the directionality of the relationship. In many cases a selected entity may have a myriad number of relationships such that it may not be desired to represent each of these relationships in the visual representation to avoid clutter of the visual representation. In one embodiment, therefore, if the number of relationships of a certain relationship types is above a certain threshold (which may configurable) a type of icon such as a cloud or the like may be used to represent this set of relationships, where the cloud comprise a relationship descriptor corresponding to the relationship type and a number corresponding to the number of entities which are related to the navigational focus point according to that relationship type. A user may click on this cloud to obtain a more detailed visual representation of these entities (e.g. to display all the entities represented by this cloud or a portion thereof).

Figure 37:
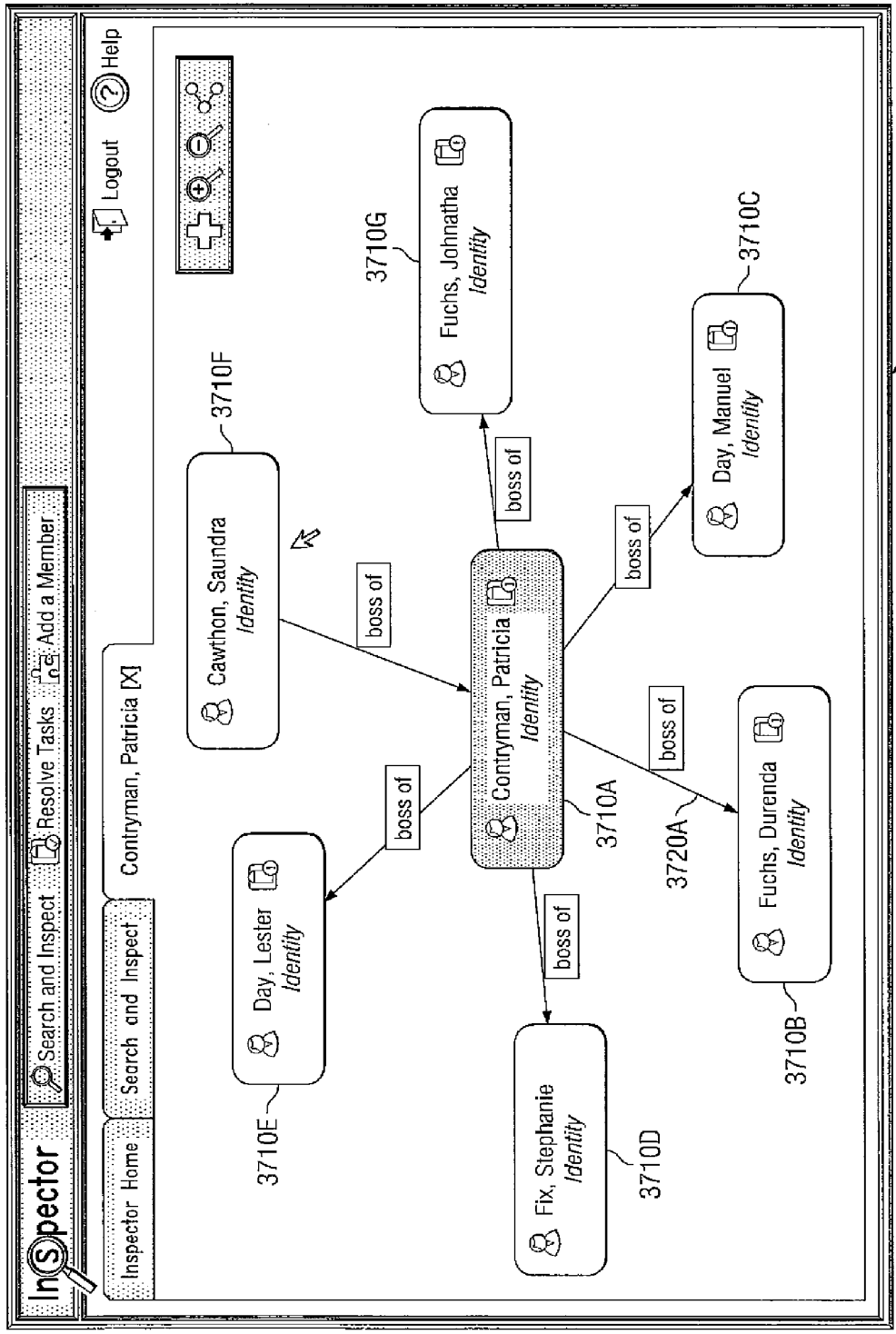

FIG. 37 depicts one embodiment of a graphical representation 3700 of this type. Here entity representation 3710a represents the entity corresponding to "Patty Countryman", while each of relationship representations 3720 represent that a relationship of type "boss of" has been established between the entity represented by entity representation 3710a ("Patty Countryman") and another entity, represented by entity representations 3710b-3710g. For example, relationship representation 3720a represents that a "boss of" relationship exists between the entity represented by entity representation 3710a ("Patty Countryman") and the entity represented by entity representation 3710b ("Durenda Fuchs"). Note that relationship representation 3720a is an arrow with the head pointing at entity representation 3710b ("Durenda Fuchs") denoting that the represented "boss of" relationship is directional (e.g. that "Patty Countryman" is the "boss of" "Durenda Fuchs"). Note also that entity representation 3710a ("Patty Countryman") is visually highlighted denoting it as the navigation pivot point.

The user may interact with the graphical interface utilizing graphical representation 3700 to view information associated with each of the represented entities or relationships (e.g. the EMCA for the entity), manipulate the represented entities or relationships or resolve tasks associated with the represented entities or relationships (e.g. review established links). Additionally, the user may select another represented entity as the navigation pivot point. When another entity representation is selected as the navigation pivot point this entity may be highlighted to denote it as the navigation pivot point and any representations for any entities related to the entity represented by the new pivot point not currently represented in the graphical representation may also be displayed along with representations for those corresponding relationships. In addition, the representations of the entities and relationships may be shifted such that the new navigation pivot point is substantially centered in the display or may be shifted based upon the number, configuration or position of entity representations already displayed, or to be displayed, in, conjunction with the new navigational pivot point. As may be imagined as the user interact with the graphical representation any number of representation may be displayed at any one instance and the layout of such representation may grow quire complex, therefore only a portion of the graphical representation may be displayed at any one time, however the graphical representation may offer scrolling capabilities as are known in the art such that a user may scroll to display various portions of the graphical representation.

Figure 38:
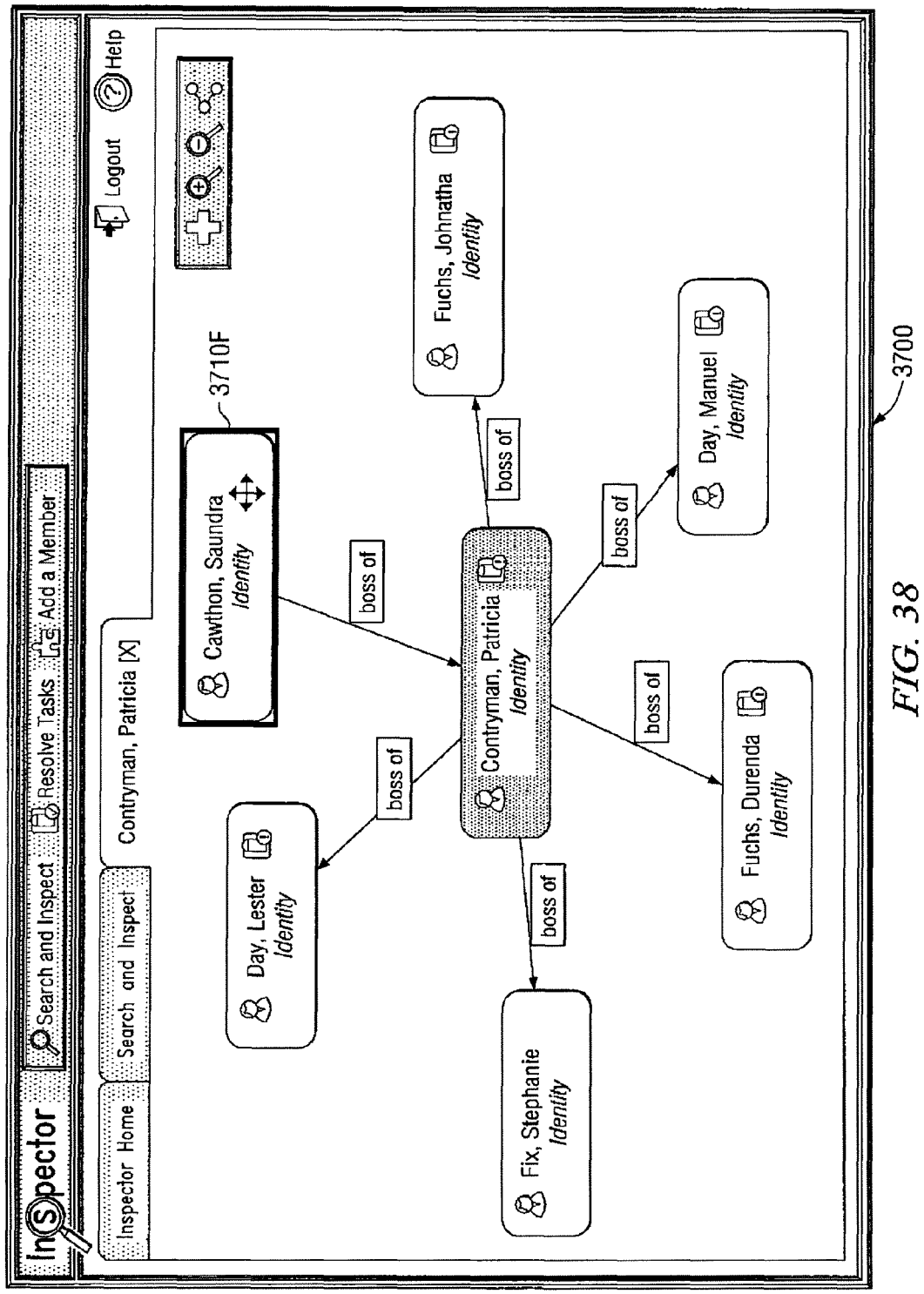
Figure 39:
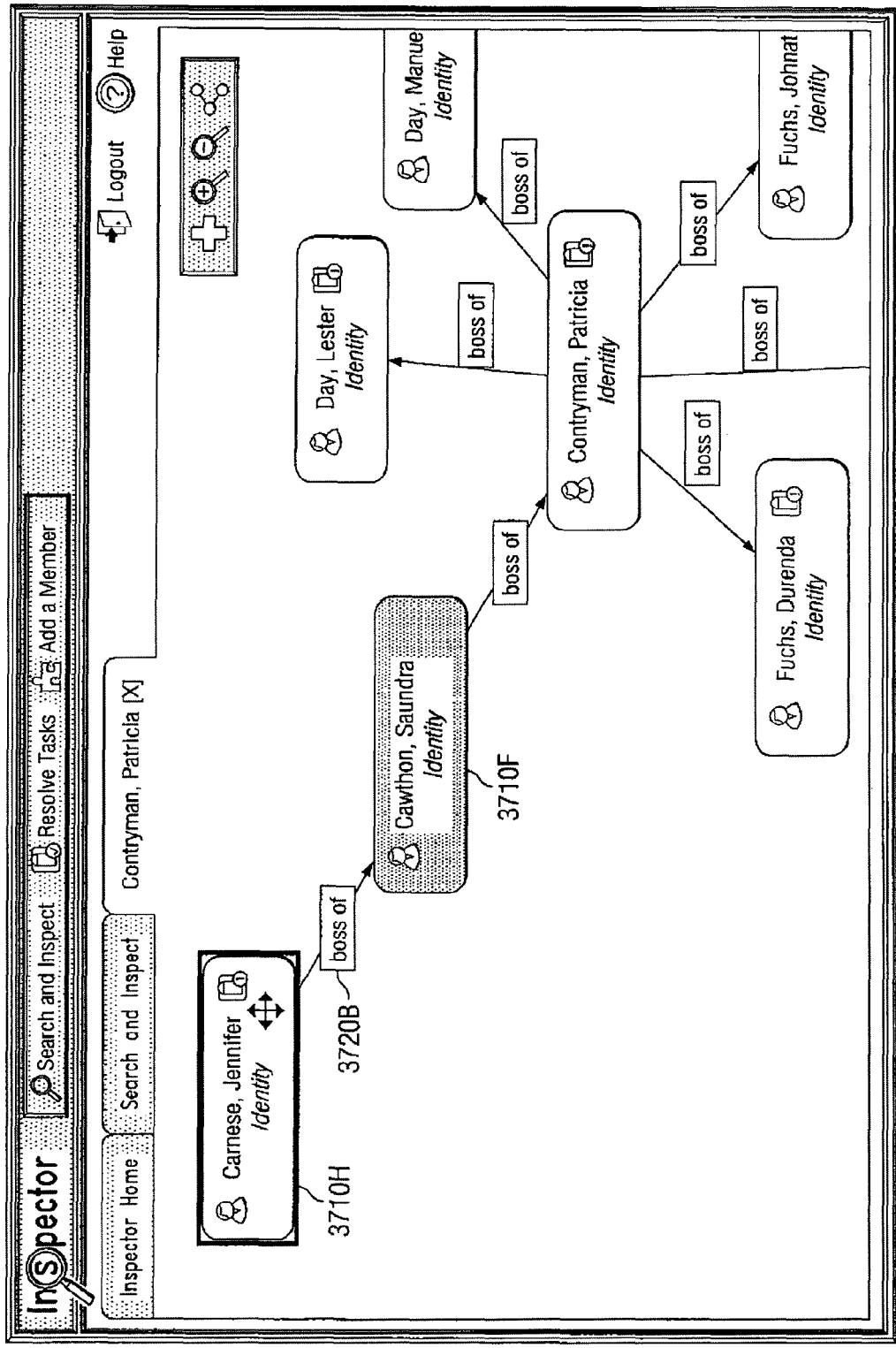

Referring to FIG. 38, while interacting with graphical representation 3700 the user selects entity representation 3710f ("Saundra Cawthon") resulting in the graphical representation 3700 of FIG. 39. Notice here that entity representation 3710f ("Saundra Cawthon") is now visually highlighted denoting it as the navigation pivot point and that entity representation 3710h ("Jennifer Carnese") is now displayed in graphical representation 3700 along with the relationship representation 3720b denoting that a "boss of" relationship exists between the entity represented by entity representation 3710h ("Jennifer Carnese") and the entity represented by entity representation 3710f ("Saundra Cawthon"). Note as well that the representations of entities and relationships in graphical display 3700 have shifted such that entity representation 3710f ("Saundra Cawthon") is closer to the center of the portion of graphical representation 3700 currently being displayed to the user.

Figure 40:
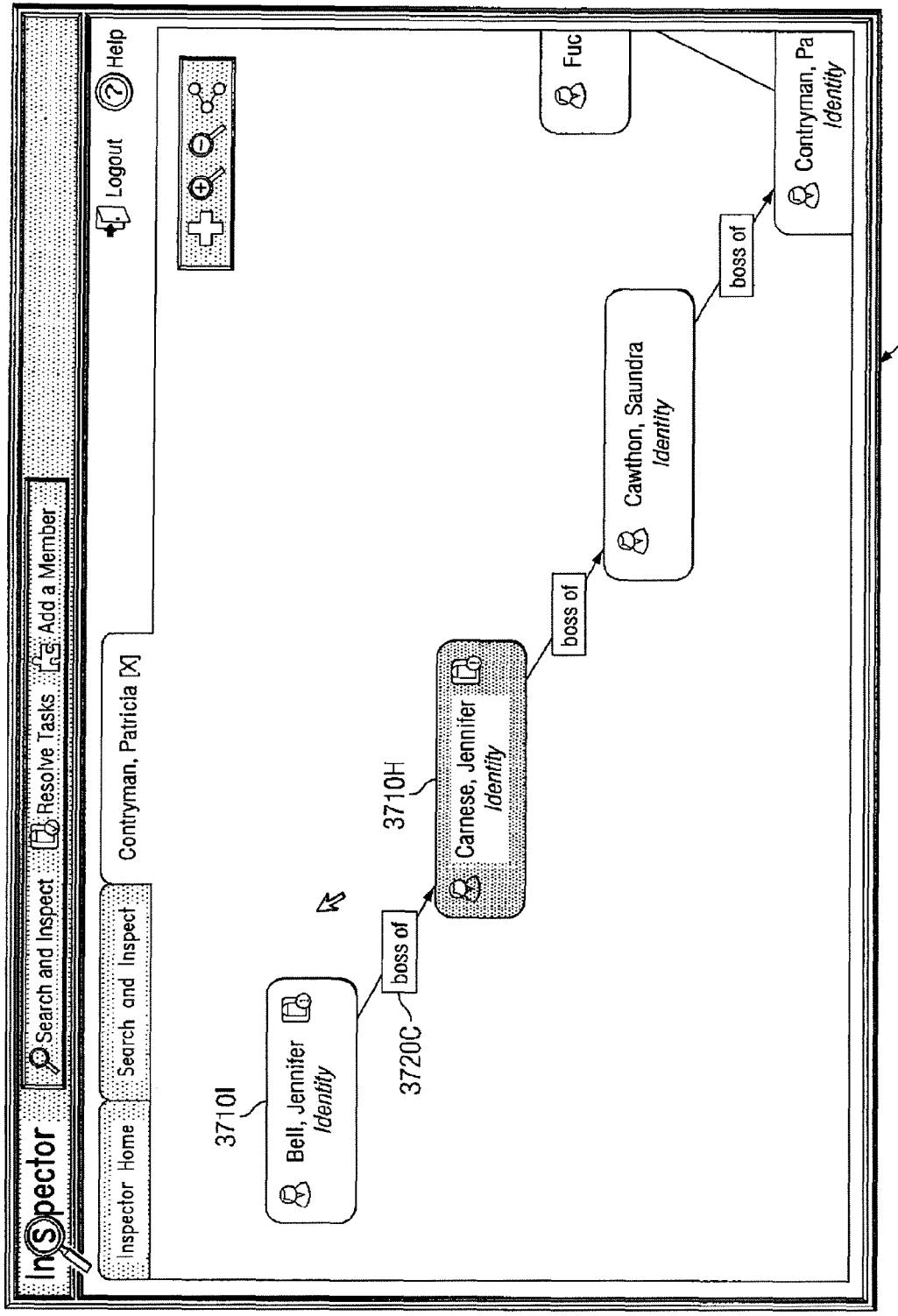

The user now interacts with graphical representation 3700 to select entity representation 3710h ("Jennifer Carnese") resulting in the graphical representation 3700 of FIG. 40. Notice here that entity representation 3710h ("Jennifer Carnese") is now visually highlighted denoting it as the navigation pivot point and that entity representation 3710i ("Jennifer Bell") is now displayed in graphical representation 3700 along with the relationship representation 3720c denoting that a "boss of" relationship exists between the entity represented by entity representation 3710i ("Jennifer Bell") and the entity represented by entity representation 3710h ("Jennifer Carnese"). Note as well that the representations of entities and relationships in graphical representation 3700 have shifted such that entity representation 3710h ("Jennifer Carnese") is closer to the center of the portion of graphical representation 3700 currently being displayed to the user.

A user may also interact with the graphical interface to establish relationships in the MEI. More specifically, in one embodiment, a user may select a first entity representation and a second entity representation. Based upon the types of the entities which correspond to the selected entity representations a menu of possible relationships to establish may be presented to the user. This set of possible relationships may be determined based on the entities selected. For example, the types of the possible relationships presented may conform to those relationship types which have been defined for use with entity types which correspond to the type of entities associated with the selected entity representation. Furthermore, the possible relationships presented may take into account the directionality of the relationship types on which they are based, for example if a relationship is a directional relationship type, the possible relationships presented may comprise two relationships of that relationship type, one where the first entity has that relationship to the second entity and another where the second entity has that relationship to the first entity. Once a user selects one of the presented set of possible relationship the relationship may be represented on the graphical representation and established with respect to the MEI (e.g. in the relationship database).

Figure 41:
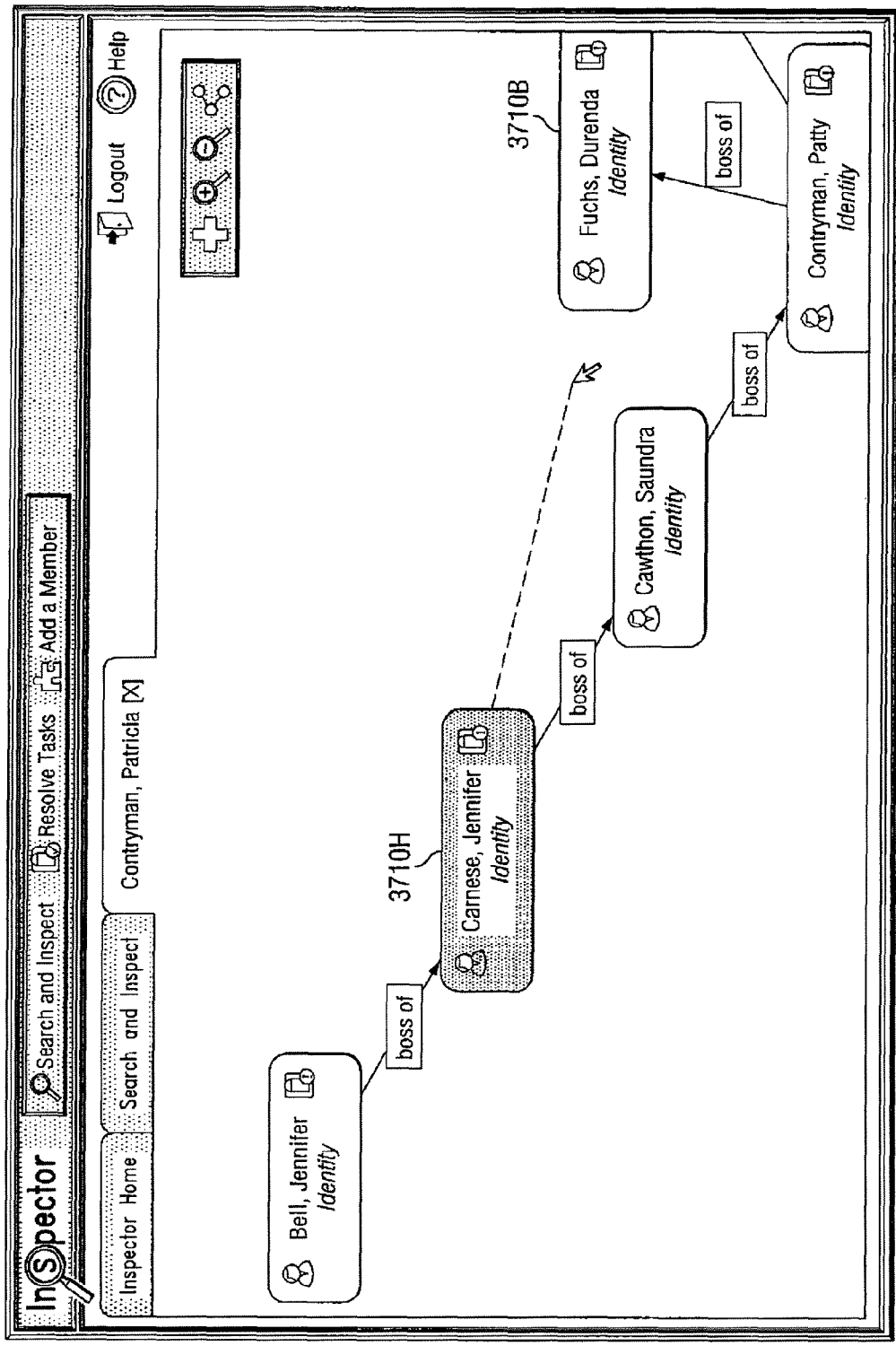
Figure 42:
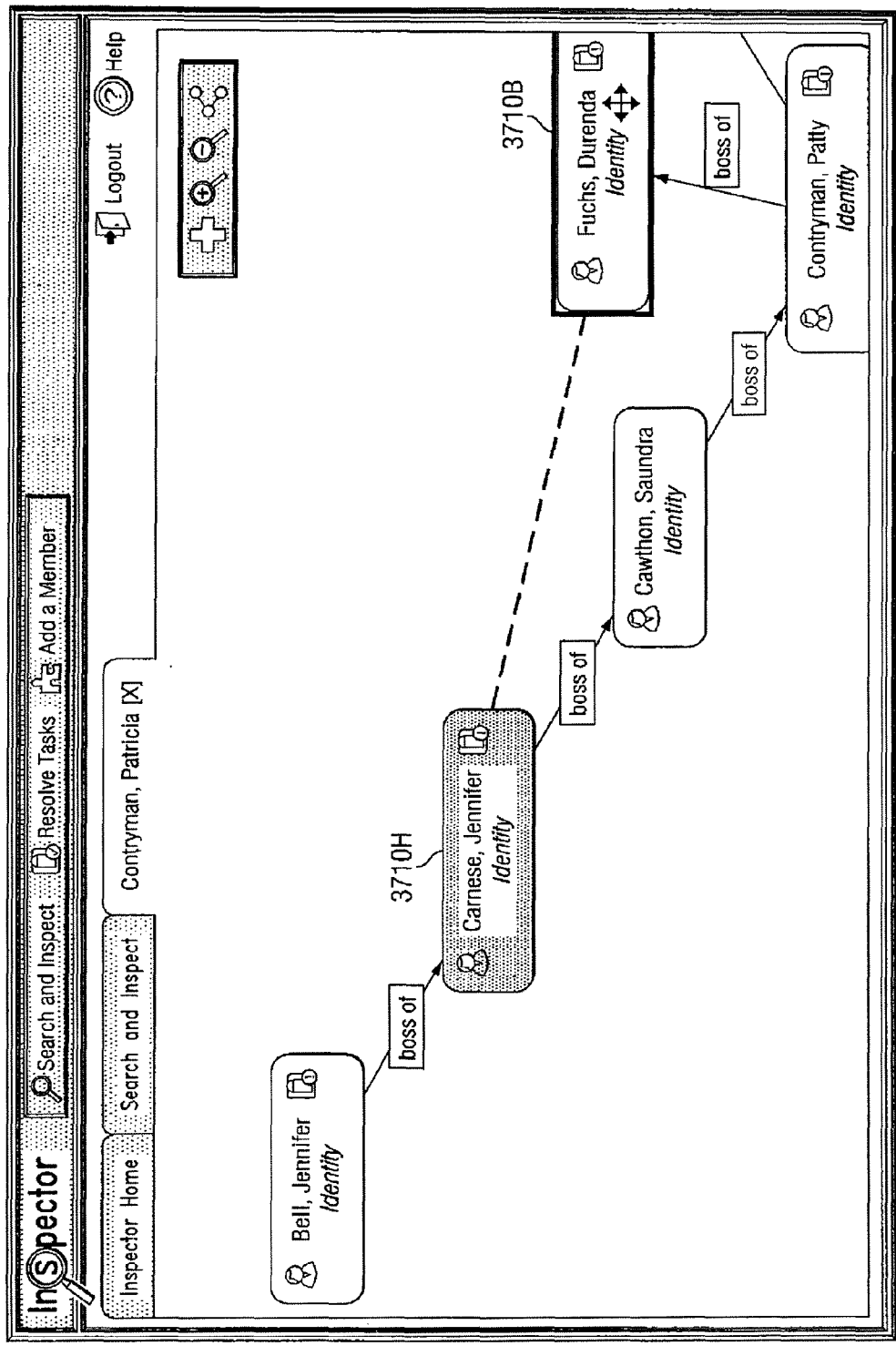

With reference now to FIG. 41, suppose the user now interacts with graphical representation 3700 to first select entity representation 3710h ("Jennifer Carnese") and then "drags" (e.g. by holding down a button on a mouse) to, or in some other way indicates that he wishes to establish a relationship using, entity representation 3710b ("Durenda Fuchs") as shown in FIG. 42. Once the user has indicated that he wishes to establish a relationship between the entity represented by entity representation 3710h ("Jennifer Carnese") and the entity represented by entity representation 3710b ("Durenda Fuchs") a dialogue box may be presented to the user.

Figure 43:
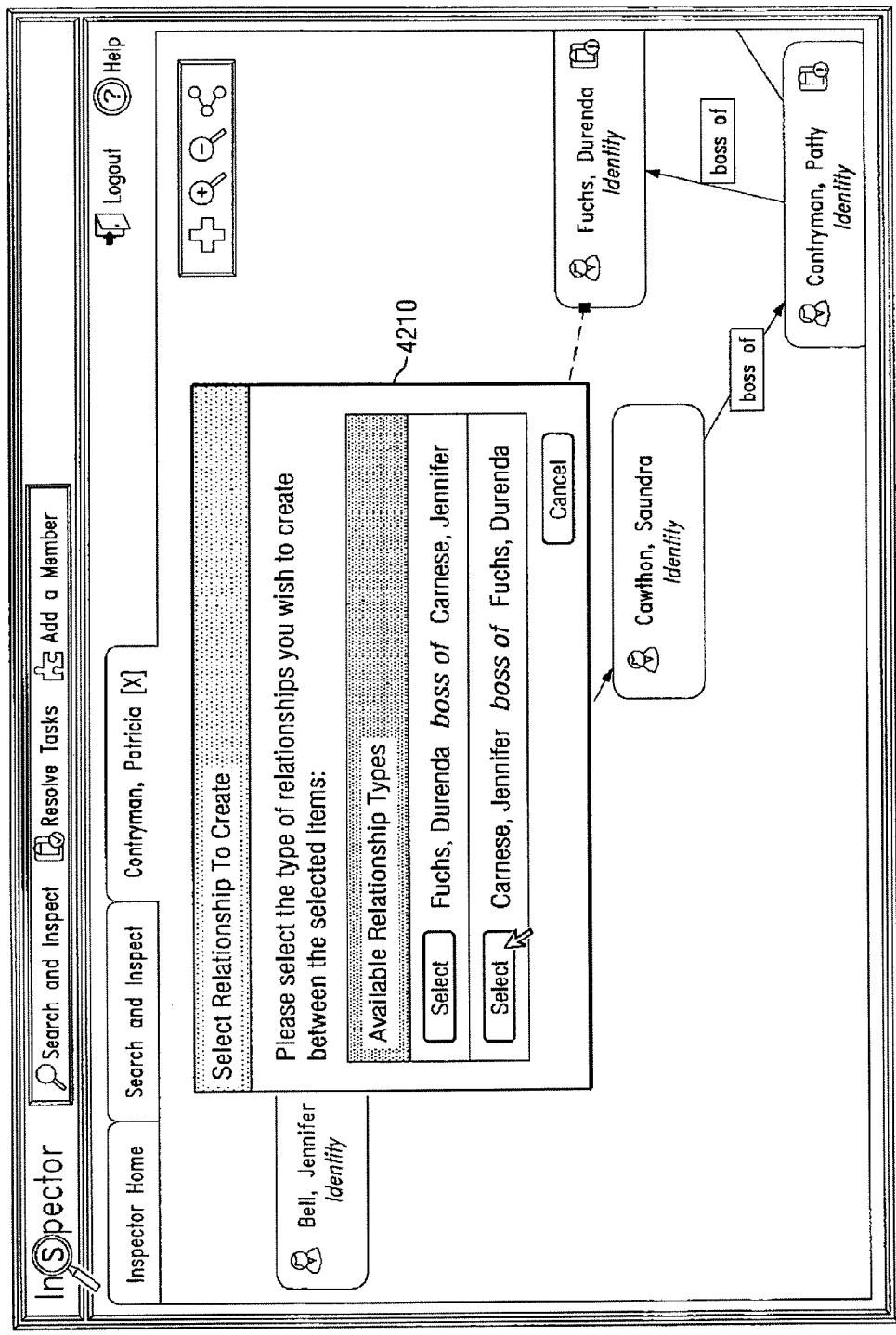
Figure 44:
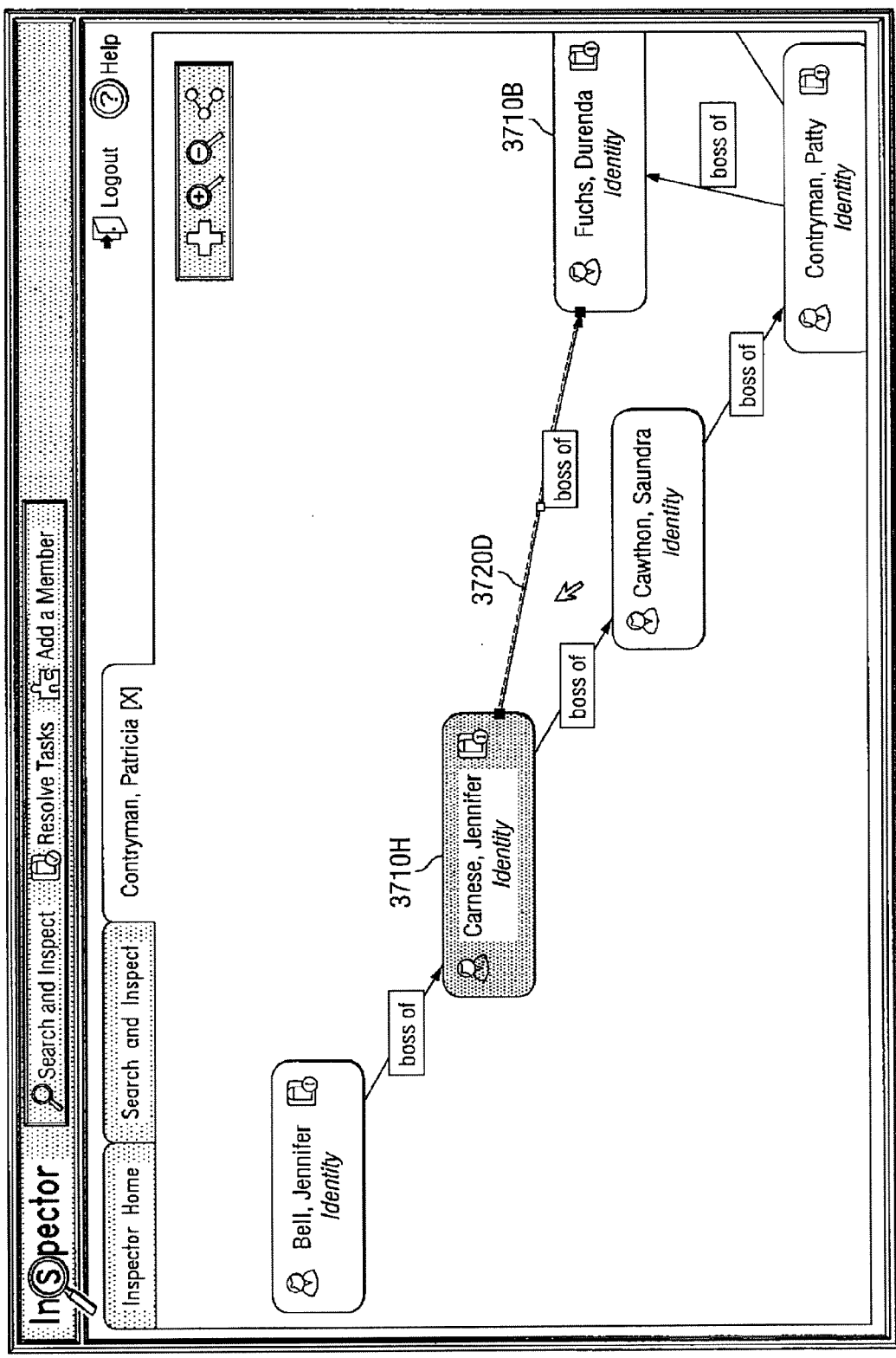

As shown in FIG. 43 dialogue box 4210 presents a menu of possible relationships to the user where this set of possible of relationships was determined based upon the type of entity represented by entity representation 3710h ("Jennifer Carnese") and the type of entity represented by entity representation 3710b ("Durenda Fuchs"). In this case the only configured relationship type for entities of the type "Identity" may be the "boss of" relationship, thus the set of possible relationship types may comprise the option to establish a "boss of" relationship between the entity represented by entity representation 3710h ("Jennifer Carnese") and the entity represented by entity representation 3710b ("Durenda Fuchs"). Furthermore, as the "boss of" relationship is a directional relationship two options may be presented with respect to the "boss of" relationship, an option where the entity represented by entity representation 3710h ("Jennifer Carnese") is the "boss of" the entity represented by entity representation 3710b ("Durenda Fuchs") and an option where the entity represented by entity representation 3710b ("Durenda Fuchs") is the "boss of" where the entity represented by entity representation 3710h ("Jennifer Carnese").

Suppose that the user then select to create a relationship where the entity represented by entity representation 3710h ("Jennifer Carnese") is the "boss of" the entity represented by entity representation 3710b ("Durenda Fuchs") using the "select" button associated with that option in dialogue box 4210. This action may result in the graphical representation depicted in FIG. 44. Notice with respect to graphical representation 3700 that relationship representation 3720d representing the relationship established between the entity represented by entity representation 3710h ("Jennifer Carnese") and the entity represented by entity representation 3710b ("Durenda Fuchs") is now depicted.

A user may also interact with the graphical interface to delete relationships in the MEI. More specifically, in one embodiment, a user may select a representation of a relationship using the graphical representation and choose to delete the relationship represented. Once a user selects to delete this relationship the represented relationship may be deleted with respect to the MEI (e.g. in the relationship database).

Figure 45:
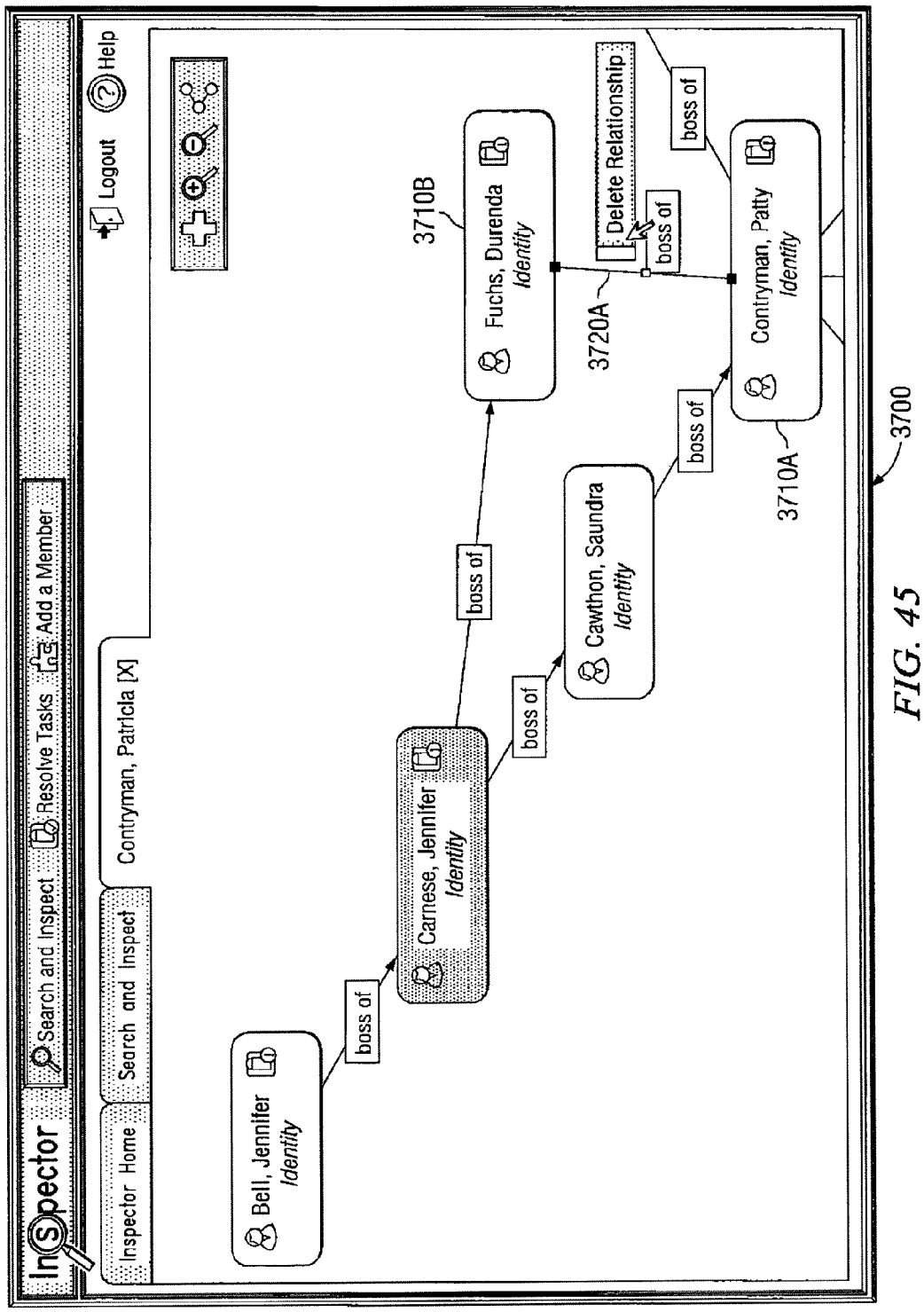

This may be illustrated with respect to FIG. 45. Suppose now that a user, interacting with graphical representation 3700, selects relationship representation 3720a representing a "boss of" relationship between the entity represented by entity representation 3710a ("Patty Countryman") and the entity represented by entity representation 3710b ("Durenda Fuchs"), for example by "clicking" on the relationship representation 3720a. The user may further indicate with respect to graphical representation 3700 that he wishes to delete the relationship represented by relationship representation 3720a, for example by "right clicking" or another type of indication, such as a keystroke or the like.

Figure 46:
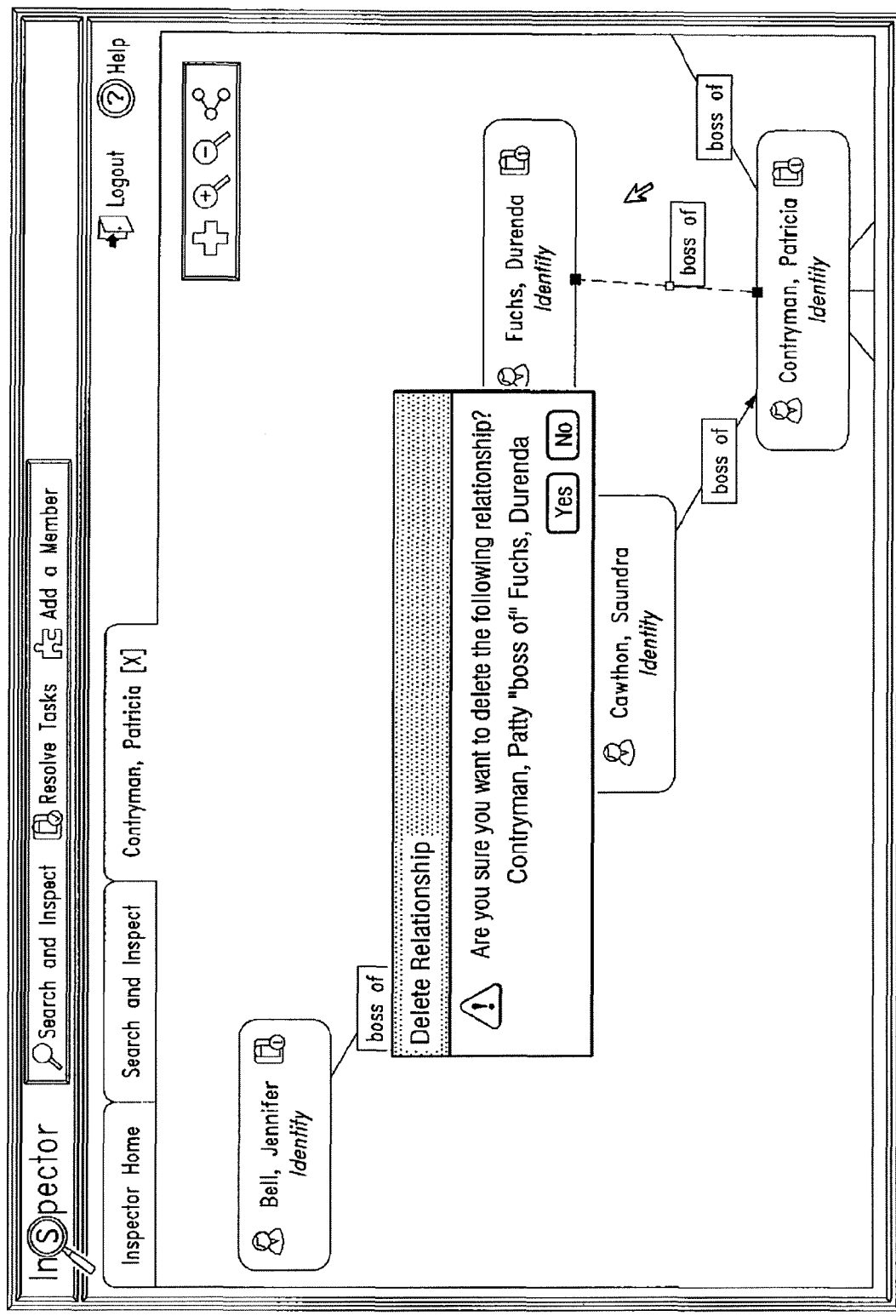
Figure 47:
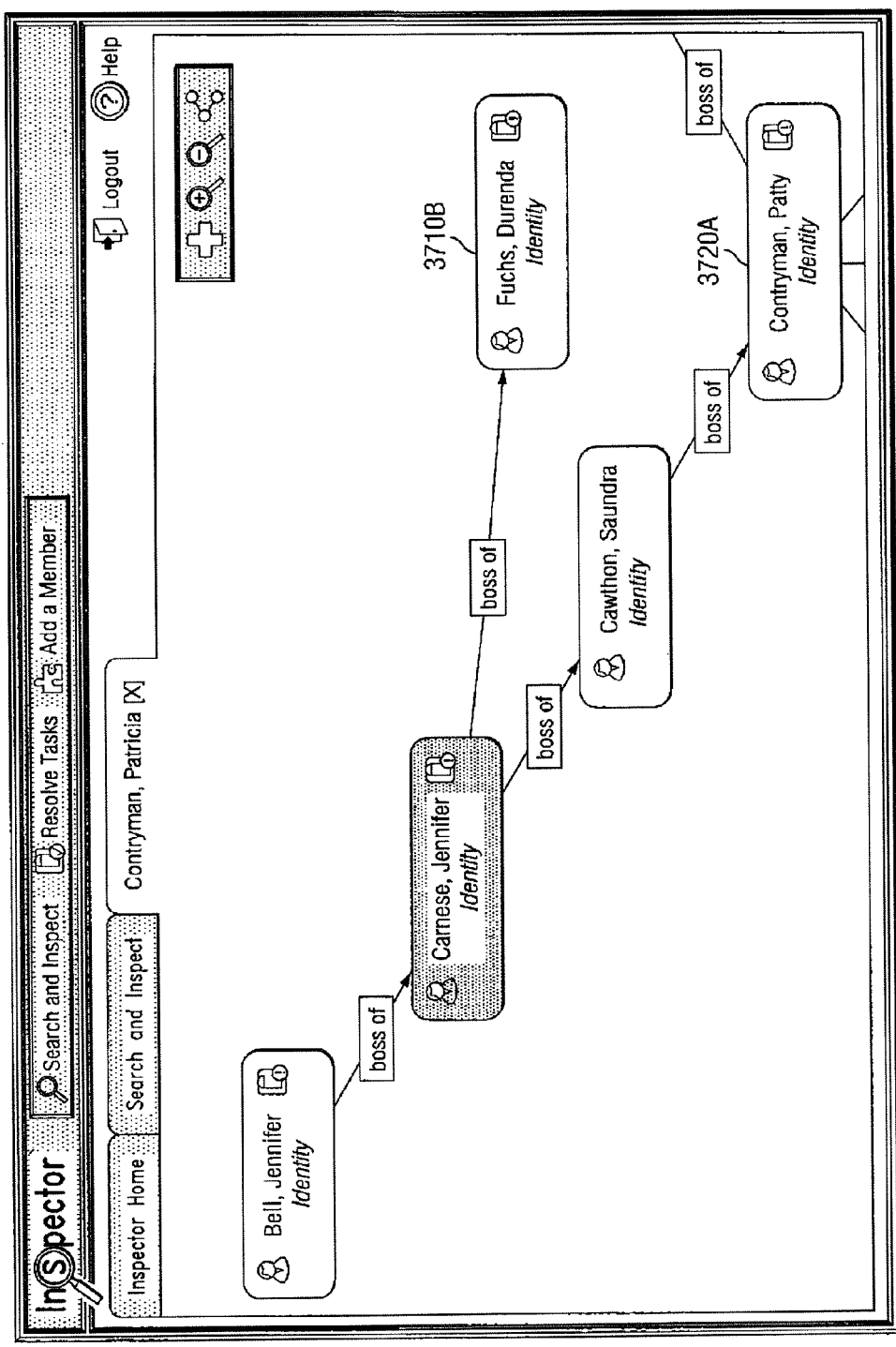
Figure 48:
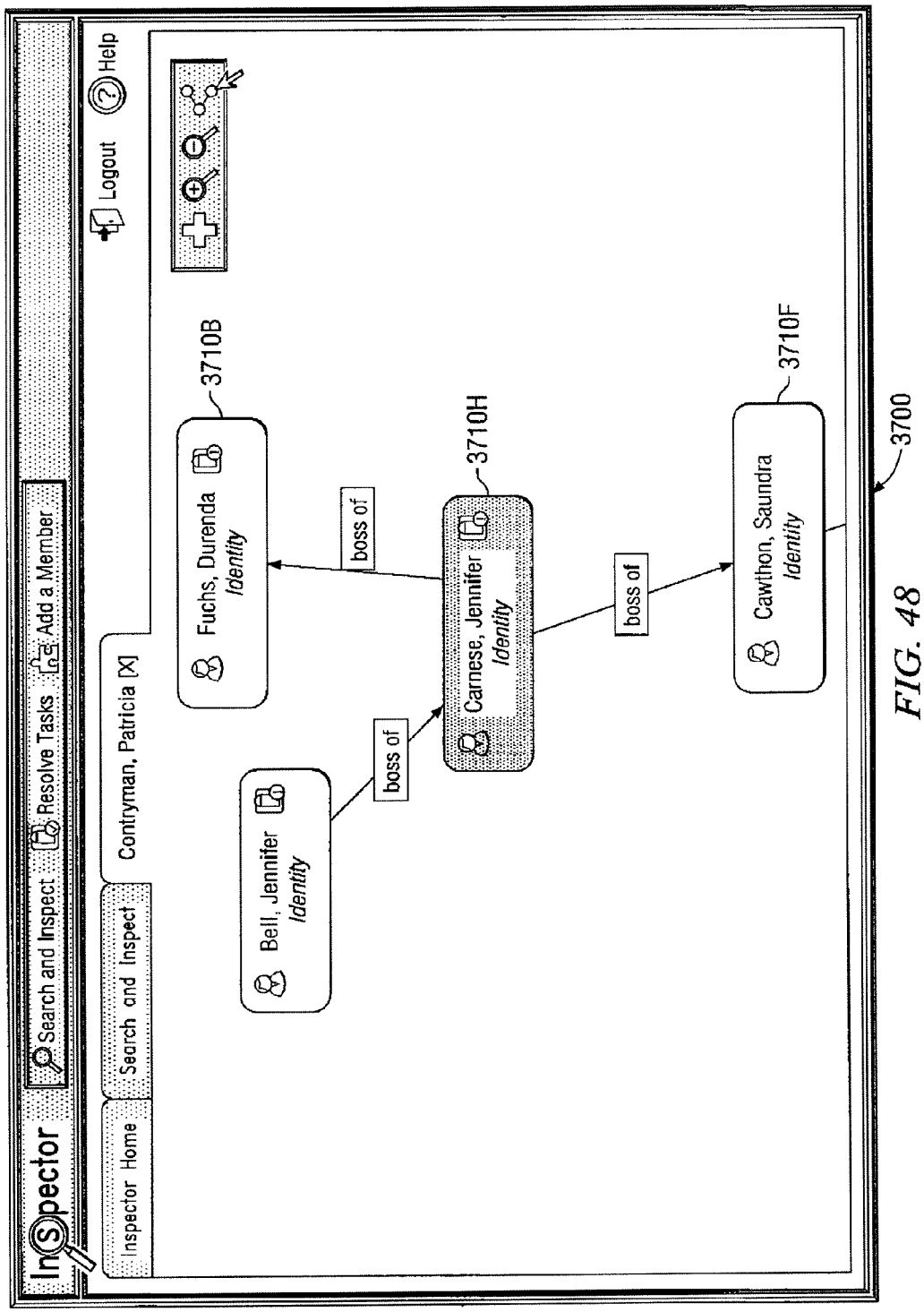

As shown in FIG. 46, a dialogue box may then be presented to the user confirming that the user wishes to delete the relationship represented by the selected relationship representation. Moving to FIG. 47, once a user confirms that he wishes to delete the relationship, the relationship between the entity represented by entity representation 3710a ("Patty Countryman") and the entity represented by entity representation 3710b ("Durenda Fuchs") may be deleted from the MEI and the corresponding relationship representation removed from the graphical representation 3700 as well.

As noted above, the number of relationship representation 3720 and entity relationships 3710 displayed and the configuration of the various entities and relationship represented by these representations (e.g. how the entities are related to one another) may be utilized to determine the layout of the various representation with respect to graphical representation 3700. Thus, the deletion of a relationship may affect the layout of the remaining entity and relationship representations. This is better depicted with reference to the difference between graphical representation 3700 in FIG. 47 and graphical representation 3700 in FIG. 48, where the graphical interface has altered the layout of entity representations 3710 and relationship representations 3720 in graphical representation 3700 based upon the deletion of relationship representation 3720a. Notice here that entity representation 3710h ("Jennifer Carnese"), the current navigation point, has been shifted toward the center of the displayed portion of graphical layout 3700, entity representation 3710b ("Durenda Fuchs") has moved toward the top of the displayed portion of graphical layout 3700, entity representation 3710f ("Saundra Cawthon") has moved toward the bottom of the displayed portion of graphical layout 3700 while entity representation 3710a ("Patty Countryman") has disappeared entirely from the displayed portion of graphical layout 3700.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for associating data records, comprising:
   receiving a data record;
   identifying an entity type associated with the data record;
   identifying a set of candidate data records associated with the entity type, where each of the set of candidate data records is based on a comparison between a set of existing data records and the received data record;
   scoring each of the set of candidate data records, wherein a score generated for each of the candidate data records corresponds to a likelihood that the received data record and the candidate data record comprise information on an entity of the entity type;
   associating the received data record and a first candidate record of the set of candidate data records with a first entity of the entity type if the score associated with the first candidate record is greater than a first threshold; and
   establishing a relationship between the first entity and a second different entity, wherein the first entity is associated with a first set of data records including information pertaining to that first entity and the second entity is associated with a second different set of data records including information pertaining to that second entity, and wherein the relationship provides a link to enable retrieval of the second entity based on the first entity.

2. The method of claim 1, wherein the scoring of each of the candidate data records is based upon an algorithm associated with the entity type.

3. The method of claim 1, wherein the relationship is of a first relationship type.

4. The method of claim 3, wherein the first relationship type is defined to be between entities of the first entity type.

5. The method of claim 4, wherein the relationship type is defined as unidirectional or bidirectional.

6. The method of claim 1, further including:
   searching for the first entity using one or more search criteria;
   displaying a first entity representation corresponding to the first entity;
   displaying a second entity representation representing the second entity having a relationship with the first entity; and
   displaying a relationship representation representing the relationship between the first entity and the second entity.

7. A system for associating data records, comprising:
   one or more information sources, each information source comprising a computer readable medium; and
   a master entity index system comprising a processor and operable for:
      receiving a data record from an information source;
      identifying an entity type associated with the data record;
      identifying a set of candidate data records associated with the entity type, where each of the set of candidate data records is based on a comparison between a set of existing data records and the received data record;
      scoring each of the set of candidate data records, wherein a score generated for each of the candidate data records corresponds to a likelihood that the received data record and the candidate data record comprise information on an entity of the entity type;
      associating the received data record and a first candidate record of the set of candidate data records with a first entity of the entity type if the score associated with the first candidate record is greater than a first threshold; and
      establishing a relationship between the first entity and a second different entity, wherein the first entity is associated with a first set of data records including information pertaining to that first entity and the second entity is associated with a second different set of data records including information pertaining to that second entity, and wherein the relationship provides a link to enable retrieval of the second entity based on the first entity.

8. The system of claim 7, wherein the scoring of each of the candidate data records is based upon an algorithm associated with the entity type.

9. The system of claim 7, wherein the relationship is of a first relationship type.

10. The system of claim 9 wherein the first relationship type is defined to be between entities of the first entity type.

11. The system of claim 10, wherein the relationship type is defined as unidirectional or bidirectional.

12. The system of claim 7, further including:
    an interface for use with the master entity index system operable to:
       search for the first entity using one or more search criteria;
       display a first entity representation corresponding to the first entity;
       display a second entity representation representing the second entity having a relationship with the first entity; and
       display a relationship representation representing the relationship between the first entity and the second entity.

13. A computer readable medium for associating data records, comprising instructions translatable for:
    receiving a data record;
    identifying an entity type associated with the data record;
    identifying a set of candidate data records associated with the entity type, where each of the set of candidate data records is based on a comparison between a set of existing data records and the received data record;
    scoring each of the set of candidate data records, wherein a score generated for each of the candidate data records corresponds to a likelihood that the received data record and the candidate data record comprise information on an entity of the entity type;
    associating the received data record and a first candidate record of the set of candidate data records with a first entity of the entity type if the score associated with the first candidate record is greater than a first threshold; and
    establishing a relationship between the first entity and a second different entity, wherein the first entity is associated with a first set of data records including information pertaining to that first entity and the second entity is associated with a second different set of data records including information pertaining to that second entity, and wherein the relationship provides a link to enable retrieval of the second entity based on the first entity.

14. The computer readable medium of claim 13, wherein the scoring of each of the candidate data records is based upon an algorithm associated with the entity type.

15. The computer readable medium of claim 13, wherein the relationship is of a first relationship type.

16. The computer readable medium of claim 15, wherein the first relationship type is defined to be between entities of the first entity type.

17. The computer readable medium of claim 16, wherein the relationship type is defined as unidirectional or bidirectional.

18. The computer readable medium of claim 13, further including instructions translatable to provide an interface operable to:
   search for the first entity using one or more search criteria;
   display a first entity representation corresponding to the first entity;
   display a second entity representation representing the second entity having a relationship with the first entity; and
   display a relationship representation representing the relationship between the first entity and the second entity.

* * * * *